United States Patent [19]
Berger

[11] Patent Number: 5,497,435
[45] Date of Patent: Mar. 5, 1996

[54] APPARATUS AND METHOD FOR ENCODING AND DECODING DIGITAL SIGNALS

[75] Inventor: Marc A. Berger, Rehovot, Israel

[73] Assignee: Image Compression Technology Ltd., Jerusalem, Israel

[21] Appl. No.: 21,084

[22] Filed: Feb. 23, 1993

[30] Foreign Application Priority Data

Feb. 7, 1993 [IL] Israel ........................................ 104636

[51] Int. Cl.$^6$ ..................................................... H04N 7/30
[52] U.S. Cl. ........................... 382/249; 348/397; 348/438
[58] Field of Search ....................... 382/56; 348/397–399, 348/437, 438; H04N 7/30

[56] References Cited

U.S. PATENT DOCUMENTS

| | | | |
|---|---|---|---|
| 4,941,193 | 7/1990 | Barnsley et al. ........................... | 382/56 |
| 5,065,447 | 11/1991 | Barnsley et al. ........................... | 382/56 |

OTHER PUBLICATIONS

David S. Mazel, "Fractal Modeling of Time–Series Data", Ph.d Thesis, Georgia Institute of Technology, 1991.
Arnaud E. Jacqin, "Image Coding Based on a Fractal Theory of Iterated Contractive Image Transformations", IEEE Trans. on Image Processing. vol. No. 1. Jan. 1992 pp. 18–30.
William B. Pennebaker and Joan L. Mitchell, "JPEG Still Image Data Compression Standard". Van Nostrand Reinhold, N.Y.
Michael F. Barnsley and Lyman P. Hurd, "Fractal Image Compression", Illustrations by Louisa F. Anson. AK Peters, Ltd Wellesley, Massachusetts.
Alan V. Oppenheim and Ronald W. Schafer, "Discrete–Time Signal Processing", Prentice Hall, Engelwood Cliffs, New Jersey 07632.
Gilbert Strang, "Waveletes and Dilation Equations: A Brief Introduction", SIAM Review. vol. 31, No. 4 pp. 614–627 Dec. 1989.
Marc A. Berger, "Image Generated by Orbits of 2–D Markov Chains". Chance: New Directions for Statistics and Computing vol. 2, No. 2, 1989.
Marc A. Berger, "Encoding Images Through Transition Probabilities". Mathl Comput. Modelling, vol. 11. pp. 575–577, 1988.
Michael F. Barnsley and Marc A. Berger and H. Mete Soner, "Mixing Markov Chains and Their Images", Probability in the Engineering and Informational Science, 1988, 387–414.
Marc A. Berger, et al., "Random Walks Generated by Affine Mappings", Journal of Theoretical Probability, vol. No. 3, 1988, pp. 239–253.
Marc A. Berger, "Random Affine Iterated Function Systems: Curve Generation and Wavelets", SIAM Review, vol. 34, No. 3, Sep. 1992, pp. 361–385.
Marc A. Berger, "IFS Algorithms for Wavelet Transforms, Curves and Surfaces and Image Compression", Jun., 1990, pp. 1–12.
Marc A. Berger, "Random Affine Iterated Function Systems: Mixing and Encoding", Diffusion Processes and Related Problems in Analysis, vol. 11: Stochastic Flows, Boston, 1991.
Jang et al, "Segmentation Based Image Coding . . . ", Feb. 1990 pp. 1957–1960.
Jang et al, "Texture Segmentation–Based Image Coder", Jul. 1991, pp. 2753–2756.
Pavel et al, "Sensor Fusion for Synthetic Vision" Oct. 1991 pp. 1–10.

Primary Examiner—Leo H. Boudreau
Assistant Examiner—Christopher S. Kelley
Attorney, Agent, or Firm—Cushman, Darby & Cushman

[57] ABSTRACT

A digital signal encoding method including the steps of defining first and second components of an original digital signal on each of two scales, fractal-processing the two first components by conducting a comparison therebetween and generating an encoded digital signal including a representation of at least one of the smooth components and a representation of the result of the fractal-processing step.

115 Claims, 31 Drawing Sheets

APPARATUS AND METHOD FOR ENCODING AND DECODING DIGITAL SIGNALS

FIELD OF THE INVENTION

The present invention relates to apparatus and methods for image compression.

BACKGROUND OF THE INVENTION

Principles of fractals are described in the following publications:
1. Barnsley, M. F. and Berger, M. A., "Pictures Worth a Million Words", Projects in Scientific Computing, 1988–1989, Pittsburgh Supercomputing Center, 34–35.
2. Barnsley, M. F., Berger, M. A. and Soner, H. M., "Mixing Markov Chains and their Images", Prob. Eng. Inf. Sci., 2(1988), 387–414.
3. Berger, M. A., "Encoding Images Through Transition Probabilities", Mathl. Comput. Modelling, 11(1988), 575–577.
4. Berger, M. A., "Images Generated by Orbits of 2-D Markov Chains", CHANCE 2(1989), 18–28.
5. Berger, M. A., "IFS Algorithms for Wavelet Transforms, Curves and Surfaces, and Image Compression", Stochastic Models, Statistical Methods and Algorithms in Image Analysis, P. Barone et al., eds., Springer-Verlag, N.Y., 1991.
6. Berger, M. A., "Random Affine Iterated Function Systems: Mixing and Encoding", Diffusion Processes and Related Problems in Analysis, Vol. 11: Stochastic Flows, M. Pinsky and Y. Wihstutz, eds., Birkhauser, Boston, 1991.
7. Berger, M. A., "Random Affine Iterated Function Systems: Curve Generation and Wavelets", SIAM Review, 1992.
8. Berger, M. A. and Soner, H. M., "Random Walks Generated by Affine Mappings", J. Theor. Prob. 1(1988), 239–264.

Use of fractals for image compression is described by Barnsley and Sloan, of Iterated Systems, Inc. (ISI) in Norcross, Ga. The ISI method is described in U.S. Pat. Nos. 4,941,193 and 5,065,447.

Fractals and their applications are also described in the following publications:
Barnsley, M. F. and Hurd, L. P. "Fractal image compression", AK Peters, Ltd., Wellesley, Mass., 1993;
Jacquin, A. E., "Image Coding Based on a Fractal Theory of Iterated Contractive Image Transformations", IEEE Trans. Image Proc. 1 (1992), 18–30; and
Mazel, David S., "Fractal Modeling of Time-Series Data", Ph.D. Thesis, Georgia Institute of Technology, 1991.

SUMMARY OF THE INVENTION

The present invention seeks to provide an improved system for image compression.

There is thus provided in accordance with a preferred embodiment of the present invention a digital signal encoding method including the steps of defining first and second components of an original digital signal on each of two scales, fractal-processing the two first components by conducting a comparison therebetween and generating an encoded digital signal including a representation of at least one of the smooth components and a representation of the result of the fractal-processing step.

There is further provided in accordance with a preferred embodiment of the present invention a digital signal encoding method including the steps of defining rough and smooth components of an original digital signal on each of two scales, fractal-processing the two rough components i.e. relatively high frequency and relatively low frequency components by conducting a comparison therebetween, and generating an encoded digital signal including a representation of at least one of the smooth components and a representation of a result of the fractal-processing step.

Also in accordance with a preferred embodiment of the present invention the step of defining includes the step of defining a rough component on one of the two scales as the difference between the original signal and the smooth component on the scale.

Additionally in accordance with a preferred embodiment of the present invention the step of defining includes the step of segmenting the original digital signal by defining coarse and fine grids corresponding to first and second ones of the two scales, respectively.

Moreover in accordance with a preferred embodiment of the present invention the step of defining includes the steps of computing an average value for the original digital signal in each segment from among two pluralities of segments defined by the coarse and fine grids respectively, and for each plurality of segments, passing functions through the average values, thereby defining the smooth components for each of the two scales.

Further in accordance with a preferred embodiment of the present invention the step of defining includes the step of low-pass filtering the original digital signal with first and second cut-off frequencies determined respectively by the coarse and fine grids, thereby defining the smooth components.

Still further in accordance with a preferred embodiment of the present invention the step of low-pass filtering includes the steps of computing a Discrete Fourier Transform of the original digital signal, truncating the Discrete Fourier Transform at the first and second cut-off frequencies, thereby defining truncated signals, and performing an inverse Discrete Fourier Transform on the truncated signals.

Also in accordance with a preferred embodiment of the present invention the step of low-pass filtering includes the steps of computing a Discrete Cosine Transform of the original digital signal, truncating the Discrete Cosine Transform at the first and second cut-off frequencies, thereby defining truncated signals, and performing an inverse Discrete Cosine Transform on the truncated signals.

There is also provided in accordance with a preferred embodiment of the present invention a digital signal encoding method including the steps of defining first and second components of an original digital signal on each of two scales, fractal-processing the two first components by conducting a comparison therebetween, and generating an encoded digital signal including a representation of at least one of the second components and a representation of a result of the fractal-processing step, wherein the original signal includes a video signal including a plurality of frames and wherein the step of defining includes, for each frame of the video signal, the steps of defining the first and second components on the first scale, in the current frame, and defining the first and second components on the second scale, in a frame following the current frame.

There is further provided in accordance with a preferred embodiment of the present invention a digital signal encoding method including the steps of defining first and second components of an original digital signal on each of two scales, fractal-processing the two first components by conducting a comparison therebetween, and generating an encoded digital signal including a representation of at least one of the second components and a representation of the result of the fractal-processing step, wherein the original signal includes an audio signal sampled digitally, and wherein the sampled signal is segmented into windows which are clipped as the signal is generated, and the steps of defining, fractal-processing and generating are carried out separately for each clipped window of the sampled signal.

Still further in accordance with a preferred embodiment of the present invention the original signal includes a greyscale image.

Also in accordance with a preferred embodiment of the present invention the original signal includes a color image defining a plurality of color component images.

Additionally in accordance with a preferred embodiment of the present invention the steps of defining, fractal-processing and generating are performed on each of the plurality of color component images.

Moreover in accordance with a preferred embodiment of the present invention the color image is defined by a color palette.

Further in accordance with a preferred embodiment of the present invention the method also includes a palette selection step in which the plurality of color component images are compressed into a color palette including a multiplicity of color palette values and the original digital signal processed in the steps of defining, fractal-processing and generating includes the multiplicity of color palette values.

Additionally in accordance with a preferred embodiment of the present invention the step of fractal-processing includes the steps of shrinking a portion of the rough component of the original digital signal contained in each coarse grid segment so as to fit the size of a fine grid segment, for each fine grid segment, performing the step of searching among the shrunk rough component portions for a shrunk rough component portion which matches well with a portion of the rough component contained in the fine grid segment.

Also in accordance with a preferred embodiment of the present invention the method includes the step of storing a result of the searching step including a shrunk rough component portion index and a matching operation.

Further in accordance with a preferred embodiment of the present invention the shrinking includes, for each fine grid pixel, the step of averaging pixel values of the rough component defined in the coarse scale, over a region corresponding to the fine grid pixel position.

Still further in accordance with a preferred embodiment of the present invention the matching operation includes a scale factor by which the shrunk rough portion is multiplied, and the well-matching portion is identified using a sum of squares error criterion.

Also in accordance with a preferred embodiment of the present invention the method includes the step of providing a packed encoded digital signal, the step of providing including the steps of quantizing the encoded digital signal, thereby defining a quantized encoded digital signal, storing the quantized encoded digital signal in byte form, thereby defining a stored quantized encoded digital signal, and compressing the stored quantized encoded digital signal.

Additionally in accordance with a preferred embodiment of the present invention the step of compressing includes the step of operating at least one of the following compression algorithms on the stored quantized encoded digital signal, a Lempel-Ziv compression algorithm and a Huffman compression algorithm.

Further in accordance with a preferred embodiment of the present invention the method includes the step of generating the original digital signal by transforming a precursor digital signal to a frequency domain.

Still further in accordance with a preferred embodiment of the present invention the step of generating an original digital signal includes the step of performing a Discrete Fourier Transform on the precursor digital signal.

Also in accordance with a preferred embodiment of the present invention the step of generating an original digital signal includes the step of performing a Discrete Cosine Transform on the precursor digital signal.

There is additionally provided in accordance with a preferred embodiment of the present invention a method for decoding a received digital signal including the steps of extracting a first subsignal, a second subsignal and fractal information from the received encoded digital signal, computing a difference between a reference digital signal and the first subsignal, thereby defining a difference signal, performing a plurality of linear modifications on a plurality of portions of the difference signal contained in respective coarse grid segments using the fractal information, thereby defining a modified difference signal, and combining the second subsignal with the modified difference signal, thereby defining a decoded digital signal which substantially reconstructs the original signal.

Moreover in accordance with a preferred embodiment of the present invention the received signal includes an encoded video signal including a plurality of frames and the step of extracting includes, for each frame of the video signal, the step of defining first and second subsignals from a frame preceding the current frame and from the current frame, respectively.

Also in accordance with a preferred embodiment of the present invention a plurality of signals are received and decoded, each received signal including a window of an encoded audio signal sampled digitally which is segmented into windows as it is generated.

Additionally in accordance with a preferred embodiment of the present invention the received signal includes an encoded greyscale image.

Further in accordance with a preferred embodiment of the present invention a plurality of signals are received, each received signal including an encoded color component image from a color image.

Still further in accordance with a preferred embodiment of the present invention the steps of extracting, computing, performing and combining are performed on each of the plurality of encoded color component images.

Also in accordance with a preferred embodiment of the present invention the received signal includes an encoded color image defined by a color palette, and the decoded signal is further processed by a table look-up through the color palette.

Moreover in accordance with a preferred embodiment of the present invention the steps of extracting, computing, performing and combining are repeated at least once, and for each repetition the reference signal includes the decoded signal from a previous repetition.

Additionally in accordance with a preferred embodiment of the present invention the steps of extracting, computing, performing and combining are repeated until the decoded signal remains substantially unchanged over repetition.

Further in accordance with a preferred embodiment of the present invention the steps of extracting, computing, performing and combining are repeated a predetermined number of times.

Still further in accordance with a preferred embodiment of the present invention the received encoded digital signal includes a received packed encoded digital signal, and the method also includes, prior to the step of extracting, the steps of decompressing the packed encoded digital signal into a plurality of bytes, reconstructing a quantized encoded digital signal from the plurality of bytes, and performing inverse quantization on the quantized encoded digital signal, thereby to generate the encoded digital signal.

Also in accordance with a preferred embodiment of the present invention the step of decompressing includes the step of operating at least one of the following decompression algorithms on the packed encoded digital signal, a Lempel-Ziv decompression algorithm, and a Huffman decompression algorithm.

Further in accordance with a preferred embodiment of the present invention the step of performing includes, for each fine grid segment, the steps of deriving an index and a matching operation from the fractal information, shrinking the portion of the difference signal contained in a coarse grid segment corresponding to the index so as to fit the size of a fine grid segment, and applying the matching operation to the shrunk portion of the difference signal, thereby to define the modified difference signal within the fine grid segment.

Still further in accordance with a preferred embodiment of the present invention the shrinking step includes, for each fine grid pixel, the step of averaging pixel values of the difference signal over a region corresponding to the fine grid pixel position.

Additionally in accordance with a preferred embodiment of the present invention the matching operation includes a multiplication of the shrunk rough portion by a scale factor.

Also in accordance with a preferred embodiment of the present invention the method includes the step of transforming the decoded signal out of a frequency domain.

Further in accordance with a preferred embodiment of the present invention the step of transforming out of a frequency domain includes the step of performing an inverse Discrete Fourier Transform on the decoded signal.

Still further in accordance with a preferred embodiment of the present invention the step of transforming out of a frequency domain includes the step of performing an inverse Discrete Cosine Transform on the decoded signal.

In accordance with a preferred embodiment of the present invention the method also includes the steps of transmitting the encoded signal along a telecommunication channel, receiving the encoded signal from the telecommunication channel, and decoding the received encoded signal.

In accordance with a preferred embodiment of the present invention the method further includes the steps of archiving the encoded signal into a digital storage medium, retrieving the encoded signal from the digital storage medium, and decoding the retrieved encoded signal.

Further in accordance with a preferred embodiment of the present invention the step of decoding includes the steps of extracting a first subsignal, a second subsignal and fractal information from the received encoded digital signal, computing a difference between a reference digital signal and the first subsignal, thereby defining a difference signal, performing a plurality of linear modifications on a plurality of portions of the difference signal contained in respective coarse grid segments using the fractal information, thereby defining a modified difference signal, and combining the second subsignal with the modified difference signal, thereby defining a decoded digital signal which substantially reconstructs the original signal.

Still further in accordance with a preferred embodiment of the present invention the original signal includes a video signal including a plurality of frames, and the step of extracting includes, for each current frame of the video signal, the steps of defining first rough and smooth components of the current frame on a first scale, defining second rough and smooth components of a frame following the current frame on a second scale, and the step of extracting includes, for each frame of the video signal, the step of defining first and second subsignals from a frame preceding the current frame and from the current frame, respectively.

Moreover in accordance with a preferred embodiment of the present invention the original signal is an audio signal sampled digitally, and the sampled signal is segmented into windows which are adaptively clipped as the signal is generated, and the steps of defining, fractal-processing, generating, transmitting, receiving, extracting, computing, performing and combining are carried out separately for each clipped window of the sampled signal.

Further in accordance with a preferred embodiment of the present invention the steps of defining, fractal-processing, generating, transmitting, receiving, extracting, computing, performing and combining are performed on each of the plurality of color component images.

In accordance with a preferred embodiment of the present invention the method also includes a palette selection step in which the plurality of color component images are compressed into a color palette including a multitude of color palette values and the original digital signal processed in the steps of defining, fractal-processing and generating includes the color palette values, and the decoded signal is further processed by a table look-up through the color palette.

Still further in accordance with a preferred embodiment of the present invention the step of defining includes the step of defining a rough component on one of the two scales as the difference between the original signal and the smooth component on the scale.

Also in accordance with a preferred embodiment of the present invention the step of defining includes the step of segmenting the original digital signal by defining coarse and fine grids corresponding to first and second ones of the two scales, respectively.

Additionally in accordance with a preferred embodiment of the present invention the step of defining includes the steps of computing an average value for the original digital signal in each segment from among two pluralities of segments defined by the coarse and fine grids respectively, and for each plurality of segments, passing functions through the average values, thereby defining the smooth components for each of the two scales.

Further in accordance with a preferred embodiment of the present invention the step of defining includes the step of low-pass filtering the original digital signal with first and second cut-off frequencies determined respectively by the coarse and fine grids, thereby defining the smooth components.

Still further in accordance with a preferred embodiment of the present invention the step of low-pass filtering includes the steps of computing a Discrete Fourier Transform of the original digital signal, truncating the Discrete Fourier Transform at the first and second cut-off frequencies, thereby defining truncated signals, and performing an inverse Discrete Fourier Transform on the truncated signals.

Moreover in accordance with a preferred embodiment of the present invention the step of low-pass filtering includes the steps of computing a Discrete Cosine Transform of the original digital signal, truncating the Discrete Cosine Transform at the first and second cut-off frequencies, thereby defining truncated signals, and performing an inverse Discrete Cosine Transform on the truncated signals.

Also in accordance with a preferred embodiment of the present invention the step of fractal-processing includes the steps of shrinking a portion of the rough component of the original digital signal contained in each coarse grid segment so as to fit the size of a fine grid segment, for each fine grid segment, performing the step of searching among the shrunk rough component portions for a shrunk rough component portion which matches well with a portion of the rough component contained in the fine grid segment.

In accordance with a preferred embodiment of the present invention the method also includes the steps of generating the encoded signal by packing a precursor encoded signal for transmission along the channel, the step of packing including the steps of quantizing the precursor encoded digital signal, thereby defining a quantized encoded digital signal, storing the quantized encoded digital signal in byte form, thereby defining a stored quantized encoded digital signal, and compressing the stored quantized encoded digital signal, and unpacking the packed encoded signal after it is received, the step of unpacking including the steps of decompressing the packed encoded digital signal into a plurality of bytes, reconstructing the quantized encoded digital signal from the plurality of bytes, and performing inverse quantization on the quantized encoded digital signal, thereby generating the received encoded digital signal.

Additionally in accordance with a preferred embodiment of the present invention the step of compressing includes the step of operating at least one of the following compression algorithms on the stored quantized encoded digital signal, a Lempel-Ziv compression algorithm, and a Huffman compression algorithm.

Further in accordance with a preferred embodiment of the present invention the step of decompressing includes the step of operating at least one of the following decompression algorithms on the packed encoded digital signal, a Lempel-Ziv decompression algorithm, and a Huffman decompression algorithm.

In accordance with a preferred embodiment of the present invention the method further includes the steps of generating the original digital signal by transforming a precursor digital signal to a frequency domain, and transforming the decoded signal out of the frequency domain.

Further in accordance with a preferred embodiment of the present invention the step of generating the original digital signal includes the step of performing a Discrete Fourier Transform on the precursor digital signal.

Still further in accordance with a preferred embodiment of the present invention the step of generating the original digital signal includes the step of performing a Discrete Cosine Transform on the precursor digital signal.

Also in accordance with a preferred embodiment of the present invention the step of transforming out of a frequency domain includes the step of performing an inverse Discrete Fourier Transform on the decoded signal.

Additionally in accordance with a preferred embodiment of the present invention the step of transforming out of a frequency domain includes the step of performing an inverse Discrete Cosine Transform on the decoded signal.

Moreover in accordance with a preferred embodiment of the present invention the step of performing includes, for each fine grid segment, the steps of deriving an index and a matching operation from the fractal information, shrinking the portion of the difference signal contained in a coarse grid segment corresponding to the index so as to fit the size of a fine grid segment, and applying the matching operation to the shrunk portion of the difference signal, thereby to define the modified difference signal within the fine grid segment.

Further in accordance with a preferred embodiment of the present invention the shrinking step includes, for each fine grid pixel, the step of averaging pixel values of the difference signal over a region corresponding to the fine grid pixel position.

Still further in accordance with a preferred embodiment of the present invention the matching operation includes a multiplication of the shrunk rough portion by a scale factor.

In accordance with a preferred embodiment of the present invention the smooth components include first and second decoded JPEG compressions based on image box size dimensions on respective ones of the two scales and the representation of at least one of the smooth components includes a JPEG representation.

Further in accordance with a preferred embodiment of the present invention the step of extracting includes the step of decompressing a JPEG encoded file.

Still further in accordance with a preferred embodiment of the present invention the smooth components include first and second decoded wavelet compressions based on grid dimensions on respective ones of the two scales, and the representation of at least one of the smooth components includes a wavelet representation based on a Discrete Wavelet Transform.

Additionally in accordance with a preferred embodiment of the present invention the first subsignal and the second subsignal are each extracted by performing the step of expanding a wavelet representation using an inverse Discrete Wavelet Transform.

Moreover in accordance with a preferred embodiment of the present invention the two second components of the plurality of frames include decoded MPEG compressions based on image box size dimensions on each of the two scales, and the representation of each of the second components includes an MPEG representation.

Also in accordance with a preferred embodiment of the present invention the step of defining the first and second subsignals includes the step of decompressing an MPEG encoded file.

Additionally in accordance with a preferred embodiment of the present invention the two second components of the plurality of frames include decoded CCITT compressions based on the H.261 (p*64) standard and based on image box size dimensions on each of the two scales, and the representation of each of the second components includes an H.261 representation.

Further in accordance with a preferred embodiment of the present invention the step of defining the first and second subsignals includes the step of decompressing an H.261 encoded file.

Still further in accordance with a preferred embodiment of the present invention the smooth components of the original digital signal are not orthogonal projections thereof.

There is further provided in accordance with a preferred embodiment of the present invention a digital signal encoder including a fractal-processor operative to compare two rough components of an original signal defined on two respective scales, and an encoded digital signal generator operative to generate an encoded signal including a representation of at least one of two smooth components of the original signal defined on the two respective scales and a representation of the output of the fractal-processor.

There is furthermore provided in accordance with a preferred embodiment of the present invention a digital signal encoder including a fractal-processor operative to compare two first components of an original signal defined on two respective scales, and an encoded signal generator operative to generate an encoded digital signal including a representation of at least one of two second components of the original signal defined on the two respective scales and a representation of the output of the fractal-processor, wherein the original signal includes a video signal including a plurality of frames and wherein, for each current frame, the first and second components on the first scale are defined in the current frame and the first and second components on the second scale are defined on a frame following the current frame.

Still further provided in accordance with a preferred embodiment of the present invention is a digital signal encoder including a fractal-processor operative to compare two first components of an original signal defined on two respective scales, and an encoded signal generator operative to generate an encoded digital signal including a representation of at least one of two second components of the original signal defined on the two respective scales and a representation of the result of the fractal-processing step, wherein the original signal includes an audio signal sampled digitally, and wherein the sampled signal is segmented into windows which are adaptively clipped as the signal is generated, and the fractal-processor and the encoded signal generator operate separately on each clipped window of the sampled signal.

Additionally provided in accordance with a preferred embodiment of the present invention are means for decoding a received digital signal, including a difference computation unit operative to compute a difference between a reference digital signal and a first subsignal extracted from the received digital signal, thereby defining a difference signal, a linear modifier operative to perform a plurality of linear modifications on a plurality of portions of the difference signal respectively contained in a plurality of coarse grid segments using fractal information extracted from the received digital signal, thereby defining a modified difference signal, and a signal combining unit operative to combine a second subsignal extracted from the received digital signal with the modified difference signal, thereby defining a decoded digital signal which substantially reconstructs the original signal.

Further in accordance with a preferred embodiment of the present invention the first and second components respectively include rough and smooth components of the original signal.

Further in accordance with a preferred embodiment of the present invention the original digital signal comprises an image, the first component comprises an orthogonal projection of the original signal and the second component comprises a complement to the orthogonal projection.

Preferably, the step of defining comprises the step of orthogonally projecting the image onto a subspace spanned by continuous piecewise bilinear basis functions, which are aligned with the coarse and fine grids, respectively, using a Hilbert space projection technique.

Preferably the step of orthogonally projecting includes the following steps: computing a symmetric Gram-Schmidt matrix whose order equals the dimension of the subspace and whose entries are inner products of the piecewise bilinear basis functions; computing a source vector whose entries are inner products of said basis functions with the image, the matrix and the vector defining a linear system of equations; and solving the linear system iteratively using a Jacobi-like algorithm in which the matrix is split into a tri-diagonal portion, an upper-band off-diagonal portion and a lower-band off-diagonal portion.

It is appreciated that the apparatus and methods shown and described herein have a broad variety of applications in processing a wide variety of images and signals, both audio and video, the applications including, but not being limited to, AP newswires, color fax machines, color printers, compression of LANDSAT and 3D scene data, deed and document archival systems, desktop publishing, digital maps, digital telescopes, PACS, realty imaging systems, telemedicine and teleradiology.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

The present specification describes a new method for encoding and decoding digital signals. The method described herein is also useful for enhancing conventional compression methods, such as JPEG, at low additional storage cost. The apparatus and method of the present invention is suitable for encoding and decoding any suitable digital signal, and therefore is useful for audio and video compression.

The methods shown and described herein include a novel integration of fractal compression methods with smooth approximation methods. Use of fractals for image compression is described by Barnsley and Sloan, of Iterated Systems, Inc., as described in the Background of Invention section.

The method of the present invention, which uses fractals for residual encoding, differs from the Barnsley and Sloan method. Barnsley and Sloan search for optimal multiply and shift match-ups between an image and itself on two different scales. The method shown and described herein preferably involves only multiplication, and the match-up is preferably carried out between two different residual images, rather than on the original image itself.

In addition the method shown and described herein preferably includes, in addition to the fractal step, additional steps of adding and subtracting approximations to the image on two different scales.

A particular feature of the present invention is that the signal is divided into two components, a rough component containing a high frequency portion of the signal or high frequency information in the image, and a smooth component containing a low frequency portion of the signal or low frequency information in the image.

Preferably, an imaginary fine grid is arranged on the original signal or image and this fine grid is employed to make a first division of the signal or image into rough and smooth components. Also, an imaginary coarse grid is arranged on the original signal or image and this coarse grid is employed to make a second division of the signal or image into rough and smooth components.

Figure 1:
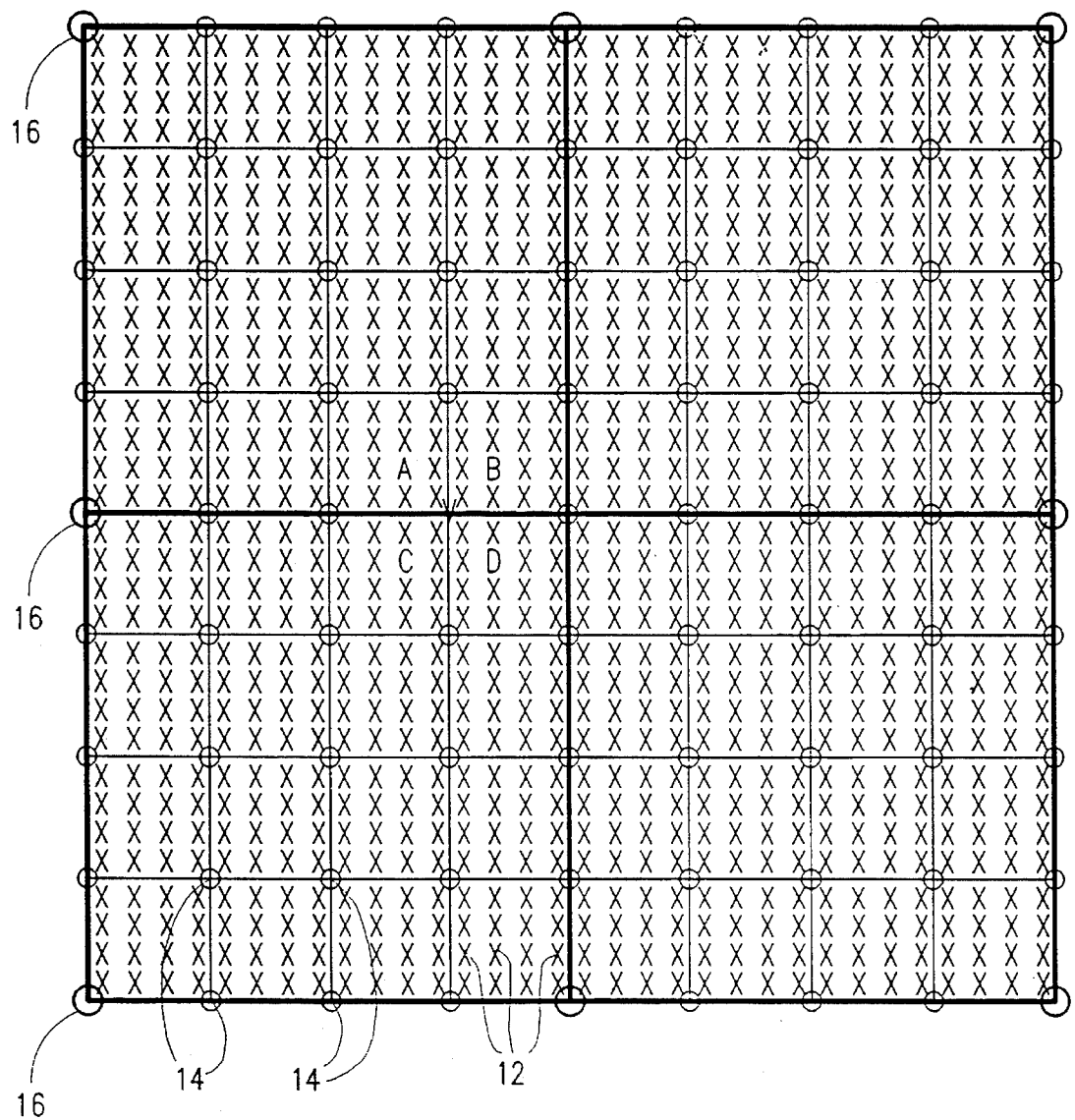
FIG. 1 is a diagram of a plurality of pixels covered by a fine grid and a coarse grid.

FIG. 1 illustrates a digital image including a plurality of pixels 12, a fine grid including a plurality of fine grid vertices 14, and a coarse grid including a plurality of coarse grid vertices 16.

In the illustrated example, the image dimensions are 32×32 pixels, the fine grid is an 8×8 array, each fine grid box having a 4×4 block of pixels inside it, and the coarse grid is a 2×2 array, each coarse grid box having a 16×16 block of pixels inside it. Grid vertices are indicated by o's and pixels are indicated by x's. The grid vertices are typically staggered from the pixel positions, as shown.

It is noted that a 16×16 image portion in a coarse box may be shrunk to the size of a fine box, namely 4×4 pixels, preferably by averaging the 16 pixel values in each of its 4×4 sub-blocks into a single value.

To compute each vertex value for the fine grid vertices from a given digital image, all the image pixel values in a 4×4 neighborhood centered about the vertex may be averaged together. This is illustrated in FIG. 1, where the value computed at the vertex V is the average of the pixels in the square ABCD.

To compute each vertex value for the coarse grid vertices, all the image pixel values in a 16×16 neighborhood centered about the vertex may be averaged together.

The rough components defined in terms of the fine and coarse grids, are termed herein the "fine rough" and "coarse rough" components, respectively. The two smooth components, defined in terms of the fine and coarse grids, are termed herein the "fine smooth" and "coarse smooth" components, respectively. The four components are more briefly referred to as the FR, CR, FS and CS components, respectively.

Reference is now made to FIGS. 2A–2D and 3A–3D which conceptually illustrate features of encoding and decoding methods, respectively, which are provided in accordance with a preferred embodiment of the present invention.

Figure 2A:
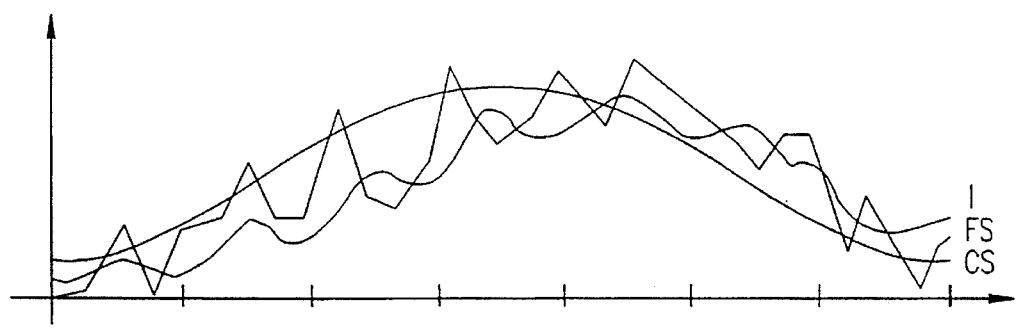
FIGS. 2A–2D are graphic illustrations of some of the steps in a preferred mode of operation of an audio encoder.
Figure 2B:
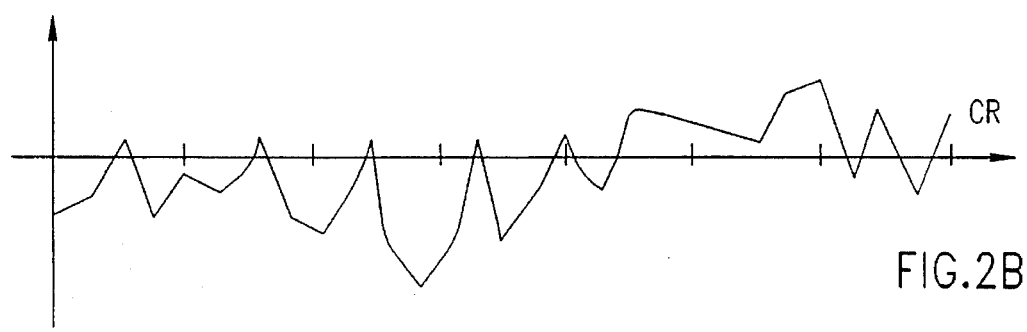
Figure 2C:
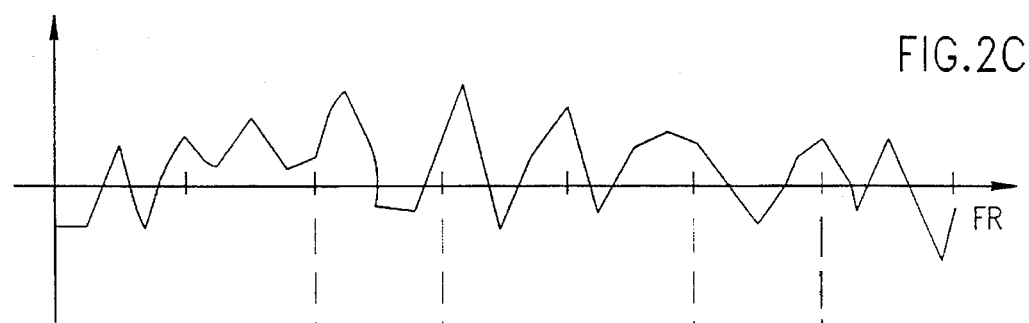

The graph of FIG. 2A illustrates a signal I, and fine and coarse smooth components thereof, FS and CS, respectively. One interval or box of the coarse component is shown and eight intervals or boxes of the fine component, as indicated by the 8 markings on the horizontal axis. The graphs of FIGS. 2B and 2C illustrate the coarse and fine rough components, respectively, of signal I. Specifically, CR in FIG. 2B is the difference signal I−CS; and FR in FIG. 2C is the difference signal I−FS.

The fine grid is typically used to divide the signal into fine rough and fine smooth components as follows:

a. define the fine smooth component by fitting a mathematically simple smooth curve to the vertices of the fine grid;

b. define the fine rough component by subtracting or otherwise finding the difference between the original signal and the fine smooth component thereof.

Similarly, the coarse grid is typically used to divide the signal into coarse rough and coarse smooth components as follows:

a. define the coarse smooth component by fitting a mathematically simple smooth curve to the vertices of the coarse grid;

b. define the coarse rough component by subtracting or otherwise finding the difference between the original signal and the coarse smooth component thereof.

Figure 2D:
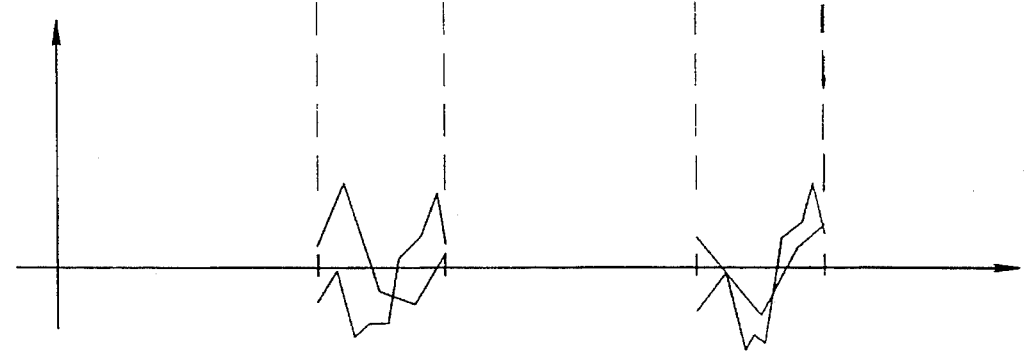

In the graph of FIG. 2D, a comparison of the two rough components is shown. The portion of the coarse rough component falling within each of the coarse boxes is shrunk along the horizontal axis so as to fit the fine grid box size. As indicated in the drawings at step 180 of FIG. 6 and described in the accompanying description hereinbelow, the shrinking can be performed, for example, by averaging values of the difference signal over a region corresponding to the fine grid position. The two lower graph portions in FIG. 2D each represent the shrunken signal CR from FIG. 2B. The two upper graph portions in FIG. 2D are copies of the graph portions of signal FR from FIG. 2C, over the same fine boxes. For each portion of the fine rough component falling within each of the fine boxes, and for each shrunk coarse portion, a scaling factor is then found which, when applied along the vertical axis, best fits the shrunk coarse rough portion to the fine rough portion. As indicated in the drawings at step 188 of FIG. 6 and the accompanying description in the detailed description hereinbelow, the scaling factor is preferably derived by a cross-correlation calculation, as is done in linear regression, which can be directly carried out since the two portions are commensurate (i.e. they have the same dimensions, or number of samples).

The scaled shrunk coarse rough portion is compared to the fine rough portion and a goodness of fit value is computed. Thereby, for each fine grid box, the coarse grid box in which resides the coarse rough component portion which best fits the fine rough component portion residing in the fine grid box, is identified.

A particular feature of the encoding method shown in FIGS. 2A–2D is that, for each fine grid box, the following "fractal information" is preferably stored:

a. an index or other indication of the best-fitting coarse grid box portion for each fine grid box portion; and b. an indication of how best to fit the rough component portion within the best-fitting coarse grid box, to the rough component portion within the fine grid box.

Also stored are the two smooth components.

Various embodiments of the encoding method of FIG. 2 are described below in detail with reference to FIGS. 4, 9, 11, 13, 15, 19, 21, and 23.

Figure 3A:
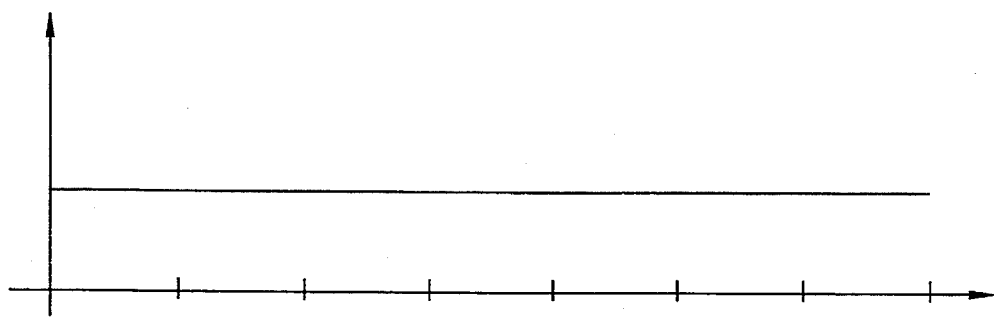
FIGS. 3A–3D are graphic illustrations of some of the steps in a preferred mode of operation of an audio decoder.

The decoding method of FIGS. 3A–3D receives the encoded signal, provided by the method of FIGS. 2A–2D. As explained above, the encoded signal includes an indication of the fine smooth component, an indication of the coarse smooth component and fractal information. The decoder begins with a reference signal, to provide an initial approximation of the original signal which was encoded, as shown in FIG. 3A. The reference signal can be taken as the fine smooth component of the original signal which was encoded.

Figure 3B:
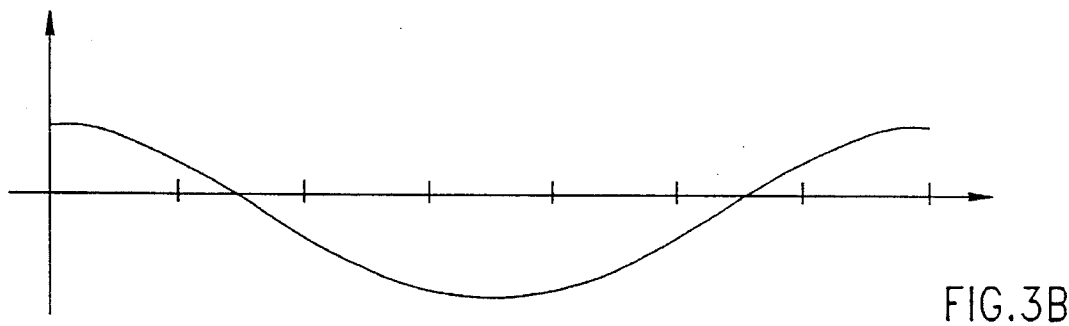

As shown in FIG. 3B, the coarse smooth component is subtracted from the reference signal, leaving a difference signal which is an approximation of the coarse rough signal.

Figure 3C:
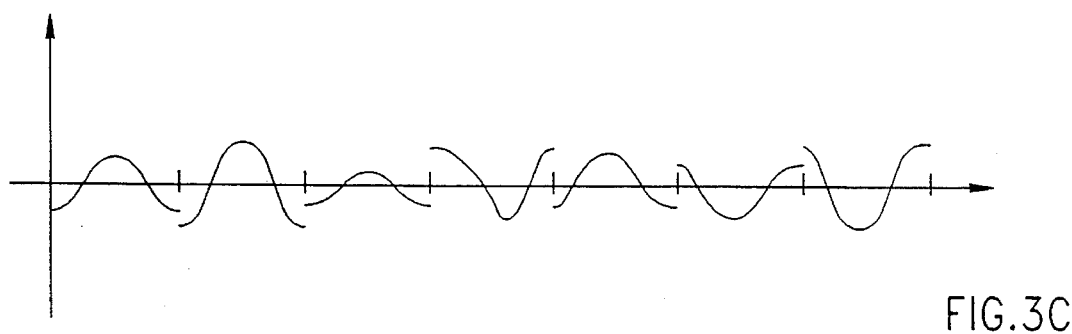

The difference signal is then fractal-processed, using the stored fractal information, thereby to generate an approximation to the fine rough component, which approximation is pictured in the graph of FIG. 3C.

Figure 3D:
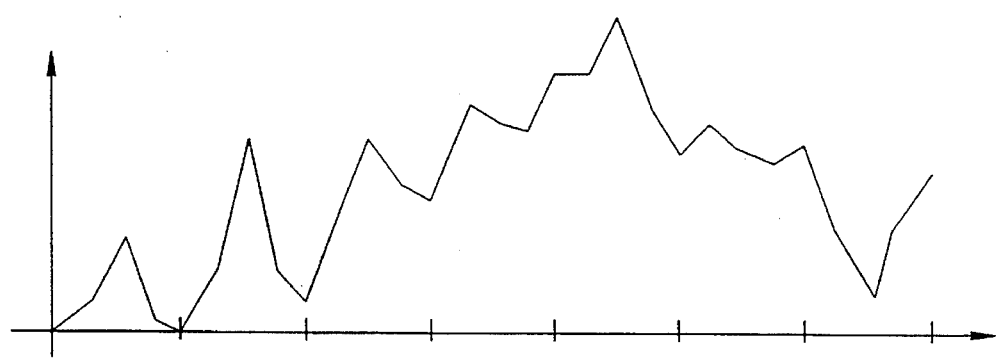
Figure 4A:
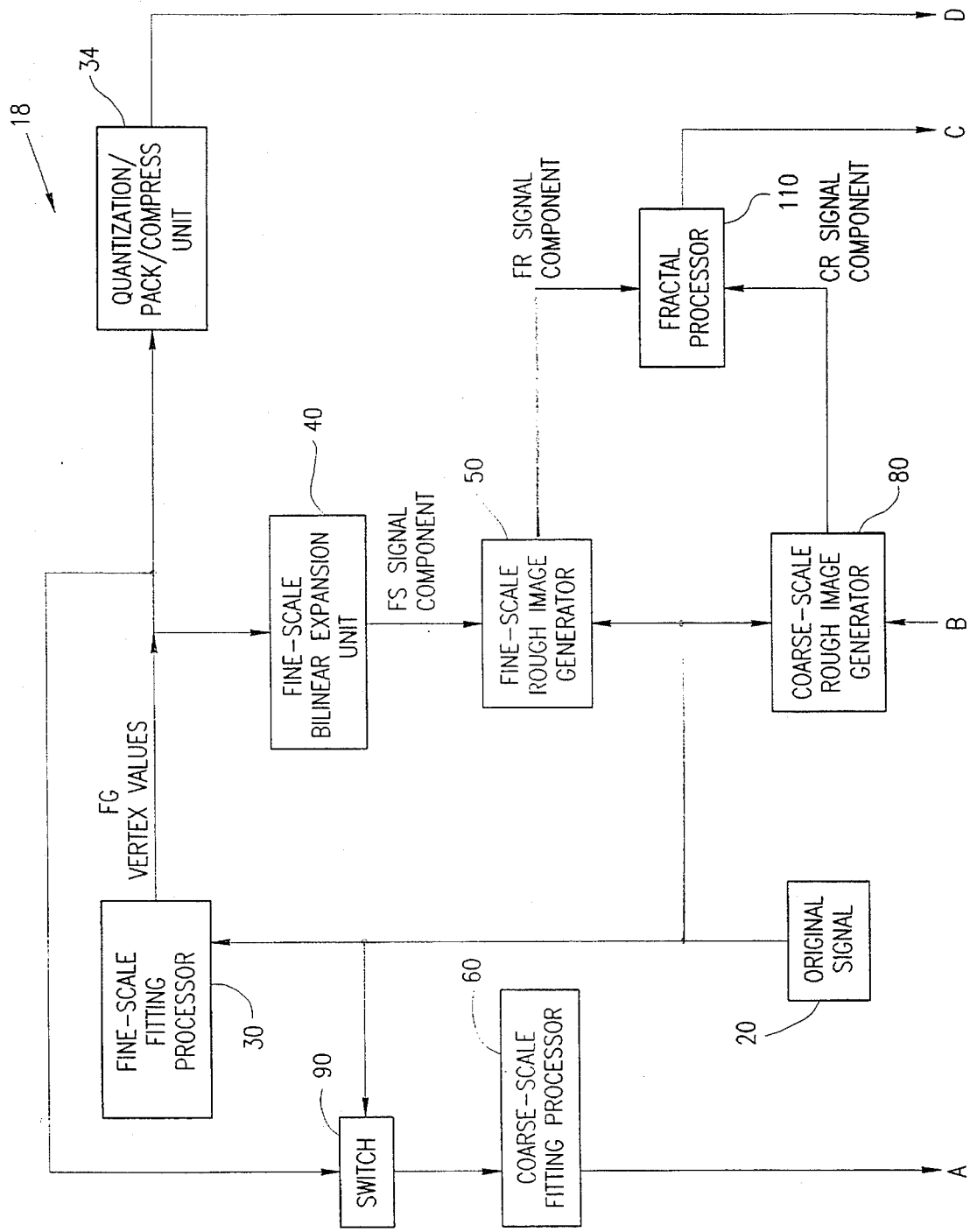
FIGS. 4A and 4B, taken together, are a simplified block diagram of a digital image encoder constructed and operative in accordance with a preferred embodiment of the present invention which employs an averaging technique and which is useful for 2-dimensional (2-D) image compression as well as for 1-dimensional audio compression (1-D)
Figure 4B:
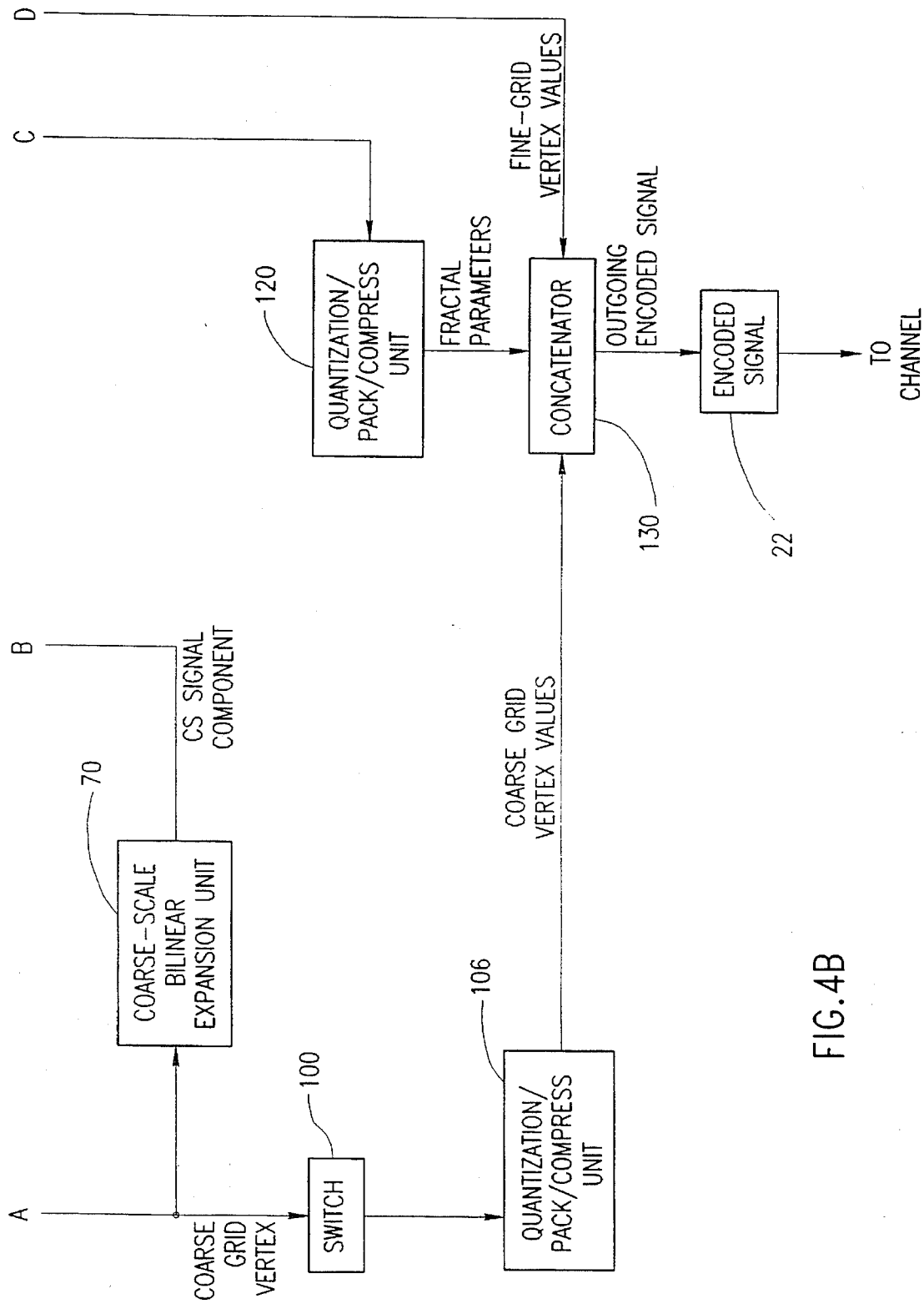

As shown in FIG. 3C, the approximation of the coarse rough signal component of FIG. 3B is multiply shrunk and scaled according to the fractal parameters, so as to piecewise approximate the fine rough component. As shown in FIG. 3D, the approximation of the fine rough component is added with the stored fine component, to generate a better approximation of the original signal. The steps shown in FIGS. 3B–3D are preferably repeated more than once.

Various embodiments of the decoding method of FIGS. 3A–3D are described below in detail with reference to FIGS. 7, 10, 12, 14, 18, 20, 22, and 24.

Reference is now made to FIG. 4 which illustrates a digital image encoder of the present invention, referenced generally 18, which employs an averaging technique and which is useful for 2-dimensional (2-D) image compression as well as for 1-dimensional audio compression (1-D). The input to encoder 18 is a file 20 containing an original digital signal, also termed herein "the original digital image". The output of encoder 18 is a file 22 containing an encoded digital signal, the size of the output file being much smaller than the size of the input file 20.

The original digital signal 20 received by encoder 18 is sent to a fine-scale processor 30, which is preferably operative to compute coefficients for a fine scale continuous piecewise bilinear function which fits the image. In other words, fine scale processor 30 is operative to assign a single value to each fine scale grid vertex, which single value is derived from and therefore represents the signal values or image values of a plurality of pixels in the vicinity of the fine scale grid vertex. The single, vertex vicinity representing value for each vertex may be computed by conventionally interpolating from the pixel values in the vicinity of the vertex. For example, the pixel values in the fine-size rectangular block value which is centered at the grid vertex may be averaged.

To generate the vertex vicinity representing values, fine-scale processor 30 loops through each vertex and, for each vertex of the fine grid, adds all of the individual pixel values in the vertex's vicinity, and then divides by the total number of pixels lying in this vicinity. The number of pixels per vicinity is generally constant and only varies at the border of the image, where part of the vicinity outlies the border, thereby reducing the number of pixels per vicinity for border vicinities.

The vertex values computed by fine-scale processor 30 are quantized and packed by a quantization/pack/compress unit 34. Quantization/pack/compress unit 34 is operative to quantize the vertex values received from fine-scale processor 30 into fixed bit integers, and to pack the quantized values into bytes. These byte-packed values are then preferably further compressed by quantization/pack/compress unit 34, using a suitable compression technique, preferably a lossless compression technique.

Huffman compression and Lempel-Ziv compression are both lossless compression techniques and are described by Rabani, M. and Jones, P. W. in "Digital Image Compression Techniques", Tutorial Texts in Optical Engineering, V. TT7, SPIE Optical Engineering Press, Bellingham, Wash., 1991, the disclosure of which is incorporated herein by reference.

The compressed packed quantized vertex values generated by unit 34 are concatenated with encoded fractal parameters, as explained in more detail below.

The vertex values computed by fine-scale processor 30 are also used by fine-scale bilinear expansion unit 40, which generates an approximation to the image on the fine scale by constructing the smooth component of the image on the fine scale. The fine scale approximation of the image typically comprises a piecewise bilinear image generated by interpolating pixel values for all pixels falling intermediate to the grid vertices. Any suitable interpolation process may be employed to compute pixel values within each fine grid box, such as but not limited to bilinear interpolation.

Fine-scale expansion unit 40 is described below in more detail with reference to FIG. 5.

A fine-scale rough image generator 50 is operative to generate a rough approximation of the original image on the fine scale. Preferably, the fine-scale rough approximation is generated by subtracting the fine-scale smooth approximation generated by fine-scale bilinear expansion unit 40 from the original image.

Similarly, a coarse-scale processor 60, a coarse-scale bilinear expansion unit 70 and a coarse-scale rough image generator 80 are provided which operate on the coarse grid rather than on the fine grid but are otherwise respectively similar to fine-scale processor 30, fine-scale bilinear expansion unit 40 and fine-scale rough image generator 50.

The coarse-scale smooth image component can be generated directly from the original digital image, just as the fine scale component was computed by fine-scale processor 30. Alternatively, however, the coarse-scale smooth image component may be generated from the fine scale component. This alternative is mainly applicable if the coarse and fine grids are commensurate, i.e. if the coarse grid box dimensions are exact integral multiples of the respective fine grid box dimensions. Therefore, preferably, a switch 90 is provided which provides either original signal input or fine-scale grid vertex values to coarse-scale unit 60.

The coarse scale continuous piecewise bilinear fit carried out by coarse-scale processor 60 may employ the same averaging method as does the fine-scale processor 30, but with different grid dimensions, and hence with larger vicinity regions. For example, the pixel values in the rectangular coarse size block which is centered at the grid vertex may be averaged as for example in FIG. 17. The output of processor 60 comprises grid vertex values for the vertices of the coarse scale grid.

If the fine and coarse grids are commensurate then it is unnecessary to store the coarse grid vertex values because these can be reconstructed from the fine grid vertex values during decoding. If the fine and coarse grids are not commensurate, the coarse grid vertex values are stored. Preferably, therefore, a switch 100 is provided which passes the coarse grid vertex values generated by unit 60 if the coarse and fine grids are not commensurate, and stops the flow, passing nothing along, otherwise.

If the coarse grid vertex values are passed along, they are quantized, packed into bytes and compressed losslessly by a quantization/pack/compress unit 106 which may be substantially identical to unit 34. The compressed packed quantized coarse grid vertex values generated by unit 106 are eventually concatenated with encoded fractal parameters, as explained in more detail below.

The coarse-scale vertex values computed by processor 60 are expanded into a bilinear image by coarse-scale processor 70, whose operation is similar to that of fine-scale processor 40, except with different grid box dimensions. The output of processor 70 comprises an approximation to the image on the coarse scale, also termed herein the coarse-scale smooth image component. This component is subtracted from the original image by processor 80, the resulting difference representing the rough image component on the coarse scale.

The fine-scale and coarse-scale rough components generated by processors 50 and 80 respectively are received by a fractal processor 110 which searches for an optimal match-up between the two rough components, as explained above with reference to FIG. 2, and generates optimal match-up output. The optimal match-up output generated by fractal processor 110 preferably comprises, for each fine grid box:

a. a coarse box index indicating the coarse grid box in which resides the portion of the coarse rough component which, when shrunk, can best be fitted to the portion of the fine rough component residing in the fine grid box; and b. a scale multiplier value indicating how to scale the best-fitting coarse rough component portion so as to best fit it with the fine rough component portion.

Fractal processor 110 is described in more detail below with reference to FIG. 6.

The indices and multipliers for each fine-grid box are preferably quantized into fixed bit integers, packed into bytes and losslessly compressed by a quantization/pack/compress unit 120 which may be substantially identical to units 34 and 106.

The compressed, packed quantized multipliers are sent from unit 120 to a concatenator 130 which combines the following data into a single file, also termed herein "encoded signal file 22":

a. the compressed fine scale smooth component, b. the compressed coarse scale smooth component in the event that it also is to be encoded, and c. the fractal index and multiplier parameters.

The encoded signal file 22 may now be archived or transmitted.

A preferred bilinear expansion method for implementing fine-scale and coarse-scale expansion units 40 and 70, respectively, of FIG. 4, is now described with reference to the flowchart of FIG. 5.

Figure 5:
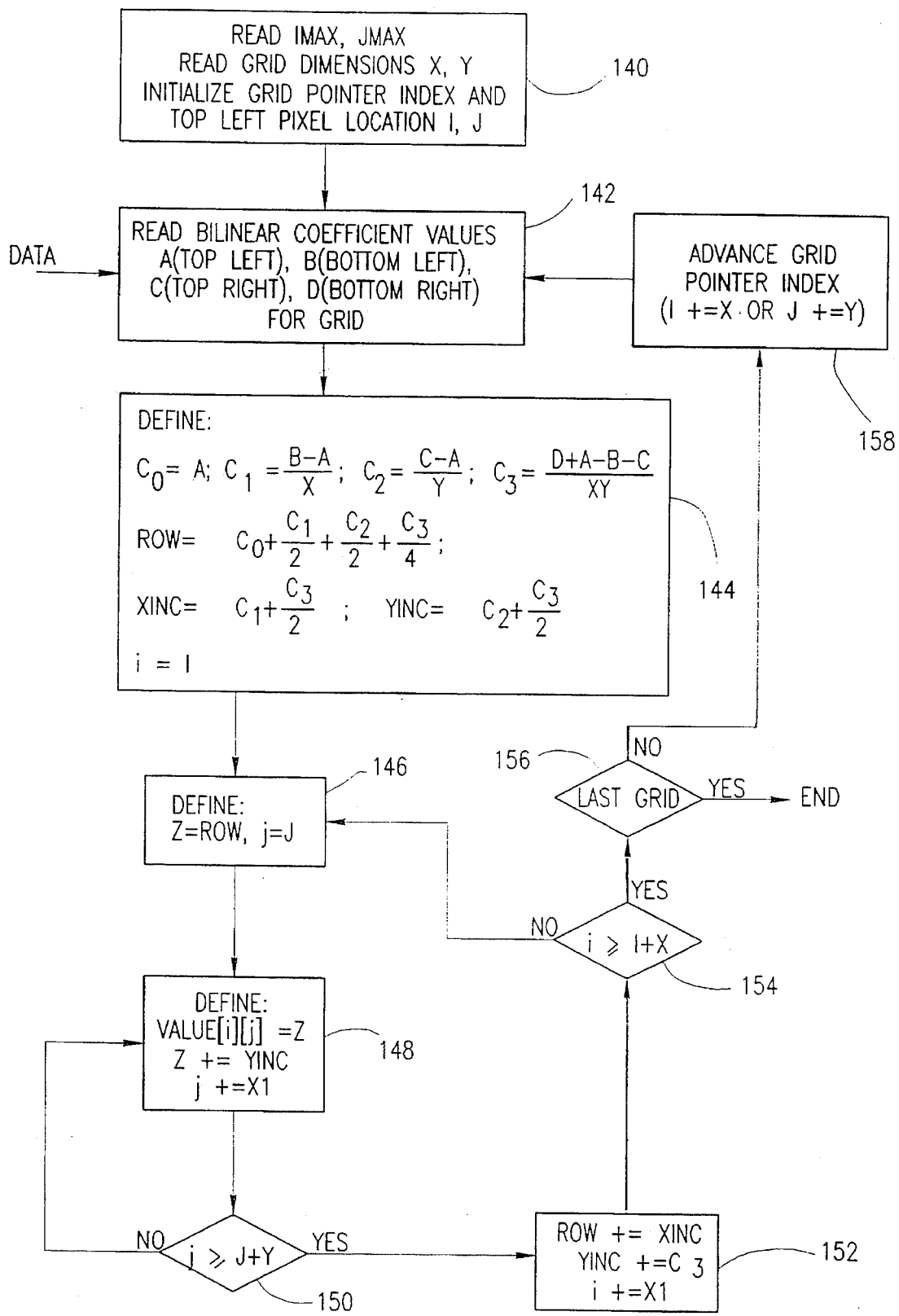
FIG. 5 is a simplified block diagram of a preferred implementation of the bilinear expansion module of FIGS. 4, 7, 15, 18, 21 and 22 which uses a set of grid vertex values to interpolate intermediate pixel values, thereby producing a piecewise bilinear image.

The method of FIG. 5 is also suitable for implementing the bilinear expansion modules of FIGS. 7, 15, 18, 21 and 22. The method receives a set of grid vertex values which are employed to bilinearly interpolate intermediate pixel values, thereby to generate a piecewise bilinear image. The grid vertices are typically staggered from the pixel positions, as explained above with reference to FIG. 1.

In step 140, the following parameters are read: the image resolution along each of the two dimensions of the image (imax, jmax), and the grid box dimensions, X and Y. Also, the top left pixel location, (I,J), inside the first grid box, is initialized to (0,0).

The grid vertex values for the four corners of the current grid box are read from the input data in step 142. These four values are here referenced as follows: A (top left), B (bottom left), C (top right) and D (bottom left).

Step 144 computes intermediate variables $c_0$, $c_1$, $c_2$, $c_3$, row, XINC and YINC. Preferably, X and Y are powers of two, so the divisions involved in these calculations may be carried out by means of right bit shifts.

The bilinear fit is expressed as $$c_0 + c_1 x + c_2 y + c_3 xy$$

and is computed by row and column increments XINC and YINC, and row initial values ROW. The XINC variable is used to increment from the beginning of one row to the next, and as such is constant. The YINC variable is used to increment from column to column within each row, and as such is itself incremented from one row to the next. Since the pixel values correspond to the pixel centers, which are staggered from the grid, the X- and Y- coordinates for them are offset by one half from integers. Thus the initial value for ROW has a term $$c_1/2 + c_2/2 + c_3/4$$

and the initial values for XINC and YINC have terms $c_3/2$.

Steps 146, 148, 150, 152 and 154 form a double loop through I and J, in which (step 148) all the intermediate pixel values for the current grid box, namely value [i][j] for i=1, ..., I; j=1, ..., J are computed.

In summary, the counter i is initialized to I in step 144, and the counter j is initialized to J in step 146. The counter j is incremented in step 148, and step 150 checks to see if j has reached the end of the current grid box being spanned, J+Y. If not, then the j-loop is repeated. Otherwise, the next row is processed and i is incremented in step 152, and j is reset to J in step 146. step 154 checks to see if i has reached the last row of the current grid box, I+X. If not, then the i-loop is repeated. This procedure continues until all pixel values have been computed. After all pixel values have been computed for the current grid box, step 158 advances I and J to process the next grid box, unless (step 156) the last grid box has already been processed.

If (step 158) the next grid column index, J+Y, exceeds the horizontal image resolution, jmax, then J is reset to zero and the row index, I, is advanced by X. Otherwise (step 158) J is advanced by Y and I is left unchanged.

If Step 156 finds that both I+X and J+Y exceed the vertical and horizontal image resolutions imax and jmax, respectively, signalling the last grid box, then the entire image has been computed, and the bilinear expansion procedure of FIG. 5 is terminated.

Figure 6:
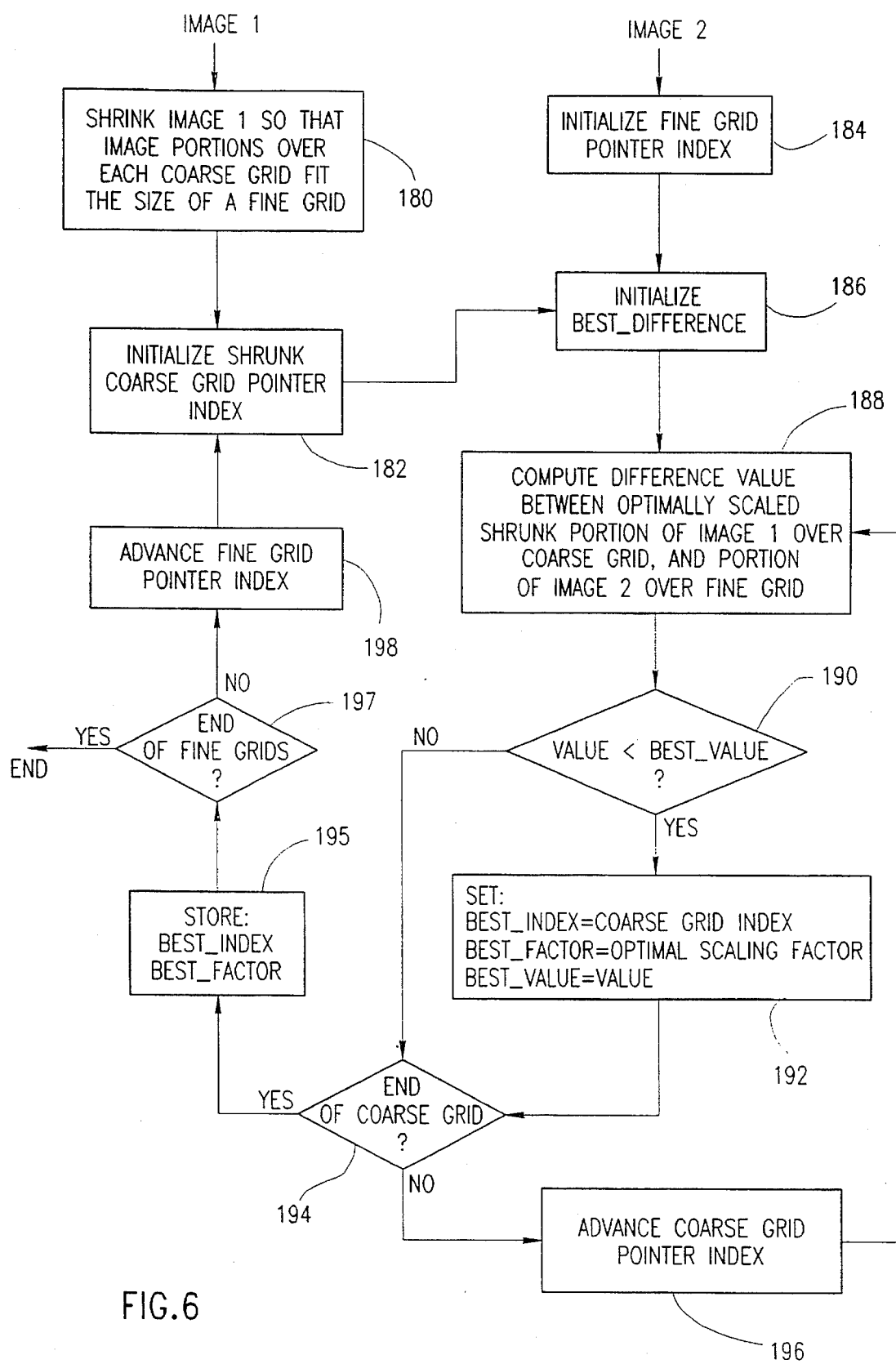
FIG. 6 is a simplified block diagram of a preferred implementation of any of the fractal-processor modules of FIGS. 4, 9, 11, 13, 15, 16, 19, 21, and 23 which operates on two images and produces optimized fractal parameters.

FIG. 6 illustrates a preferred implementation of fractal processor 110 of FIG. 4 and of any of the fractal-processor modules of FIGS. 9, 11, 13, 15, 16, 19, 21, and 23 described below. The fractal processor of FIG. 6 operates on two signal streams, or images, in the illustrated embodiment, and generates fractal parameters by comparing the two images. The two images, for the embodiment of FIG. 4, are the coarse and fine rough components of the original image.

The two digital images received by the fractal processor of FIG. 6 are referenced 1 and 2. The output of the fractal processor includes a plurality of fractal index and scale factor parameters, one index and one scale parameter per each fine grid box.

In step 180, image 1, partitioned into a coarse grid, is shrunk so that image portions over coarse grid boxes fit into the size of fine grid boxes. The operation of step 180 may be implemented by locally averaging together pixel values, so that the full set of pixel color values in each coarse box is replaced by a reduced set of averaged color values, the size of the reduced set being equal to the number of pixels in a fine grid box.

The result of the shrinking process is a plurality of image portions defined within fine grid boxes, referred to hereinbelow as shrunk coarse grid image portions, this plurality being equal in number to the total number of coarse grid boxes in the overall coarse grid partition. An address is assigned to each shrunk coarse grid image portion, and a coarse grid pointer which can take the value of any of these addresses is initialized in step 182.

In step 184, addresses are assigned to the plurality of portions of image 2 defined by the partitioning of image 2 by the fine grid.

A fine grid pointer which can take the value of any of these addresses is initialized in step 184.

The coarse grid image portions are then processed one at a time in steps 188, 190, 192, 194, 195 and 196. For each fine grid image portion, a search is conducted to determine which of the shrunk coarse grid image portions can best be fit to that fine grid portion.

Computationally, since the shrunk coarse grid and the fine grid image portions have the same dimensions, they can be regarded as multi-dimensional vectors in a common vector space. Since the Euclidean distance between two vectors is related to the angle between them, and since the fine grid image portion remains fixed during each search, searching is preferably based solely on the angle between the two vectors. Specifically, for each shrunk coarse grid portion C, step 188 computes a signed quantity, proportional to the cosine of this angle, equal to the scalar product F·C, divided by the length of C, where F is the current fine grid image portion being pointed to by the fine grid pointer.

If the magnitude of this signed value is larger than the best value identified so far (step 190), then step 192 stores the address for C into a temporary register. Step 192 also performs a least squares computation of a scale factor, which is then stored. The scale factor is equal to the signed value divided by the length of C once again. This scale factor corresponds to the least squares fit, and indicates how the so-far-best coarse grid portion can best be fit to the fine grid portion.

Unless the entire coarse grid has been traversed for the current fine grid box (step 194), the coarse grid pointer is advanced in step 196 and the search proceeds. At the end of each search, as determined by processor step 194, the index for the optimal shrunk coarse box image portion, C, and the corresponding factor are stored as fractal parameters for the current fine box portion F (step 195). Unless searches have been carried out for the last of the fine grid boxes (step 197), the fine grid pointer index is advanced (step 198), the coarse grid pointer index and best-difference parameter are initialized (steps 182 and 186), and the next search begins.

When all fine grid image portions have been processed, and their fractal indices and scale parameters recorded, the process terminates at step 197.

If it is desired to increase speed, step 194 can decide to terminate the search for the best coarse grid portion before these coarse grid portions have been exhaustively searched. Specifically, for each fine box, termination of the search for a best match can be based on any suitable criterion such as the following: a predetermined number of iterations; failure to improve the current value after a predetermined number of additional tests; failure to improve the current value beyond a predetermined improvement amount or improvement factor.

If the search for a best match is not exhaustive, the search may be carried out in a random or pseudorandom order, so that coarse grid portions over different parts of the image may be tested before the search terminates.

Figure 7:
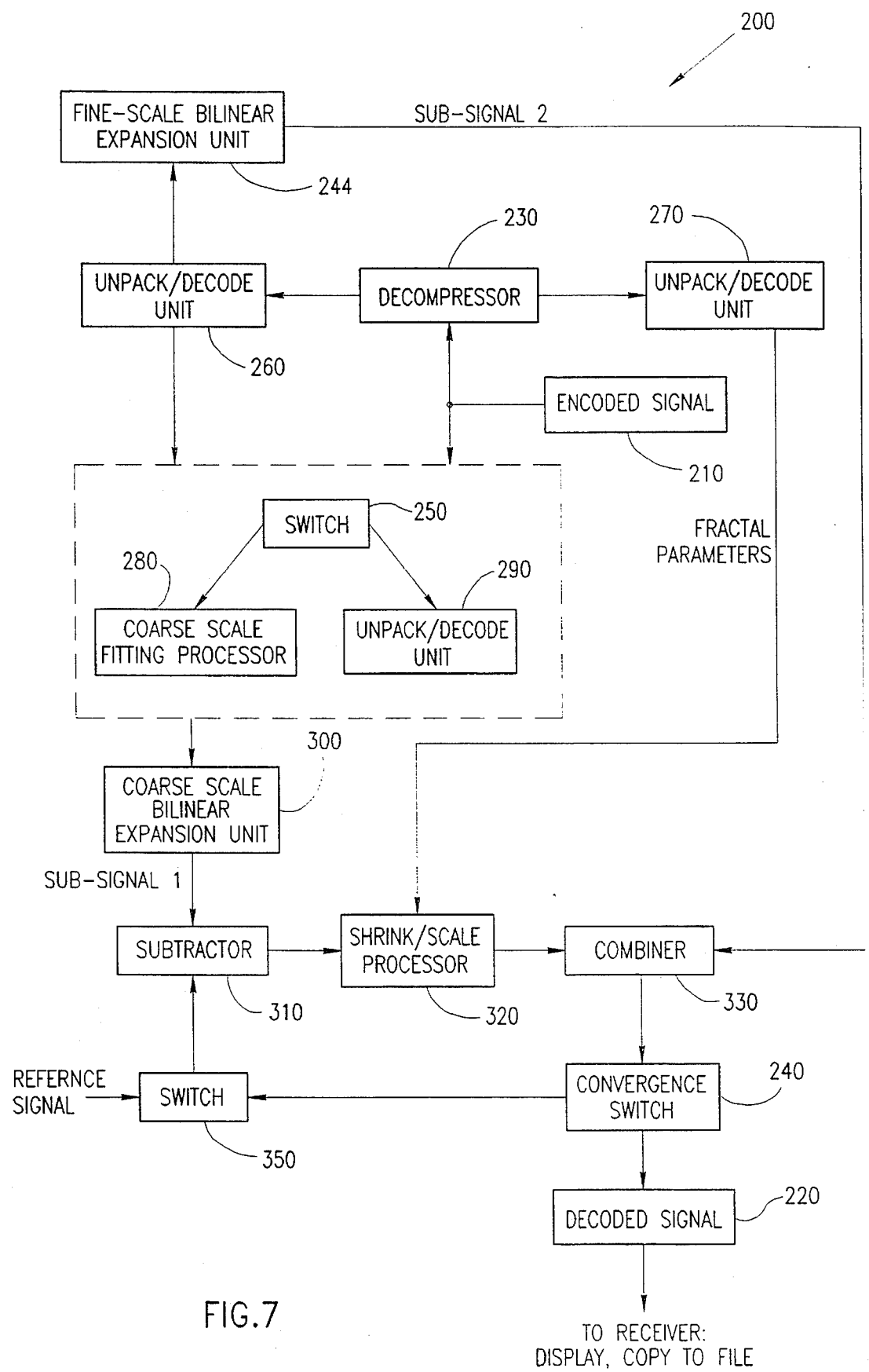
FIG. 7 is a simplified block diagram of a digital image decoder constructed and operative in accordance with a preferred embodiment of the present invention which is useful in decoding digital images encoded by the apparatus of FIG. 4.

FIG. 7 illustrates a decoder 200 constructed and operative in accordance with a preferred embodiment of the present invention which is useful for decoding an encoded signal 210 which was encoded by the apparatus of FIG. 4. The decoded signal file 220 is much larger in size than the input file 210, and is nearly identical to the original signal which is the precursor of encoded input file 210. Although the illustrated embodiment comprises a digital image decoder, it is appreciated that the apparatus of FIG. 7 has applications other than decoding of images.

The input signal 210 comprises three elements: two subsignals and a set of fractal index and multiplier parameters. To extract the two subsignals and the fractal parameters, input signal 210 is first decompressed by decompressor 230 which inverts the lossless compression algorithm used in the encoding process of FIG. 4. For example, if Huffman compression was used, the decompression process comprises a Huffman table look-up.

The first and second subsignals comprise approximations to the smooth image component on the coarse and fine scales, respectively. The first subsignal may be generated either directly from the encoded image or from the second subsignal, as described below.

To generate the second subsignal, unpack/decode unit 260 unpacks the fixed integer quantized data which was packed into bytes by processor 34 of FIG. 4, and approximately reconstructs the fine grid vertex values by applying inverse quantization. These values are then used by fine-scale bilinear expansion unit 244 to approximately reconstruct the fine-scale smooth image component (the second subsignal), by bilinear interpolation. Fine-scale bilinear expansion unit 244 may be substantially identical to unit 40 of FIG. 4 and is described in more detail above with reference to FIG. 5.

The first subsignal or coarse scale smooth component may be constructed either from the fine grid vertex values, or directly from the encoded signal itself, depending on whether or not the coarse and fine grid box dimension sizes are commensurate. Specifically, if the coarse grid box dimensions are exact integral multiples of the fine grid box dimensions, the coarse scale smooth component can be recovered from the fine scale smooth component.

Selection of the fine grid vertex input or the encoded signal input is preferably provided as indicated by switch 250. Switch 250 selects to pass through the fine grid vertex values coming from unpack/decode unit 260 if the fine and coarse grids are commensurate. Otherwise, the encoded signal is passed through switch 250. If the fine grid vertex values are selected, a coarse scale continuous piecewise bilinear fit processor 280 is employed which carries out a coarse scale continuous piecewise bilinear fit to calculate the coarse grid vertex values. The bilinear fit is carried out by averaging pixel values in vicinities of grid vertices, as was described for processor 60 of FIG. 4.

If the encoded signal is selected, a conventional unpacker and decoder 290 is employed which unpacks the encoded signal and inverse quantizes the coarse grid vertex values directly.

The vertex values supplied by unit 280 or unit 290 are then expanded by a coarse-scale bilinear expansion unit 300 into the coarse-scale smooth image component, which comprises the first subsignal.

The fractal index and multiplier parameters are unpacked and inverse quantized by an unpack/decode processor 270, directly from the encoded signal.

The two subsignals and fractal parameters now enter a decoding process in which subtracting, shrink/scaling and combining steps are performed at least once and preferably more than once. In the first repetition, a subtractor 310 receives a reference signal and subtracts from it the first subsignal, to generate a difference signal. The reference signal is any approximation to the original signal, such as the fine scale smooth component. Coarse grid box portions of the difference signal are shrunk by shrink/scale processor 320 so as to fit the size of the fine grid boxes.

The coarse grid box to be assigned to each fine grid box is determined by the fractal index of the fine grid box. The transformation to be applied to the shrunk difference signal portion in the assigned coarse grid box is determined by the fractal multiplier of the fine grid box. As explained above, the fractal index and multiplier parameters are generated by is unpack/decode unit 270. The shrink and scale processor 320 described in more detail below with reference to FIG. 8. The transformed shrunk difference signal portions, taken together, form a modified difference signal which is sent to a combiner 330 such as an adder. Combiner 330 adds or otherwise combines the modified difference signal and the second subsignal. A convergence switch 340 then decides whether to cycle back around for another repetition. The decision on whether to repeat may depend on whether a predetermined number of repetitions has been performed. Alternatively, the decision on whether to repeat may depend on whether the output signal from combiner 330 has sufficiently stabilized. Normally, successive outputs from combiner 330 ultimately converge as the cycles of steps 310, 320 and 330 are repeated. This is because the overall signal transformation represented by these three steps forms a contractive transformation. Repetitions of such transformations normally converge to a unique fixed point.

If another repetition is performed, the first subsignal is subtracted from the combined signal generated by combiner 330. Otherwise, the combined signal may be supplied directly to a receiver for display, e.g. on a computer screen, and/or for copying to a file.

In the initial repetition, switch 350 passes through the reference signal. In subsequent repetitions, switch 350 passes through the output signal generated by combiner 330.

Figure 8:
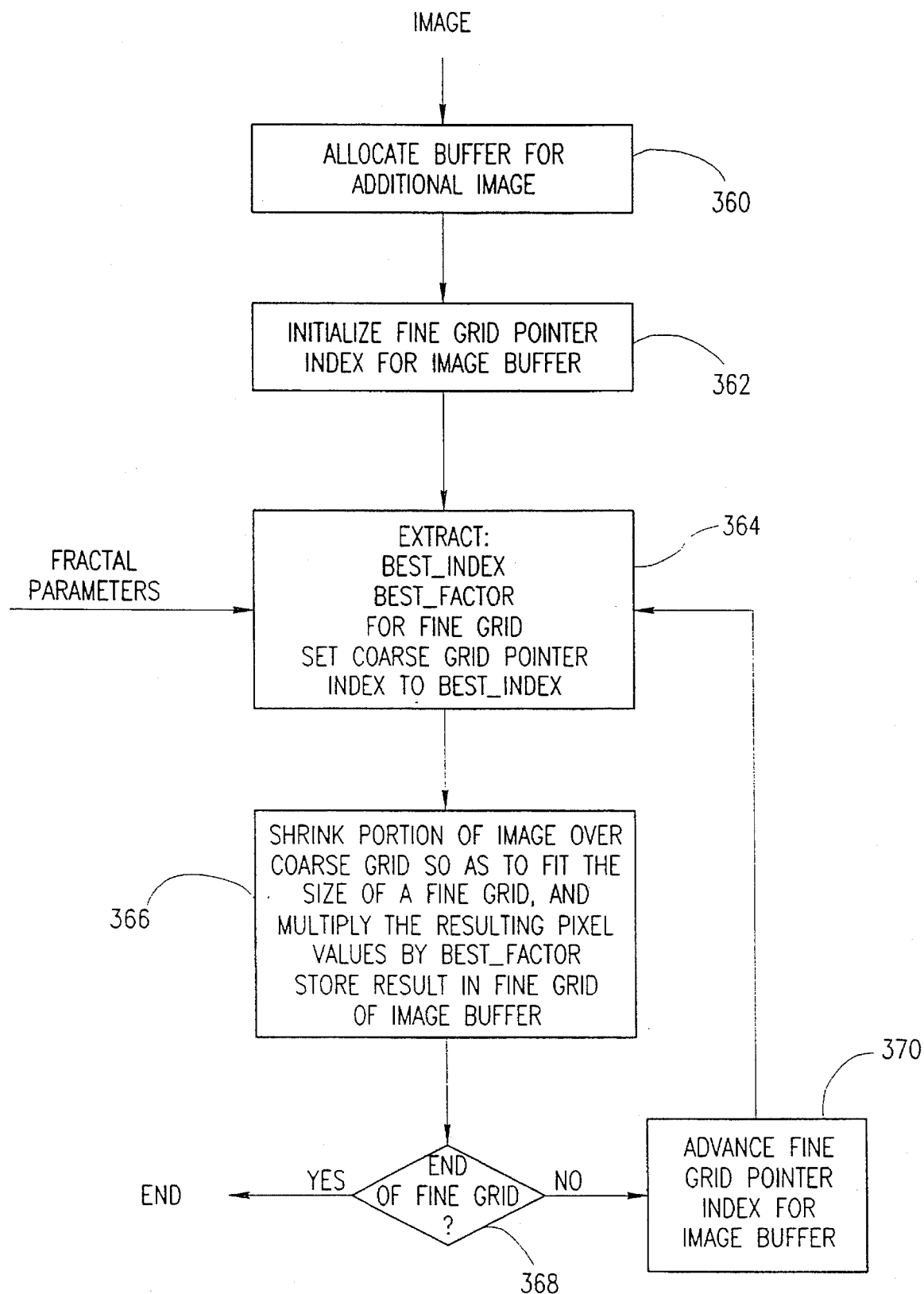
FIG. 8 is a simplified block diagram of a preferred implementation of any of the shrink/scale modules of FIGS. 7, 10, 12, 14, 17, 18, 20, 22, and 24 which performs a plurality of linear modifications on a first image or signal and generates a second image or signal.

FIG. 8 illustrates a preferred implementation of shrink/scale unit 320 of FIG. 7 and also of any of the shrink/scale modules of FIGS. 10, 12, 14, 17, 18, 20, 22, and 24. The shrink/scale module of FIG. 8 performs a plurality of linear modifications on a first image or signal and generates a second image or signal.

The shrink/scale module accepts as input a digital image and a plurality of fractal index and scale parameters, one index and one scale parameter per each fine box in a fine grid partition, and produces as output another digital image, of the same dimensions. The second image represents a multiply shrunk and scaled version of the first image. In other words, the relationship between the first and second images is similar to the relationship between FIGS. 3B and 3C.

The method of FIG. 8 employs an input or first image which is partitioned into a coarse grid.

In step 360 a buffer is allocated for storing the output or second image as it is generated. The buffer is partitioned into a fine grid, in order to generate fine grid portions of the output image one at a time. Step 362 initializes a pointer to the first fine grid in the buffer area. Step 364 reads the index and scale factor corresponding to the fine grid currently pointed to, and sets a coarse grid pointer to that index. Step 366 shrinks the coarse box portion of the input image currently pointed to by the coarse grid pointer, to the size of a fine grid box, unless, as explained below, it has already been shrunk at an earlier stage.

Shrinking of the coarse grid portion may be implemented by locally averaging together pixel values, so that the full set of pixel color values in each coarse box is replaced by a reduced set of averaged color values, the size of the reduced set being equal to the number of pixels in a fine grid box.

Preferably, once the coarse box portion of the input image is shrunk, a flag is set so that, if a later index points to the same coarse box, the shrinking process need not be repeated.

The shrunken coarse box portion is then scaled, by multiplying each pixel value by best factor, as extracted in step 364. The result of the shrinking and scaling processes is a new image portion having the same dimensions as a fine box. This result is stored in the empty fine box in the image buffer which is being pointed to by the fine grid pointer.

Unless all fine grid boxes have been filled (step 368), step 370 advances the fine grid pointer to the next fine box, and the flow returns to step 364 which extracts the fractal index and scale parameter for that box.

Once the buffer image is complete (step 368), the image in the buffer is shipped as the output image.

Figure 9:
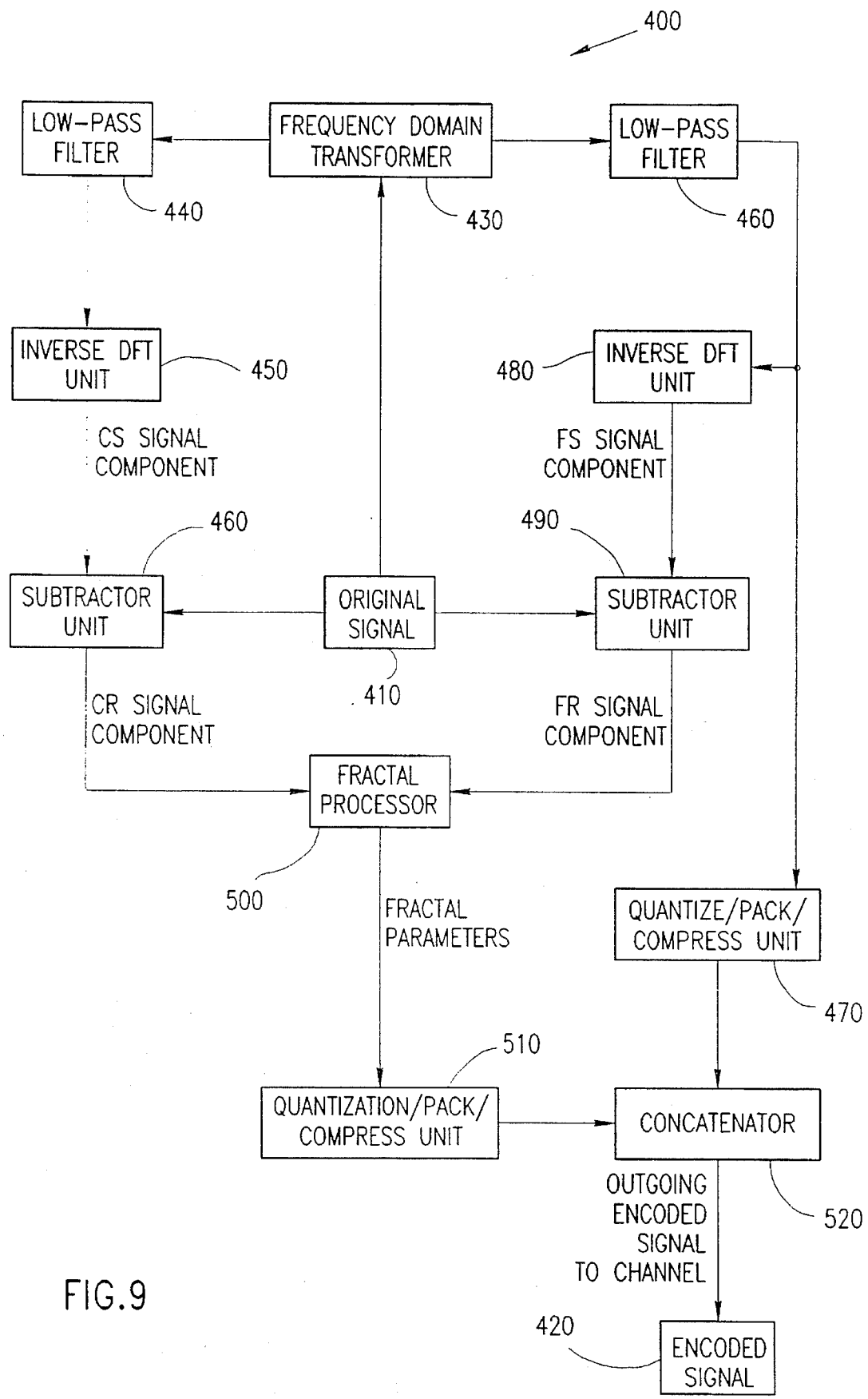
FIG. 9 is a simplified block diagram of a signal encoder constructed and operative in accordance with a preferred embodiment of the present invention which employs a Discrete Fourier Transform for low-pass filtering and which is useful for audio compression (1-D) as well as for image compression.

Reference is now made to FIG. 9 which illustrates an audio signal encoder 400 constructed and operative in accordance with a further preferred embodiment of the present invention, which employs a Discrete Fourier Transform for low-pass filtering and which is useful for audio compression.

Audio encoder 400 receives an input file 410 storing an original audio signal and produces an output file 420 which stores an encoded audio signal. The output file is much smaller in size than the input file. Typically, the incoming audio signal is segmented into windows as it is being generated, each window including approximately one second of digital audio samples. Each window is processed separately, rather than waiting until the entire audio signal is captured before beginning the encoding.

The original signal read from input file 410 is transformed to a frequency domain by a frequency domain transformer 430. The frequency domain transformer may comprise a Discrete Fourier Transform (DFT) operator. Discrete Fourier Transforms are described by Oppenheim, A. V. and Schafer, R. W. in "Discrete-Time Signal Processing", Prentice-Hall, Englewood Cliffs, N.J., 1989, the disclosure of which is incorporated herein by reference.

The transform goes up to a frequency which is half of the total number of samples being encoded, according to the Nyquist sampling rate. A low-pass filter 440 zeroes out all Fourier coefficients for frequencies beyond a cutoff frequency f1, along with their conjugates. The cutoff frequency f1 is chosen to equal half the number of coarse scale grid vertices. An inverse DFT processor 450 transforms the cutoff signal back into the temporal domain, thereby generating the coarse-scale smooth component of the audio signal to be encoded. The coarse-scale smooth component is then subtracted from the original signal by a subtractor 460 in order to generate the coarse-scale rough signal component.

Similarly, the DFT generated by DFT processor 430 is received by low-pass filter 460 which zeroes out all Fourier coefficients for frequencies beyond a cut-off frequency f2, along with their conjugates. The cut-off frequency f2 equals half the number of fine scale vertices.

An inverse DFT unit 480 transforms the cutoff signal back into the temporal domain, the transformed signal constituting the smooth signal component on the fine scale. The fine-scale smooth component is then subtracted from the original signal by a subtractor unit 490, thereby to generate the fine-scale rough component of the audio signal.

The low frequency coefficients not filtered by filter 460 are received by a quantize/pack/compress unit 470 which is operative to quantize the low frequency components into fixed bit integers, pack them into bytes and then compress them using a lossless compression algorithm, such as Huffman compression.

The fine-scale and coarse-scale rough components are then input to a fractal processor 500, which conducts a search for an optimal coarse to fine match-up between the two rough components. Fractal processor 500 may be substantially identical to the fractal processor of FIG. 4 as described in detail above with reference to FIG. 6. (The fractal index and multiplier parameters generated by fractal processor 500 are provided to a quantize/pack/compress unit 510 where they are quantized, packed into bytes and losslessly compressed).

The parameters are then merged by a concatenator 520 with the compressed low frequency provided by unit 470. The output of concatenator 520 is stored in the output file 420.

Figure 10:
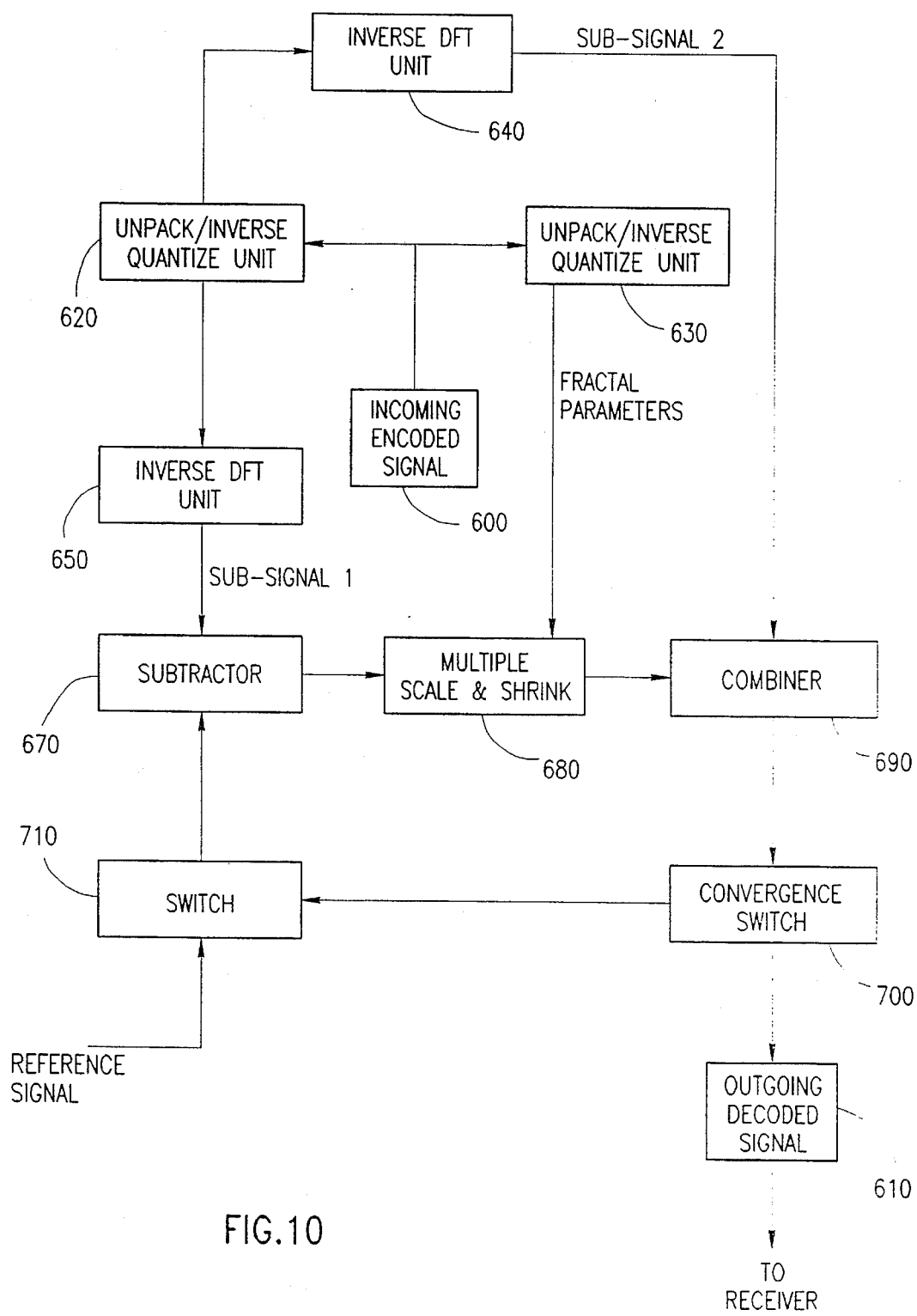
FIG. 10 is a simplified block diagram of a signal decoder constructed and operative in accordance with a preferred embodiment of the present invention which is useful in decoding signals encoded by the apparatus of FIG. 9.

FIG. 10 illustrates a signal decoder which is useful in decoding a signal 600 encoded by the encoder of FIG. 9, such as, in the illustrated embodiment, an audio signal. The decoded signal 610 generated by the signal decoder of FIG. 10 may be displayed and/or copied to an output file. The decoded signal 610 is nearly identical to the original signal 410, and the output file size is much larger than the encoded file size.

The encoded signal is first decompressed by inverting the lossless compression used in the encoder of FIG. 9. The components of encoded signal 600, namely subsignals 1 and 2, and the fractal parameters, are recovered separately. Specifically, the encoded signal is split into first and second subsignals which are unpacked and inverse quantized by unit 620, and into packed quantized fractal parameters which are unpacked and inverse quantized by unit 630.

Processor 620 unpacks and inverse quantizes the quantized Fourier frequency coefficients contained in encoded signal 600 and applies inverse quantization to approximately reconstruct these coefficients. Inverse DFT unit 640 receives the reconstructed Fourier frequency coefficients and applies an inverse DFT thereto so as to generate subsignal 2, which approximately reconstructs the low-pass cutoff of the original signal having cutoff frequency f2.

Similarly an inverse DFT is applied by unit 650 to those Fourier coefficients corresponding to frequencies below f1, with the higher frequency coefficients zeroed out, thereby to generate subsignal 1. Subsignal 1 approximately reconstructs the low-pass cutoff of the original signal with cutoff frequency f1.

At this point the decoding loop steps of subtracting, performing and combining are carried out at least once and, preferably, are repeated at least once, until a predetermined stopping criterion has been arrived at. Specifically, subsignal 1, supplied by unit 650, is preferably subtracted from a reference signal, such as sub-signal f2, by subtractor 670. The reference signal is any approximation to the original signal, such as the fine scale smooth component. Coarse grid portions of the resulting difference signal are shrunk and multiplied by unit 680 in accordance with the fractal parameters provided by unit 630.

A modified difference signal is constructed by looking up, for each fine box, the coarse box address for that fine box, contained in the fractal parameters, and then defining the portion of the modified signal in that fine box to be the shrunk, multiplied coarse box portion located at that coarse box address. This multiple shrink and scale operation is similar to the operation of unit 320 in FIG. 7, and may be carried out in accordance with the procedure illustrated above in FIG. 8. The output of unit 680, namely the modified difference signal, is added or otherwise combined, in combiner 690, to the second subsignal generated by unit 640.

A convergence switch 700 decides whether to accept the output from combiner 690 as the decoded signal, using a predetermined stopping criterion, or to carry out an additional cycle of subtract, perform (shrink/scale) and combine steps. The predetermined stopping criterion may, for example, take into account the degree of convergence of the output of combiner 690 over successive cycles. Once the output has substantially converged, the cycle need not be further repeated.

Switch 710 provides for subtraction of subsignal 1 from the reference signal in the first repetition of the cycle, and for subtraction of subsignal 1 from the output of combiner 640 of the previous repetition of the cycle, for all but the first repetition of the cycle.

Preferably, the audio signal is encoded and decoded in window segments of, for example, one second digital samples at a time. In this case, when convergence switch 700 copies the combined signal coming out of combiner 690 to an output file, it associates with the combined signal a tag indicating a window number. Thereby, the individual combined signal can be sequenced with the combined signals generated for other windows, and the entire audio signal can be played back in correct sequence.

Figure 11:
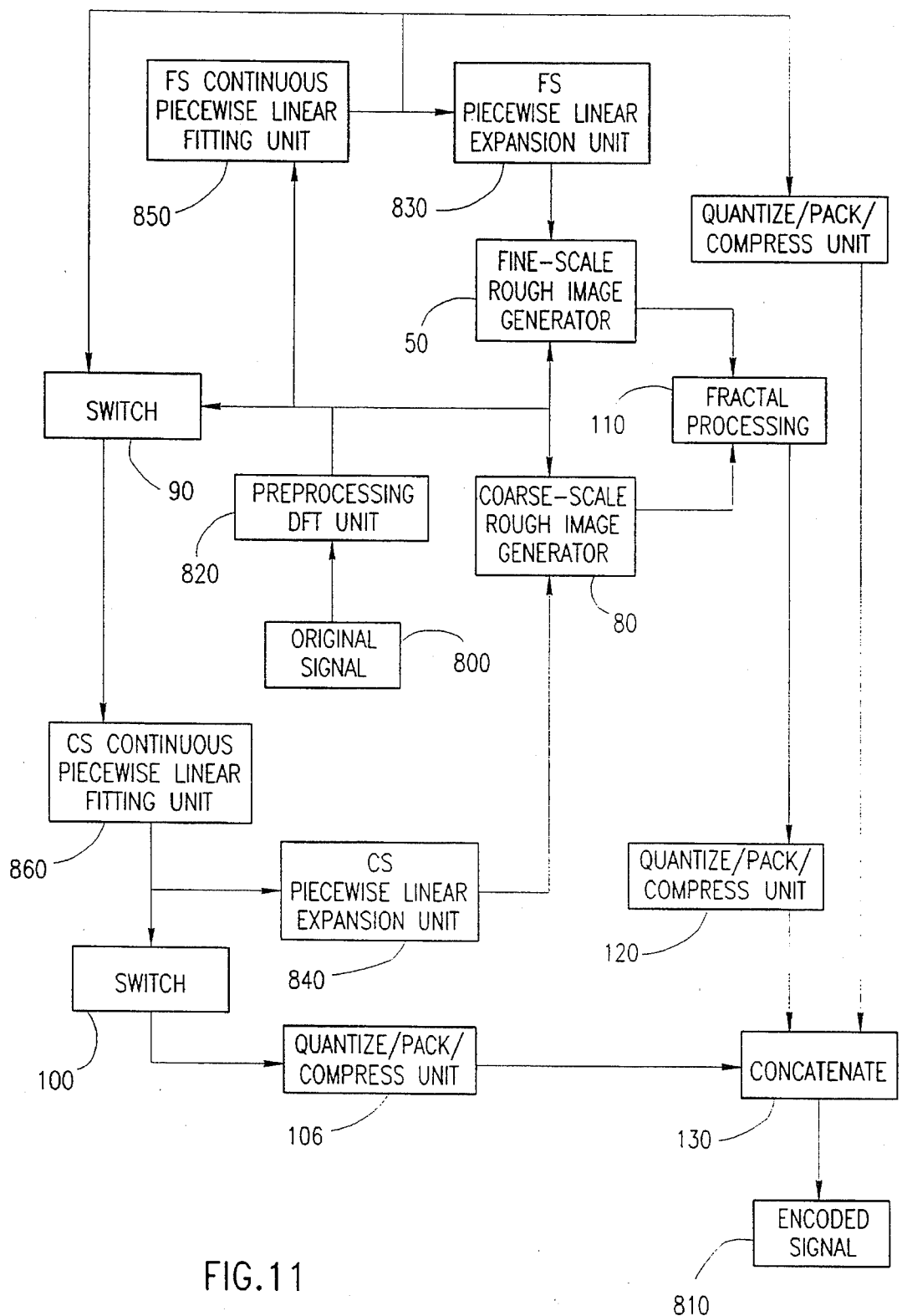
FIG. 11 is a simplified block diagram of a signal encoder constructed and operative in accordance with a preferred embodiment of the present invention which employs a Discrete Fourier Transform to transform an original signal to a frequency domain and then encodes the transformed signal, the encoder being useful for both 1-D audio compression and 2-D image compression.

FIG. 11 illustrates a digital signal encoder such as, in the illustrated embodiment, an audio encoder, which employs a Discrete Fourier Transform to transform an original signal to a frequency domain and then encodes the transformed signal. The encoder of FIG. 11 is useful for both 1-D audio compression and 2-D image compression.

The input to the apparatus of FIG. 11 comprises a file 800 containing an original digital signal. The output of the apparatus of FIG. 11 is a file 810 containing an encoded digital signal, where the output file size is much smaller than the input file size.

Within the frequency domain, the operation of the encoder of FIG. 11 is similar to the operation of the encoder of FIG. 4 within the spatial domain and therefore, similarly operating elements here and in FIG. 4 bear identical reference numerals for convenience. However, the apparatus of FIG. 11 includes a preprocessing DFT unit 820 which transforms incoming signal 800 over to the frequency domain. In other words, the encoded data in FIG. 11 is the Discrete Fourier Transform of the audio signal.

Another difference between the embodiments of FIGS. 4 and 11 is that piecewise bilinear expansion units 40 and 70 of FIG. 4 are replaced in FIG. 11 by piecewise linear expansion units 830 and 840, respectively. Similarly, continuous piecewise bilinear fitting units 30 and 60 of FIG. 4 are respectively replaced in FIG. 11 by continuous piecewise linear fitting units 850 and 860.

Figure 12:
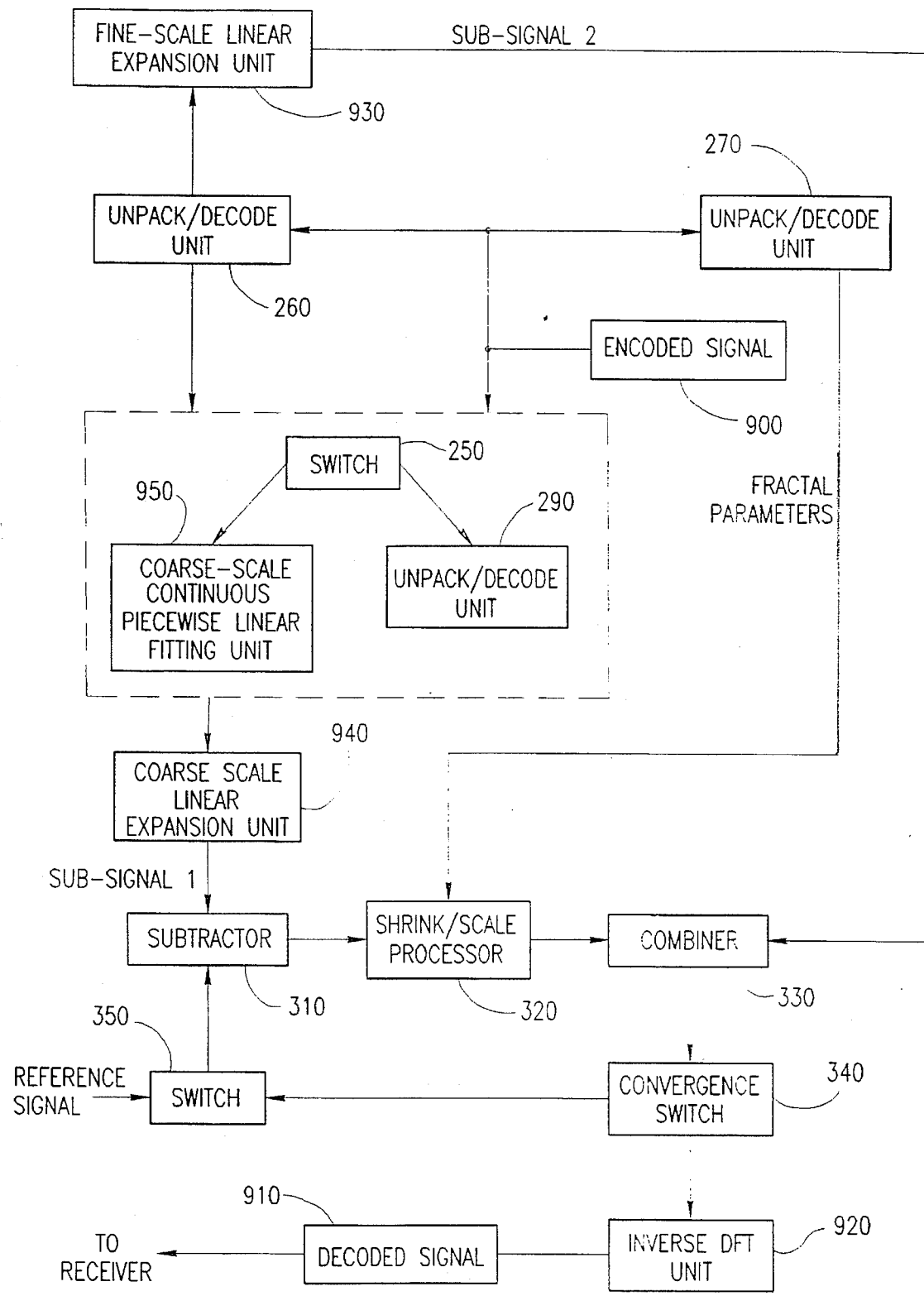
FIG. 12 is a simplified block diagram of a signal decoder constructed and operative in accordance with a preferred embodiment of the present invention which is useful in decoding signals encoded by the apparatus of FIG. 11.

FIG. 12 illustrates a digital signal decoder which is useful in decoding signals encoded by the apparatus of FIG. 11. The apparatus of FIG. 12 receives an input file 900 which contains an encoded signal and generates a decoded signal 910 which may be written to a file and/or, if audio, played on an audio system. The FIG. 12 decoder operates, within a frequency domain, similarly to the operation of the decoder of FIG. 7 within the spatial domain. Therefore, similarly operating elements bear identical reference numerals for convenience. However, the apparatus of FIG. 12 includes an additional post-processing unit 920 which transforms input thereto out of the frequency domain, using an inverse DFT.

Another difference between the embodiments of FIGS. 7 and 12 is that piecewise bilinear expansion units 244 and 300 of FIG. 7 are replaced in FIG. 12 by piecewise linear expansion units 930 and 940, respectively. Similarly, continuous piecewise bilinear fitting unit 280 of FIG. 7 is replaced in FIG. 12 by continuous piecewise linear fitting unit 950.

Figure 13:
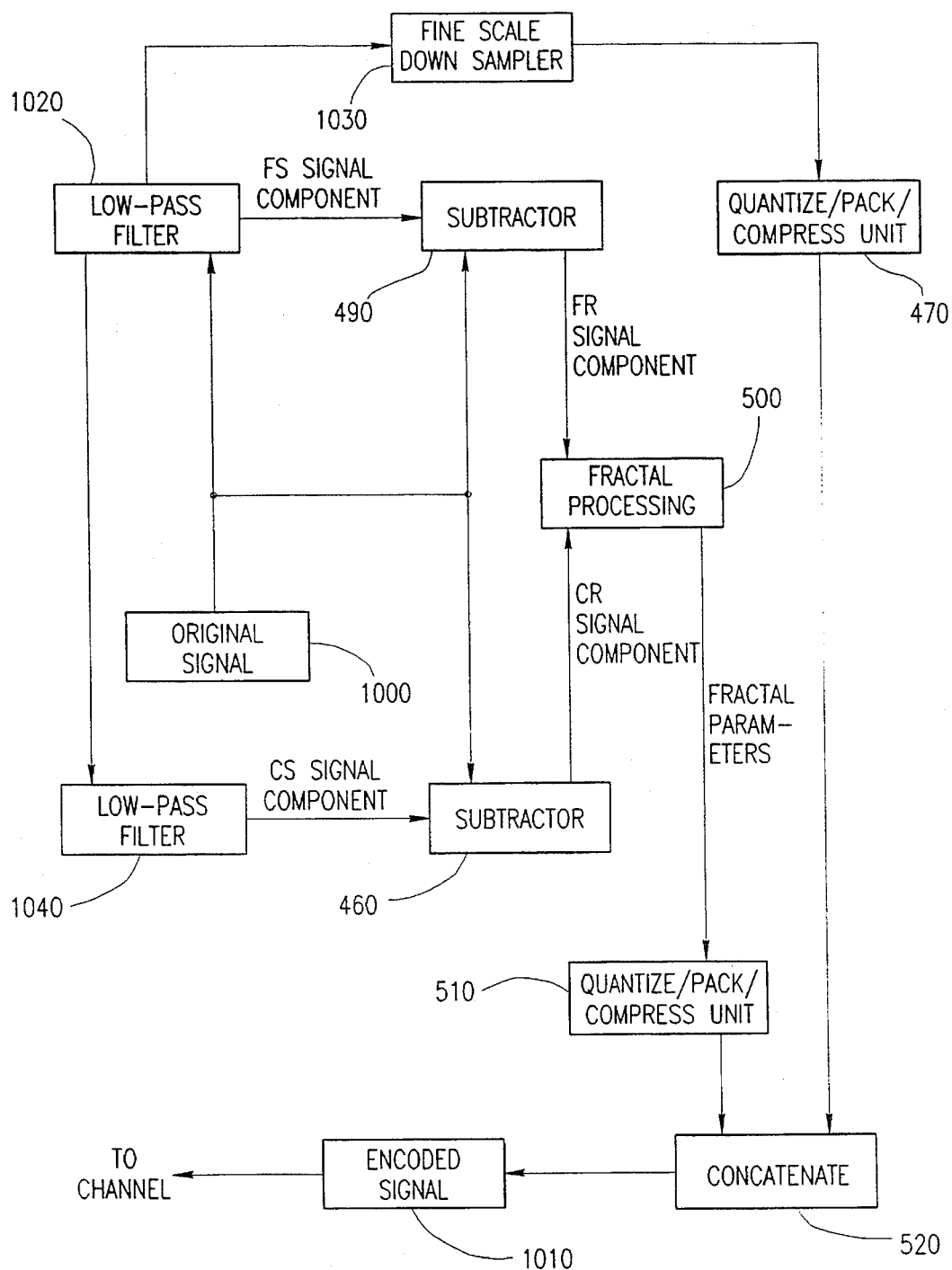
FIG. 13 is a simplified block diagram of a signal encoder employing sub-band splitting which is constructed and operative in accordance with a preferred embodiment of the present invention and which defines a smooth part of a signal using a low-pass filter and then down-samples the smooth part for storage in the encoded file.

FIG. 13 illustrates a digital signal encoder employing sub-band splitting, which defines a smooth part of a signal using a low-pass filter and then down-samples the smooth part for storage in the encoded file.

The apparatus of FIG. 13 accepts as input a file 1000 containing an original digital signal and generates as output a file 1010 containing an encoded digital signal, where the output file size is much smaller than the input file size. The encoder of FIG. 13 is similar to the encoder of FIG. 9, except that the low-pass filtering is carried out in the spatial/temporal domain.

For the fine grid, the smooth signal component is preferably computed directly in the spatial/temporal domain by low pass filter 1020, using convolution. A fine scale down sampler 1030 decimates the output of low pass filtering unit

1020, zeroing out all but the first value in each fine grid box, and sends for packing and storage only that one value per fine grid box.

For the coarse grid, the smooth signal component may be computed by low pass filter 1040 from the previously computed fine scale smooth component, by applying another low-pass filter thereto. This is the case if the fine and coarse grids are commensurate, such that the coarse scale smooth component can be obtained from the fine scale smooth component directly, obviating the need to separately pack and store the coarse scale smooth component. If the fine and coarse grids are not commensurate, then the coarse scale smooth component may be computed directly from the original signal 1000, by means of a low-pass filter adapted to the coarse grid, and may be stored in the outgoing encoded signal 1010.

The remaining units of FIG. 13 are similar in operation to the identically numbered units of FIG. 9.

Figure 14:
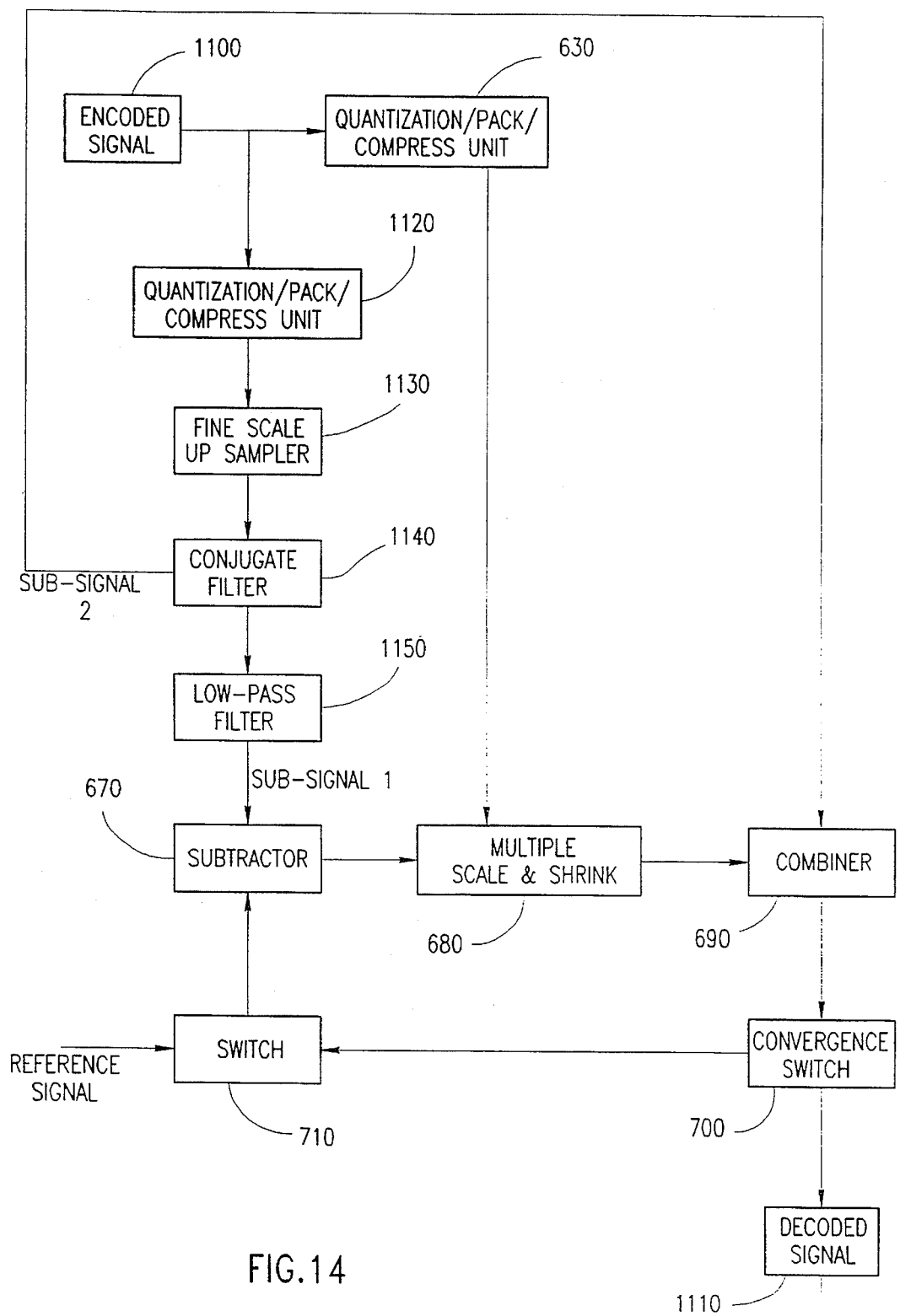
FIG. 14 is a simplified block diagram of a signal decoder constructed and operative in accordance with a preferred embodiment of the present invention which is useful in decoding signals encoded by the apparatus of FIG. 13.

FIG. 14 illustrates a digital signal decoder which is useful in decoding signals encoded by the apparatus of FIG. 13. The decoder of FIG. 14 receives an input file 1100 which contains an encoded signal and produces a decoded signal 1110 which may be played on an audio system or displayed on a computer screen, and/or written to an output file, depending on the application.

The decoder of FIG. 14 is similar to the decoder of FIG. 10, except that here, inverse filtering is carried out directly in the spatial/temporary domain. Specifically, quantization/pack/compress unit 1120 extracts a signal packed into signal 1100. An up sampler 1130 inflates the signal by filling in with zeros all signal values in locations where data was dropped by down sampler 1030, which was used to encode original signal 1000. That is, in all but one fixed location per fine grid box, for example, in all pixel locations except for the upper left pixel position in each fine box. A conjugate filter 1140 then operates on the inflated signal to construct subsignal 2, which represents an approximation to the fine scale low-pass filter for the original signal.

Subsignal 1, which represents an approximation to the coarse scale low-pass filter for the original signal, is extracted from subsignal 2 by applying a low-pass filter 1150 thereto. This operation assumes that the fine and coarse grids are commensurate such that the coarse scale filtered signal can be constructed directly from the fine scale filtered signal, without the need to use the original signal itself. If the fine and coarse grids are not commensurate, then subsignal 1 is typically included in encoded signal 1100 directly by the encoder in FIG. 13, and may be constructed here by direct extraction from encoded signal 1100.

The remaining units of FIG. 14 are similar in operation to the identically numbered units of FIG. 10.

Figure 15:
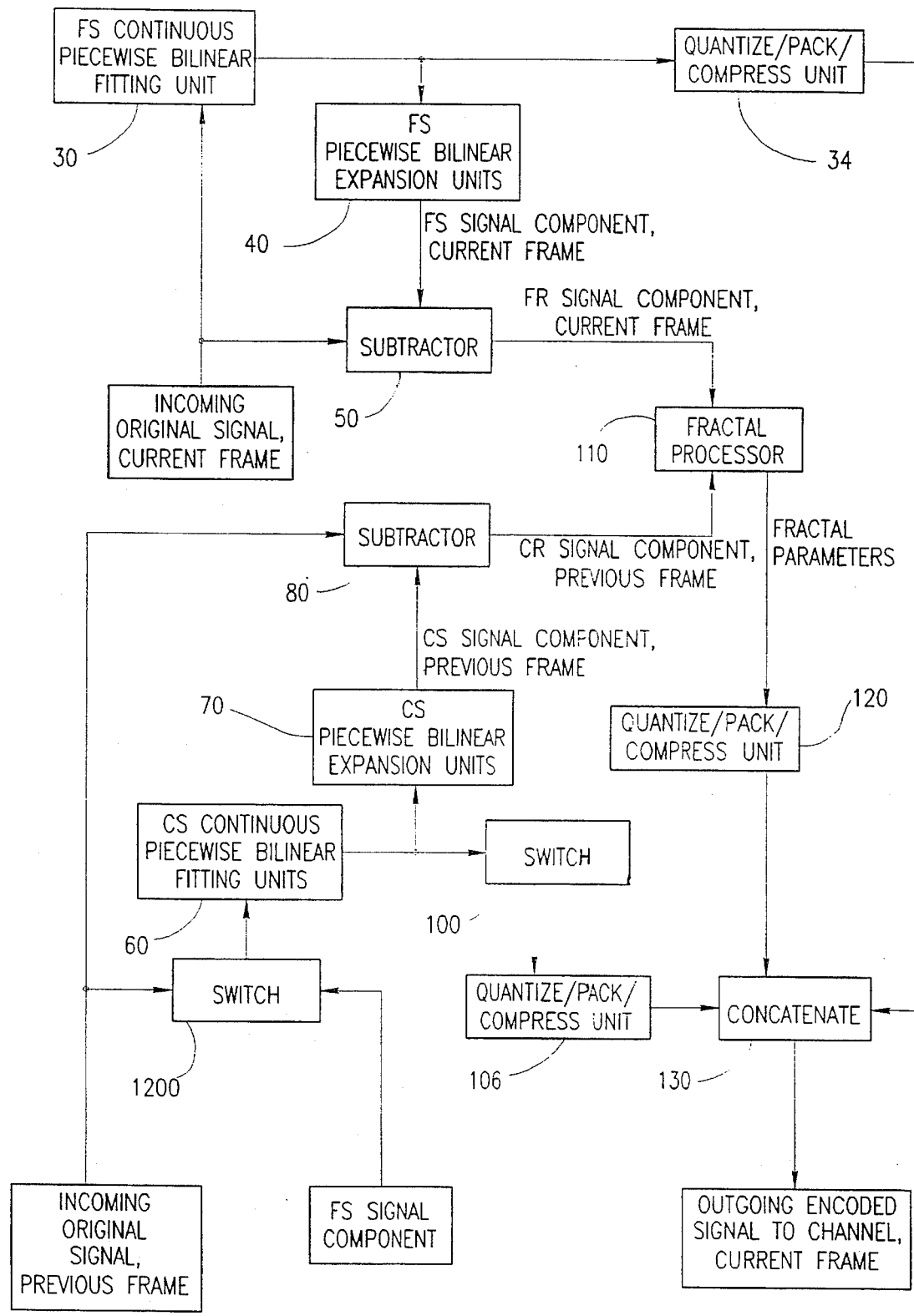
FIG. 15 is a simplified block diagram of a video encoder employing the averaging technique which is constructed and operative in accordance with a preferred embodiment of the present invention and which is a variation of the embodiment of FIG. 4 in that rough components on two scales come from two different frames.

Reference is now made to FIG. 15 which illustrates a video encoder employing the averaging technique shown and described above with reference to FIG. 4 which is a variation of the "still" encoder of FIG. 4 in that the rough components on the two scales come from two different frames. Components of the apparatus of FIG. 15 which are similar to corresponding components of the apparatus of FIG. 4 bear identical reference numbers for convenience.

The apparatus of FIG. 15 accepts as input a file containing a plurality of digital image frames, which may be generated by a frame grabber, and produces as output an encoded file for all of these frames. On a frame-by-frame basis its operation is similar to that of the digital image encoder of FIG. 4, except that the coarse scale image components entering fractal processor 110 come from a previous frame, whereas the fine scale components are constructed from the current frame.

When a frame is processed by the apparatus of FIG. 15, its smooth and rough image components on the coarse scale are computed using switch 1200, units 60 and 70, and subtractor 80 as in FIG. 4. However, the coarse scale components are temporarily stored for processing the next frame. Also, if the coarse and fine grids are not commensurate, in which case the coarse grid vertex values are to be included in the encoded file, then the coarse grid vertex values, computed by unit 60, are passed through by switch 100 and quantized, packed and losslessly compressed by unit 106.

When the next frame is processed, its rough component on the fine scale is fractal processed by processor 110 together with the stored coarse-scale rough component of the previous frame, to arrive at the optimal index and multiplier fractal parameters. The fine grid vertex values for the current frame, the fractal parameters, and, typically, if the fine and coarse grids are not commensurate, the coarse grid vertex values, are quantized and packed into bytes. The bytes are compressed and merged in concatenator 130, and written to the encoded file for the current frame.

Figure 16:
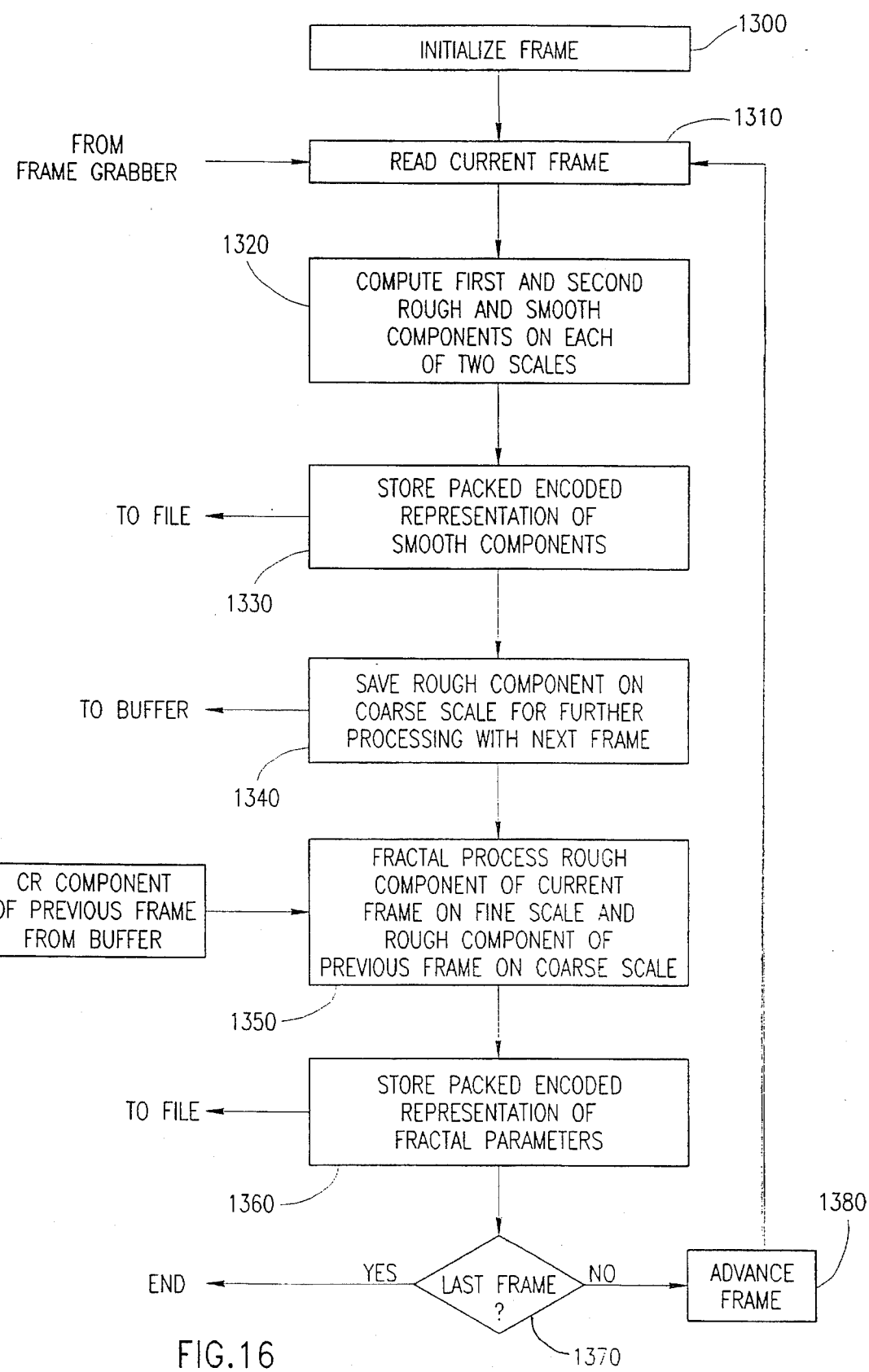
FIG. 16 is a simplified flowchart of a preferred method for video encoding for use by video encoders such as the video encoders of FIGS. 15, 19, 21 and 23.

FIG. 16 is a simplified flow chart of a preferred method for video encoding for use by the video encoder of FIG. 15, as well as by the video encoders described below with reference to FIGS. 19, 21 and 23.

In step 1300, a frame counter is initialized and basic grid dimension parameters are set. In step 1310, a frame grabber captures the first frame. The first frame is encoded as a still image. For each ensuing frame, the smooth and rough components of the frame are computed in step 1320 for both the coarse grid and the fine grid, as described above with reference to FIG. 15, and as described below with reference to FIGS. 19, 21 and 23.

In step 1330, the smooth and rough components are quantized, packed, losslessly compressed and written to an output file. In step 1340, the rough component on the coarse scale is also stored in a temporary buffer, for use in processing a subsequent frame. Step 1350 is a fractal processing step which conducts a match-up search between the fine scale rough image component of the current frame and the coarse scale rough image component of a previous frame which arrives from the temporary buffer.

Step 1360 quantizes the fractal multiplier data, packs it into bytes together with the fractal index data, losslessly compresses the data and writes it to the output file. Unless (step 1370) the current frame is the last video frame, step 1380 advances the frame counter and flow is passed back to step 1310 which grabs the next frame.

Figure 17:
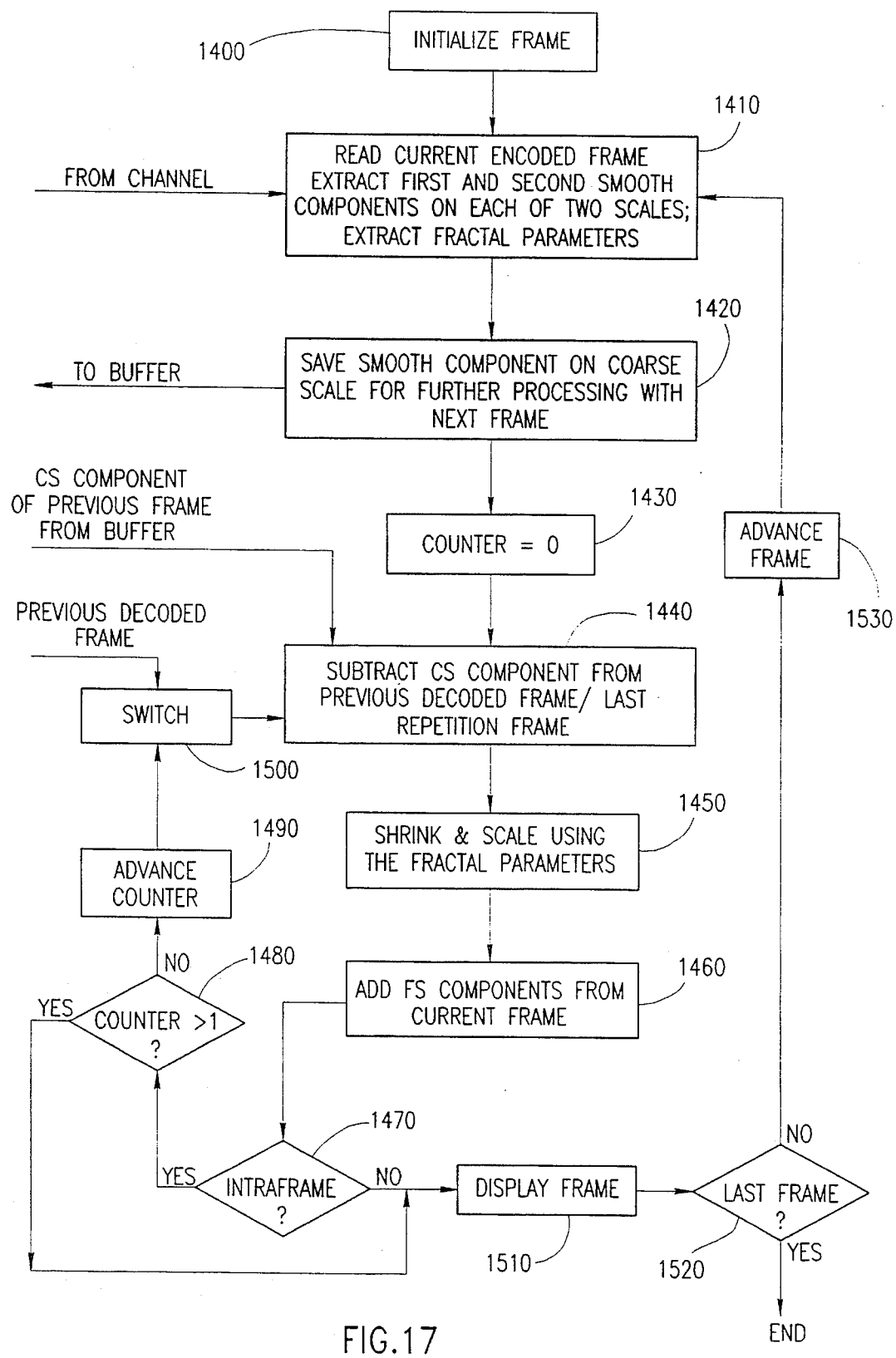
FIG. 17 is a simplified flowchart of a preferred method for video decoding for use by video decoders such as the video decoders of FIGS. 18, 20, 22 and 24.

FIG. 17 is a simplified flow chart of a preferred method for decoding of video signals encoded using the method of FIG. 16. The method of FIG. 17 is suitable for use by video decoders such as the video decoders described below with reference to FIGS. 18, 20, 22 and 24.

In step 1400, a frame counter is initialized and the basic grid dimension and intraframe parameters are set. The term "intraframe parameter" refers to how often a frame is encoded by itself or alone and not differentially from the previous frame. The first encoded frame is read in step 1410, and the coarse and fine scale smooth image components and fractal multiplier and index parameters for the encoded first frame are extracted.

The coarse scale smooth image component is written to a temporary buffer in step 1420, for later use with a subsequent frame.

The first encoded frame is decoded as a still image. For each ensuing frame, step 1430 initializes a decoding cycle counter and sets up two buffers for the decoding cycle. Step 1440 reads a previous frame's coarse scale smooth component from the temporary buffer and subtracts it from the decoded image corresponding to that frame, putting the difference into the first cycle buffer.

The difference image is then shrunk and multiply scaled in step 1450, using the scale factors from the fractal information, and the result is stored in the second cycle buffer, the fine box portions of the second buffer receiving the shrunk portions of the difference image pointed to by the corresponding addresses from the fractal information. This step is described in detail in FIG. 8 above. In step 1460, the current frame's fine scale smooth component is added to the image in the second cycle buffer.

If the current frame is an interframe, switch step 1470 then directs the resulting image to the display.

Otherwise, i.e. if the current frame is an intraframe, the decoding cycle is repeated, with flow control passed back to step 1440, and the roles of the two cycle buffers reversed by switch step 1500.

While the decoding cycle is being repeated, step 1440 subtracts the previous frame's coarse scale smooth component from the image coming out of step 1460, which now resides in the first cycle buffer.

Step 1480 controls the repetition of the decoding cycles by checking if the cycle counter exceeds one. Typically, three cycles are allowed.

As the cycles proceed, step 1490 advances the counter. If the counter is zero, switch 1500 passes through the decoded image from the previous frame. Otherwise, i.e. if the counter is nonzero, switch 1500 reverses the roles of the two cycle buffers, and then passes through the image in the first cycle buffer. After three cycles of decoding for the intraframes, the result is preferably displayed in step 1510.

Unless (step 1520) the current frame is the end of the video, step 1530 advances the frame counter and passes control back to step 1410, which reads the next encoded frame.

Figure 18:
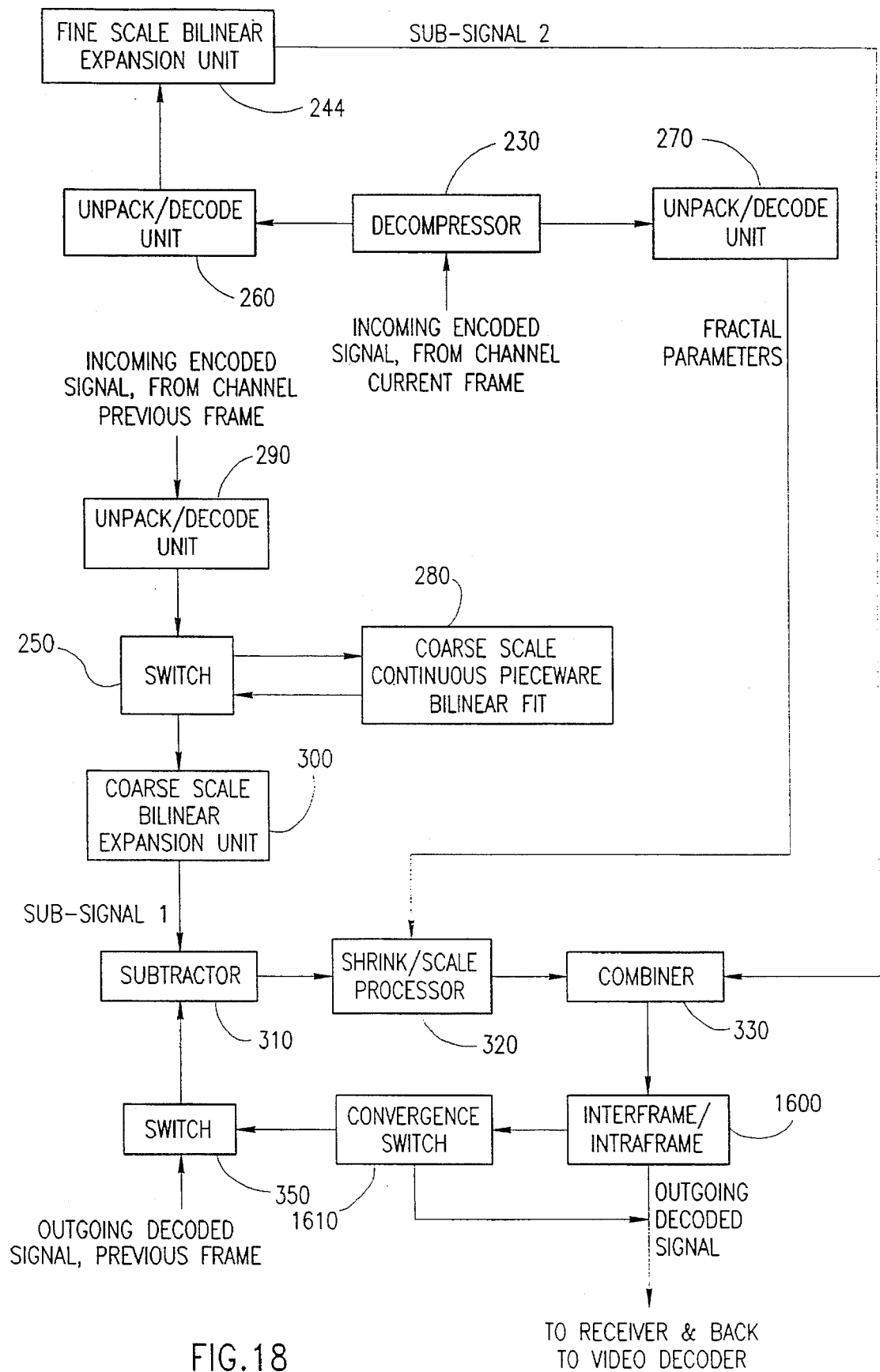
FIG. 18 is a simplified block diagram of a video decoder, which is constructed and operative in accordance with a preferred embodiment of the present invention and which is useful in decoding signals encoded by the apparatus of FIG. 15.

FIG. 18 illustrates a video decoder which is useful in decoding signals encoded by the apparatus of FIG. 15 and which may employ the decoding method of FIG. 17. The apparatus of FIG. 18 accepts as input an encoded video file for a plurality of frames, which may be produced by the video encoder of FIG. 15, and displays and/or copies to an output file the decoded video information. On a frame-by-frame basis it is similar to the still image decoder of FIG. 7, except for two differences which are described herein. For convenience, components of FIG. 18 which are similar to corresponding components of FIG. 7 bear identical reference numbers.

The first difference between the apparatus of FIGS. 7 and 18 is that, in FIG. 18, subsignal 1, which is subtracted in subtractor 310, comes from a previous frame whereas subsignal 2 comes from a current frame. If the fine and coarse grids are commensurate, the fine grid vertex values are extracted from the encoded file for a previous frame by unit 290, and then averaged by unit 280 to form the coarse grid vertex values. If the fine and coarse grids are not commensurate, unit 290 may extract the coarse grid vertex values directly from the encoded file for a previous frame.

The coarse grid vertex values are then bilinearly expanded by unit 300 to generate subsignal 1. Since subsignal 1 comes from a previous frame, the coarse grid vertex values are typically stored in a temporary buffer after extraction, for bilinear expansion when the next frame is processed.

The second difference between the decoders of FIGS. 7 and 18 is provision of an interframe/intraframe switch 1600 in FIG. 18. Depending on the video resolution, the decoder may or may not be able to keep up with the real-time rate of 30 frames/sec. If not, instead of dropping frames, the switch 1600 allows the decoder of FIG. 18 to process some frames more accurately then others.

Specifically, for intraframes, the decoder of FIG. 18 repeats the decoding step, the cycle being governed by a convergence switch 1610. For the interframes between the intraframes, the decoding cycle is carried out only once. This suffices because the reference signal coming into switch 350 is taken to be a decoded previous frame, which differs only slightly from the current frame, since the current and previous frames are typically only 1/30 second apart.

To implement this, the decoded signal which comes out of the decoder cycle is also sent back to switch 350, to be used as the initial image in the decoding cycle for the next frame, in addition to being displayed and/or written to an output file. Typically, intraframes are spaced 10 frames apart.

Figure 19:
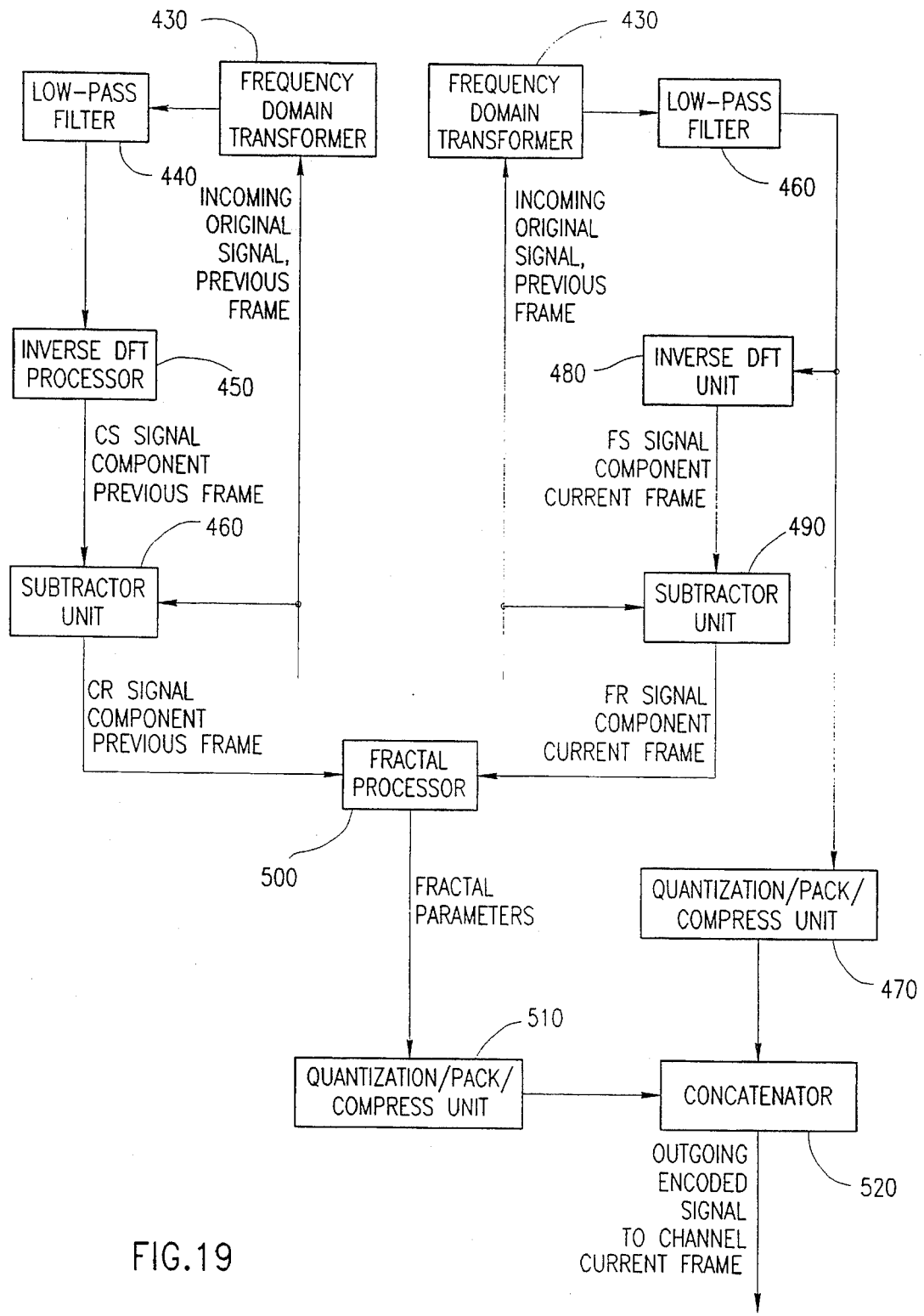
FIG. 19 is a simplified block diagram of a video encoder constructed and operative in accordance with a preferred embodiment of the present invention which employs a Discrete Fourier Transform to accomplish low-pass filtering and which is a modification of the embodiment of FIG. 9 in that low-pass filters at two cut-off frequencies operate on two different frames.

FIG. 19 illustrates a video encoder which employs a Discrete Fourier Transform to effect low-pass filtering and which is a modification of the embodiment of FIG. 9 in that low-pass filters at the two cut-off frequencies operate on two different frames. The apparatus of FIG. 19 accepts as input a file containing a plurality of digital image frames, produced with the aid of a frame grabber, and produces as output an encoded file for all of these frames. On a frame-by-frame basis its operation is similar to that of the digital image encoder described above with reference to FIG. 9, except that the coarse scale image components entering fractal processor 500 come from a previous frame. Components of the apparatus of FIG. 19 which are similar to corresponding components of the apparatus of FIG. 9 bear identical reference numbers, for convenience.

When a frame is processed by the apparatus of FIG. 19, its smooth and rough image components on the coarse scale are computed using DFT unit 430, low-pass filter 440 and inverse DFT unit 450 as in FIG. 9. However, the coarse scale components are temporarily stored for processing a next frame.

When the next frame is processed, its rough component on the fine scale is fractal processed by fractal processor 500 together with the stored coarse scale rough component of a previous frame. The result of the fractal processing comprises the optimal index and multiplier fractal parameters. The fine grid vertex values for the current frame, the fractal multiplier parameters and the fractal index parameters are quantized and packed into bytes. The bytes are compressed and merged in concatenator 520, and written to the encoded file for the current frame.

Figure 20:
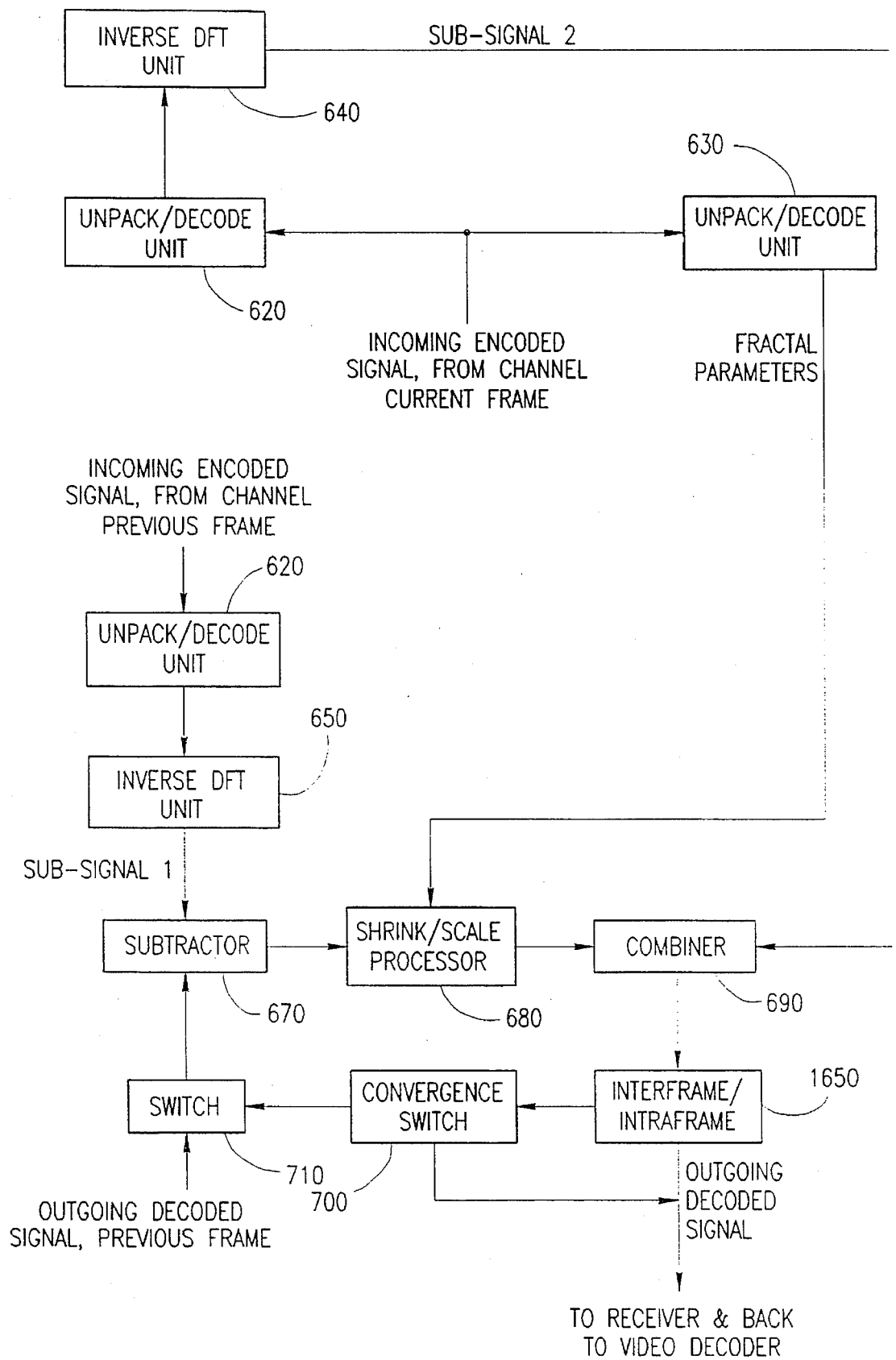
FIG. 20 is a simplified block diagram of a video decoder which is constructed and operative in accordance with a preferred embodiment of the present invention and which is useful in decoding signals encoded by the apparatus of FIG. 19.

Reference is now made to FIG. 20 which illustrates a video decoder which is useful in decoding signals encoded by the encoder of FIG. 19. The apparatus of FIG. 20 accepts as input an encoded video file for a plurality of frames, produced by the video encoder in FIG. 19, and displays the decoded video signals and/or copies them to an output file. On a frame-by-frame basis the operation of the apparatus of FIG. 20 is similar to the still image decoder described above with reference to FIG. 10 except for two differences which are described below. For convenience, components of FIG. 20 which are similar to corresponding components of FIG. 10 bear identical reference numbers.

The first difference between the decoders of FIGS. 10 and 20 is that, in FIG. 20, subsignal 1, which is subtracted in subtractor 670, comes from a previous frame whereas subsignal 2 comes from a current frame. Since subsignal 1 comes from a previous frame, it is necessary to store the Fourier low frequency coefficients extracted by unit 620 in a temporary buffer, to be inverse transformed by DFT unit 650 once the next frame is processed.

The second difference between the decoders of FIGS. 10 and is 20 is that, in FIG. 20, an interframe/intraframe switch 1650 provided, similar to the interframe/intraframe switch 1600 of FIG. 18. Each outgoing decoded frame is redirected back to switch 710, to be used as the initial image for the next frame's decoding cycle. The redirection makes it possible to progress with only one decoding cycle for reconstruction of the interframe images.

Figure 21:
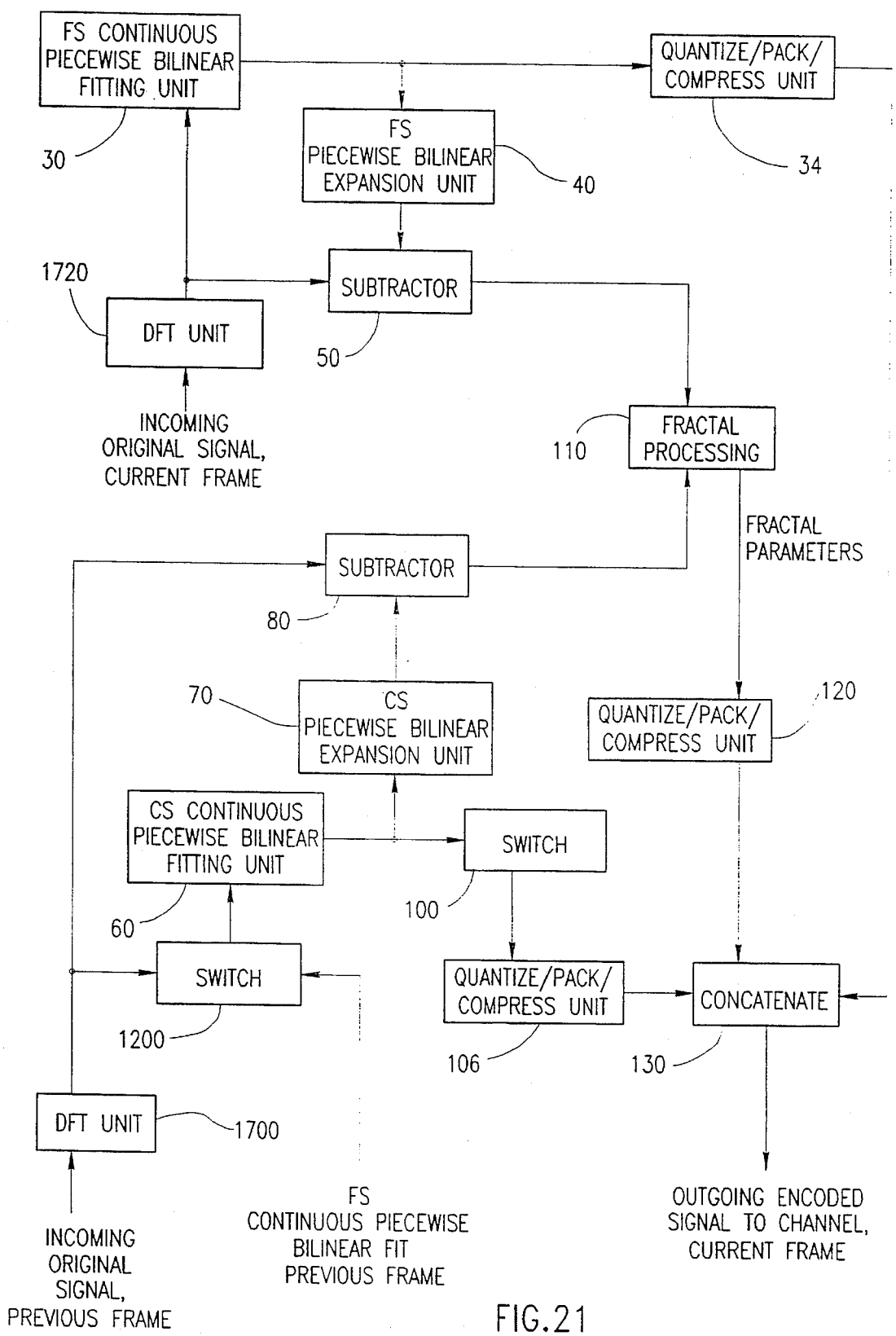
FIG. 21 is a simplified block diagram of a video encoder constructed and operative in accordance with a preferred embodiment of the present invention which uses a Discrete Fourier Transform to transform individual frames to a frequency domain and which is a modification of the apparatus of FIG. 11 in that smooth and rough fits on the two scales are applied to the transforms of two different frames.

FIG. 21 illustrates a video encoder which uses a Discrete Fourier Transform to transform individual frames to a frequency domain. The encoder of FIG. 21 is a modification of the still encoder described above with reference to FIG. 11 in that smooth and rough fits on the two scales are applied to the transforms of two different frames.

The encoder of FIG. 21 accepts as input a file containing a plurality of digital image frames which may be generated by a frame grabber. The output of the encoder of FIG. 21 comprises an encoded file for all frames. The operation of the video encoder of FIG. 21 in a frequency domain is similar to the operation of the video encoder in FIG. 15 in a spatial domain, and therefore, similar components in FIGS. 15 and 21 are identically numbered. However, in FIG. 21 additional preprocessing steps are provided for transforming over to the frequency domain. The frequency domain transformation is performed by a DFT unit 1700 for the coarse grid, and by a DFT unit 1720 for the fine grid.

Figure 22:
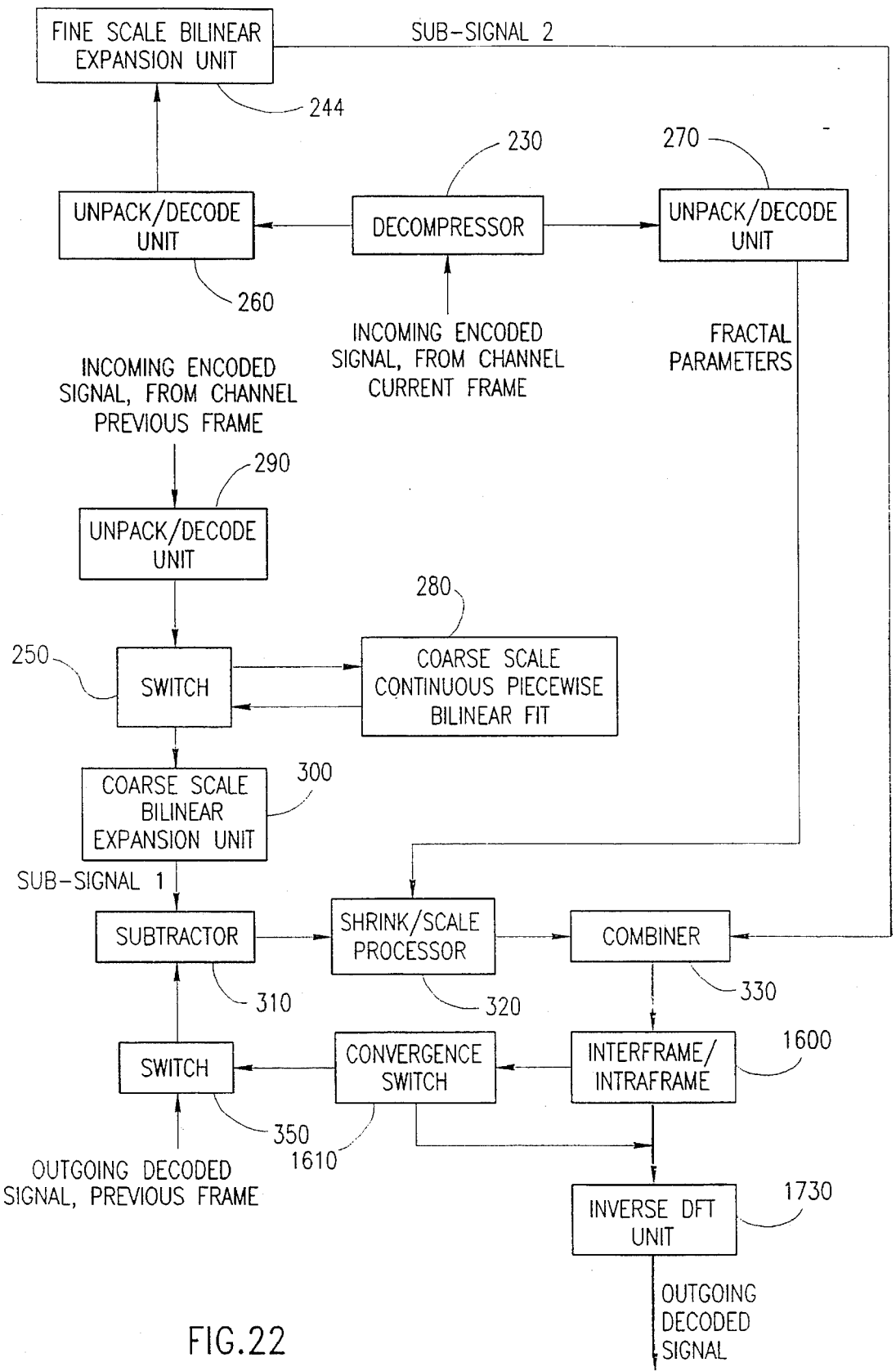
FIG. 22 is a simplified block diagram of a video decoder constructed and operative in accordance with a preferred embodiment of the present invention which is useful in decoding video data encoded by the apparatus of FIG. 21.

FIG. 22 illustrates a video decoder which is useful in decoding video data encoded by the apparatus of FIG. 21. The apparatus of FIG. 22 accepts as input an encoded video file for a plurality of frames which file may have been generated by the video encoder of FIG. 21. The apparatus of FIG. 22 generates a decoded video signal for display and/or for copying to an output file.

The operation of the video decoder of FIG. 22 in a frequency domain is similar to the operation of the video decoder shown and described above with reference to FIG. 18 in a spatial domain. Similar components in the decoders of FIGS. 18 and 22 are identically numbered. However, in FIG. 22, an additional post-processing step is provided, in which an inverse DFT unit 1730 transforms the decoded data out of the frequency domain.

Figure 23:
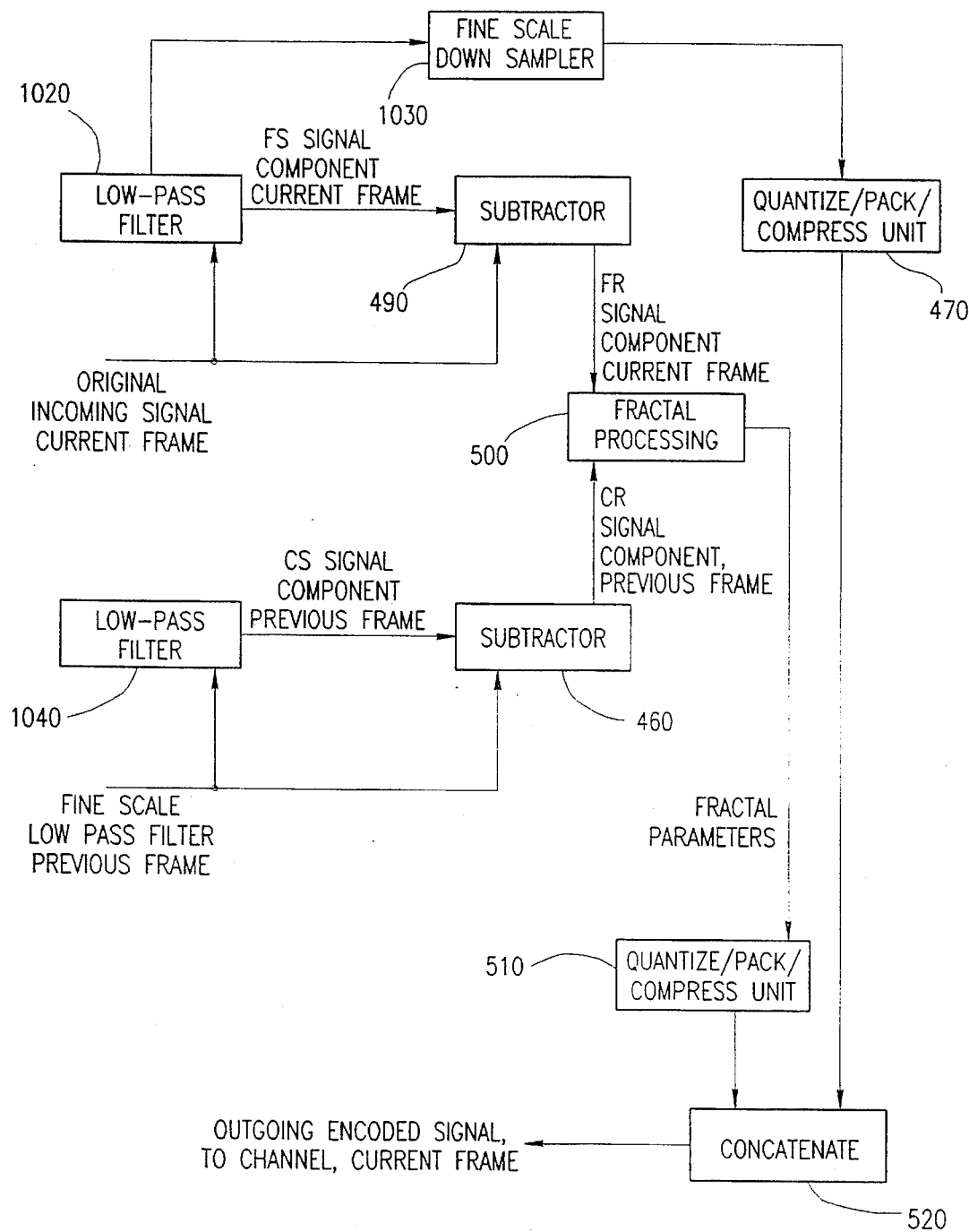
FIG. 23 is a simplified block diagram of a video encoder constructed and operative in accordance with a preferred embodiment of the present invention which uses sub-band splitting to define smooth and rough parts of a signal and which is a modification of FIG. 13 in that rough components on two scales come from different frames.

FIG. 23 illustrates a video encoder which uses subband splitting to define smooth and rough parts of a signal. The video encoder of FIG. 23 is similar to the still encoder described above with reference to FIG. 13. On a frame-by-frame basis, the encoder of FIG. 23 operates in the same manner, except that, in FIG. 23, the fine and rough components come from different frames. Thus the coarse scale image components entering fractal processor 500 come from a previous frame, whereas the fine scale components are constructed from the current frame. Components of FIG. 23 which are similar to corresponding components of FIG. 13 are identically numbered, for convenience.

The video encoder of FIG. 23 accepts as input a file containing a plurality of digital image frames, which may be generated by a frame grabber. The output of the video encoder of FIG. 23 comprises an encoded file for all frames.

Figure 24:
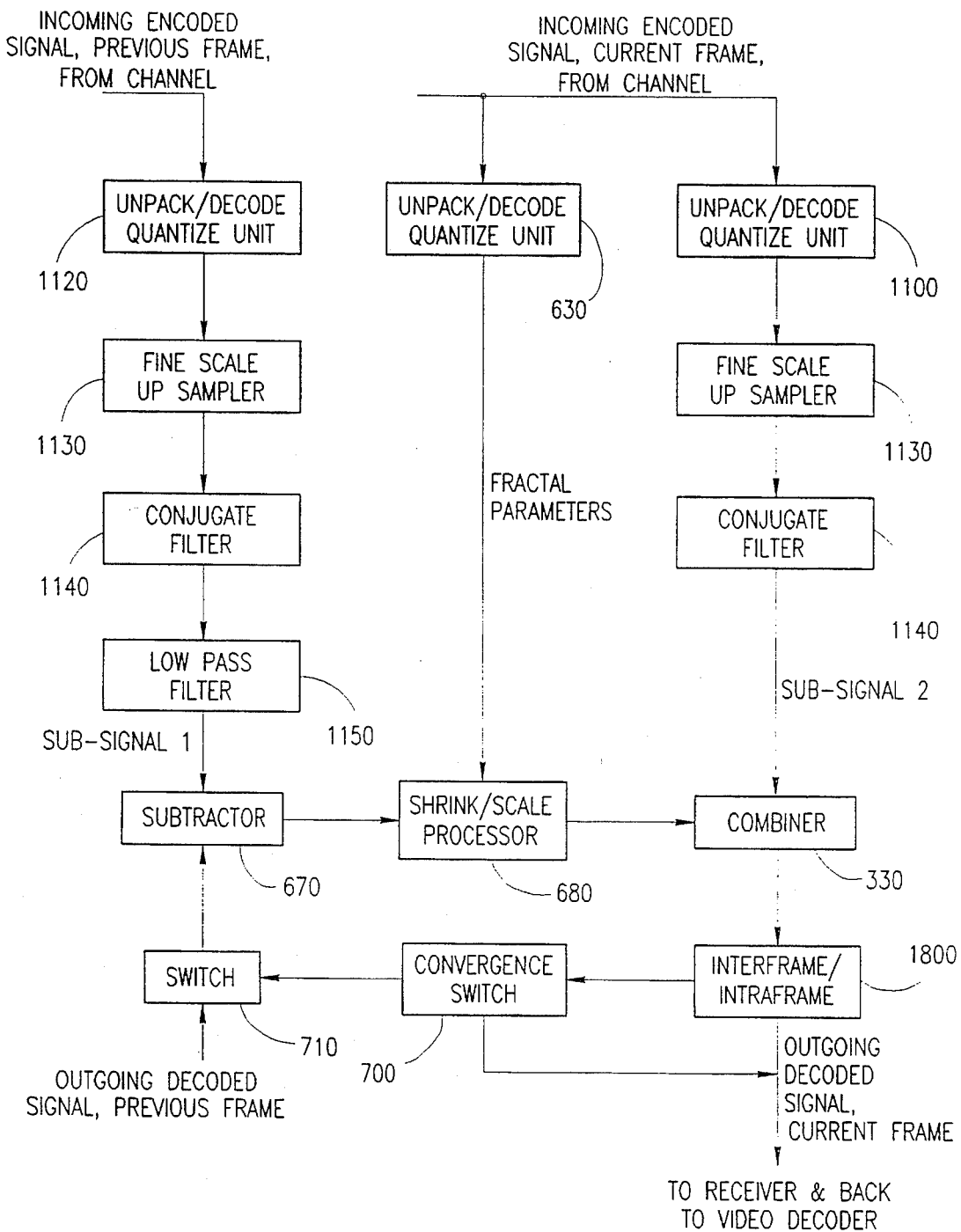
FIG. 24 is a simplified block diagram of a video decoder constructed and operative in accordance with a preferred embodiment of the present invention which is useful in decoding video signals encoded by the apparatus of FIG. 23.

FIG. 24 illustrates a video decoder which is useful in decoding video signals encoded by the apparatus of FIG. 23. The apparatus of FIG. 24 accepts as input an encoded video file for a plurality of frames which file may have been generated by the video encoder in FIG. 23. The decoder of FIG. 24 generates a decoded video signal which may be displayed and/or copied to an output file.

On a frame-by-frame basis the operation of the video decoder of FIG. 24 is similar to the still image decoder depicted in FIG. 14, and similar components in the two figures bear identical reference numbers for convenience.

Two differences between the decoders of FIGS. 14 and 24 are now described. Firstly, in FIG. 24, subsignal 1, which is subtracted in subtractor 670, comes from a previous frame, whereas subsignal 2 comes from a current frame. The second difference is in provision of an interframe/intraframe switch 1800. Depending on the video resolution, the decoder of FIG. 24 may or may not be able to keep up with the real-time rate of 30 frames/sec. If not, then rather than drop frames, switch 1800 enables the decoder to process some frames more accurately than others.

Specifically, for intraframes, the decoder of FIG. 24 repeats the decoding step, the cycle being governed by convergence switch 700. For interframes between the intraframes, the decoding cycle is carried out only once. A single cycle is sufficient because the reference signal coming into switch 710 is taken to be a decoded previous frame, which differs only slightly from the current frame which is typically separated by only 1/30 second therefrom.

To implement this arrangement, the decoded signal which comes out of the decoder cycle is also sent back to switch 710. This allows the decoded signal to be used as the initial image in the decoding cycle for the next frame, as well as being displayed and/or written to an output file.

Figure 25:
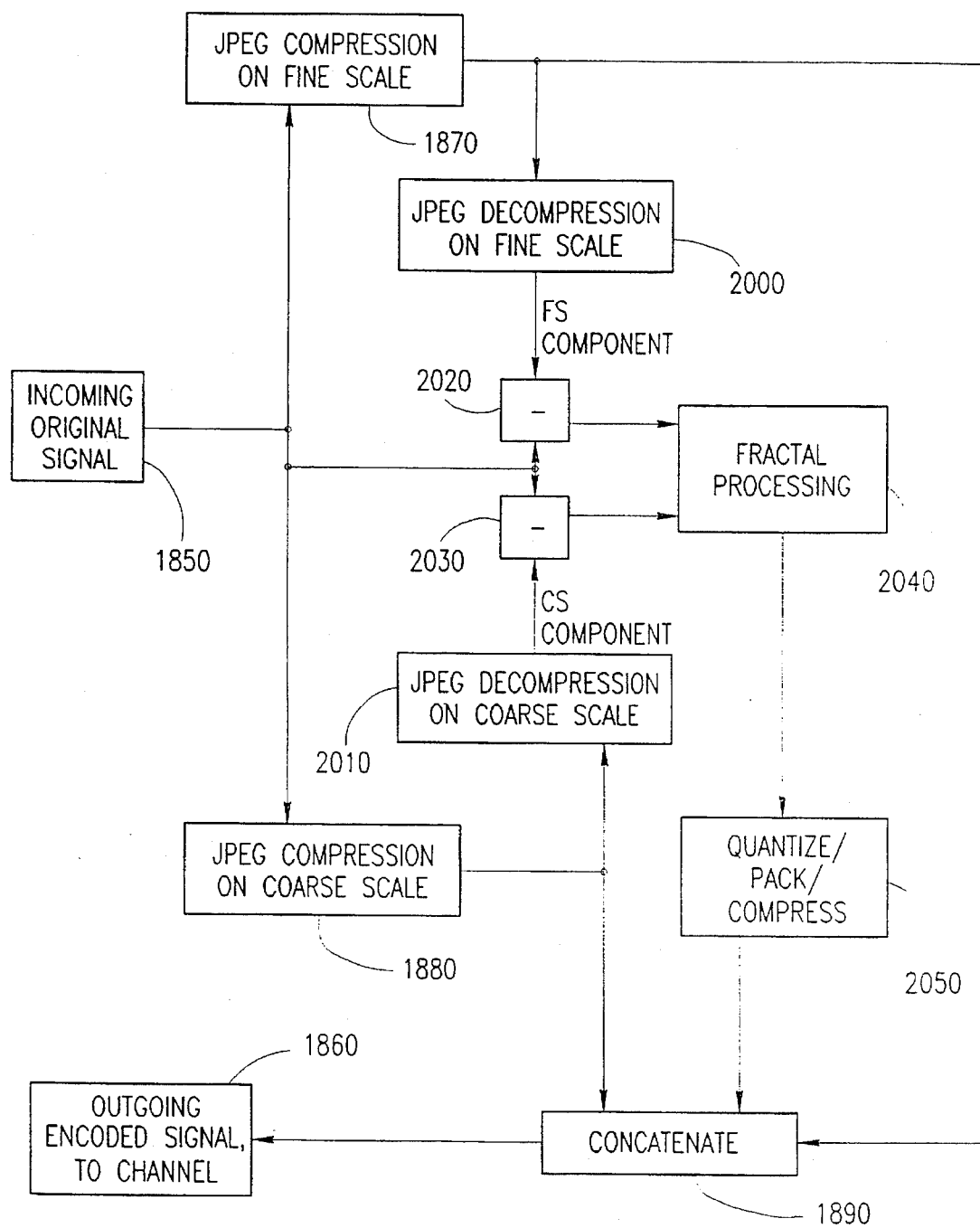
FIG. 25 is a simplified block diagram of a signal encoder constructed and operative in accordance with a preferred embodiment of the present invention which is operative to perform JPEG compression enhancement.

FIG. 25 is a preferred embodiment of a signal encoder comprising a JPEG compression enhancer. The encoder of FIG. 25 accepts an input file 1850 comprising an original signal and generates an output file 1860 storing an encoded signal whose size is much smaller than the input file size. The output file 1860 includes a standard JPEG file and an additional file representing a fractal enhancement.

The input signal 1850 is compressed, using a conventional JPEG algorithm which is based on a unit block size, by JPEG compressors 1870 and 1880. In compressor 1870, the block size is chosen to be smaller, or finer, than the larger or coarser block size used by compressor 1880. For example, an 8×8 pixel block size may be used by compressor 1870 and a 16×16 pixel block size may be used by compressor 1880. The two JPEG compressed files are sent to a concatenator 1890 and are also decompressed in decompressors 2000 and 2010. The decompressed signals generated by the decompressors 2000 and 2010 are also termed herein "the fine smooth component" and "the coarse smooth component", respectively, because they correspond to the fine and coarse smooth components, respectively, in FIGS. 4A and 4B.

The fine and coarse smooth components generated by decompressors 2000 and 2010 are subtracted, typically, from the original signal by subtractors 2020 and subtractor 2030, and the resulting difference signals are processed by a fractal processor 2040 whose operation is best understood with reference to FIG. 6. The fractal parameters generated by fractal processor 2040 are preferably quantized, packed into bytes, and losslessly compressed by a quantize/pack/compress unit 2050, and are then sent to concatenator 1890 for merging with the two JPEG files.

Figure 26:
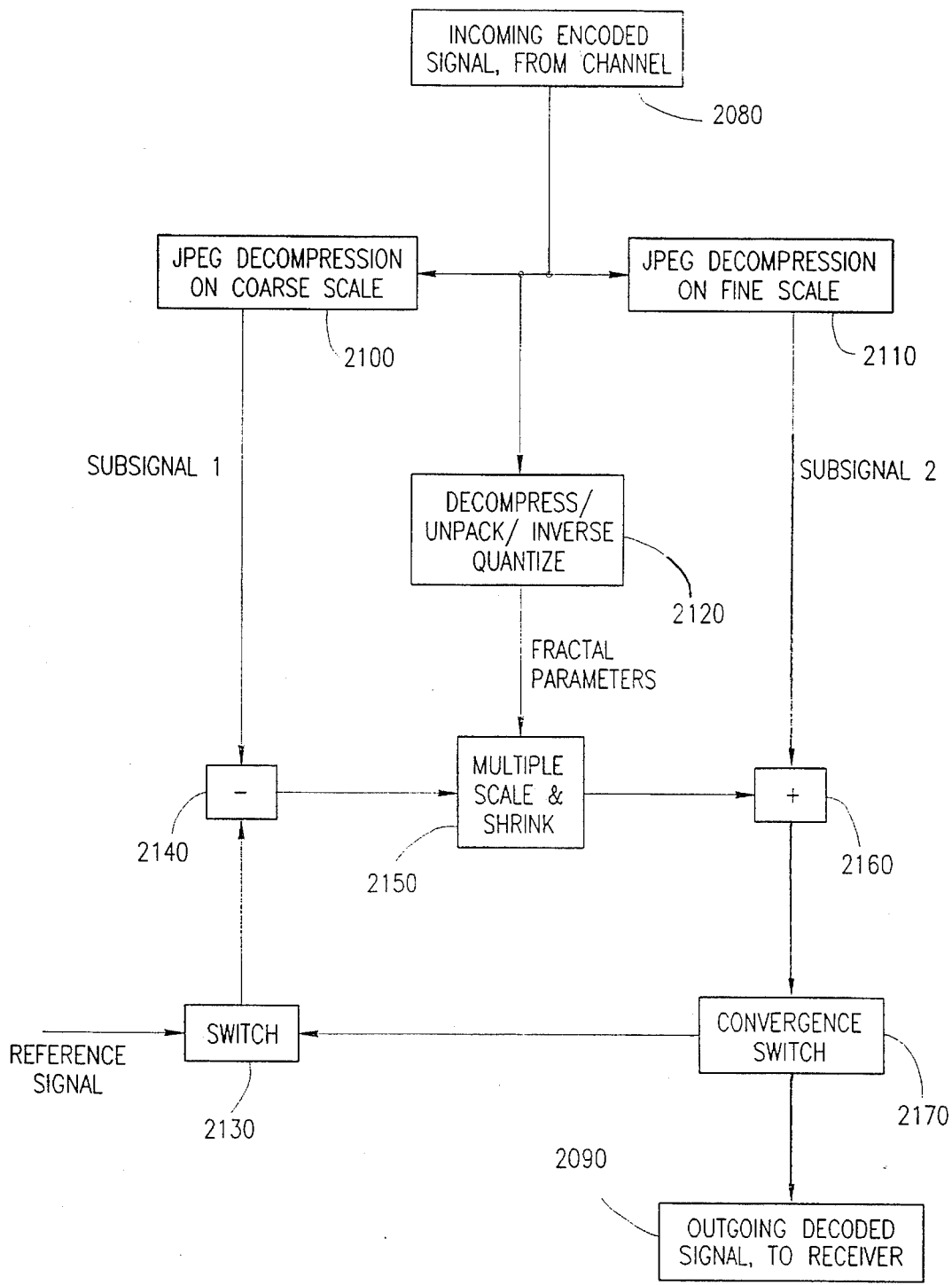
FIG. 26 is a simplified block diagram of a signal decoder constructed and operative in accordance with a preferred embodiment of the present invention which is useful in decoding signals encoded by the encoder of FIG. 25.

FIG. 26 is a signal decoder useful in decoding signals encoded by the apparatus of FIG. 25. The decoder of FIG. 26 accepts as input an encoded signal 2080 which may have been generated by the encoder of FIG. 25. The decoder of FIG. 26 generates as output a decoded signal 2090 which approximates the original signal. The input encoded signal 2080 is first split into two JPEG files and a fractal parameter file.

The two JPEG files are respectively sent to coarse scale and fine scale JPEG decompressors 2100 and 2110 respectively where they are decompressed. Decompressor 2100 operates with a large, i.e. coarse block size, and generates an output which is referenced herein subsignal 1. Decompressor 2110 operates with a small, i.e. fine block size and generates an output which is referenced herein subsignal 2. For example, the large block size can be 16×16 pixels, and the small block size can be 8×8 pixels.

The fractal parameters are decompressed, unpacked and inverse quantized by a decompress/unpack inverse quantize unit 2120. At this point a decoding cycle begins.

Initially, a switch 2130 passes through a reference signal typically comprising an approximation to the original signal such as subsignal 2. A subtractor 2140 subtracts subsignal 1 from the reference signal, generating a difference signal. A multiple scale and shrink unit 2150 operates on the resulting difference signal using multiple scale and shrink transformations which are based on the fractal parameters arriving from unit 2120. The operation of multiple scale and shrink unit 2150 is best understood with reference to FIG. 8 above. The output of unit 2150 is termed herein "the modified difference signal".

A combiner unit 2160 adds subsignal 2 to the modified difference signal. A convergence switch 2170 receives the output of combiner unit 2160 and determines whether a stopping criterion has been reached. The stopping criterion may be a predetermined degree of convergence, or carrying out of a predetermined number of repetitions of the cycle. If the stopping criterion has been reached, the output of combiner unit 2160 is shipped out as the decoded signal, to be displayed and/or copied to a file. Otherwise, another cycle is initiated. The output from combiner 2160 is sent back to subtractor 2140, and subsignal 1 is subtracted therefrom. The switch 2130 passes through the output from combiner 2160, rather than the reference signal which was passed through in the initial repetition of the cycle. The cycle is repeated until the stopping criterion is reached.

Figure 27:
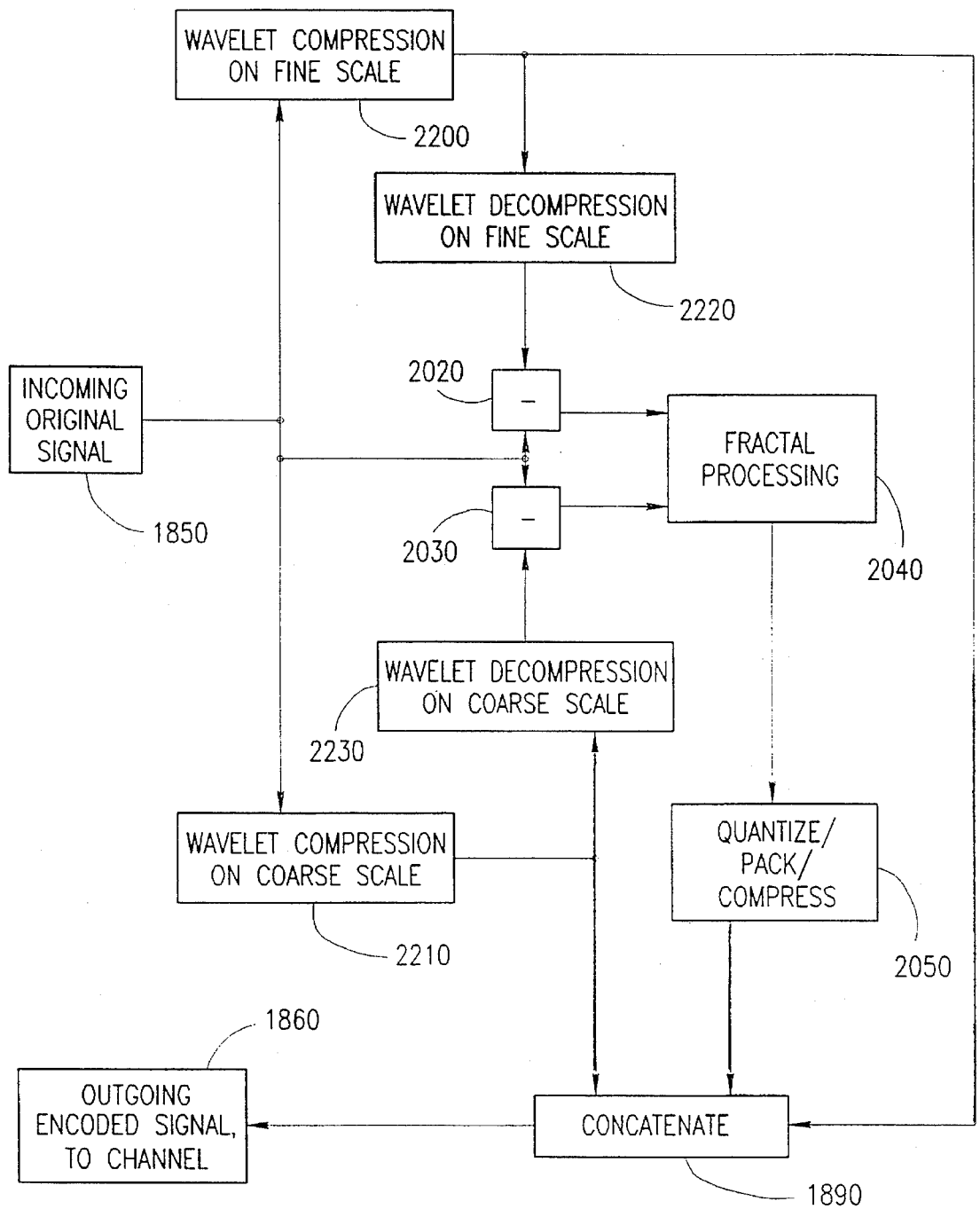
FIG. 27 is a simplified block diagram of a signal encoder constructed and operative in accordance with a preferred embodiment of the present invention which is operative to perform wavelet compression enhancement.

FIG. 27 is a preferred embodiment of a signal encoder which performs wavelet compression enhancement. The encoder of FIG. 27 operates similarly to the encoder of FIG. 25, except that wavelet compression and decompression operations replace the JPEG compression and decompression operations performed by the encoder of FIG. 25.

Wavelet compression and decompression, like JPEG compression and decompression, is based on a unit block size which determines the support of the wavelet used to generate the wavelet basis. The apparatus of FIG. 27 includes fine scale and coarse scale wavelet compression and decompression units 2200, 2210, 2220 and 2230. In the fine scale units, the block size is small, i.e. fine, for example 8×8 pixels. In the coarse scale units, the block size is taken to be large, i.e. coarse, for example 16×16 pixels.

The remaining units of FIG. 27 are similar to the corresponding identically numbered units in FIG. 25, and are not described herein for brevity.

Figure 28:
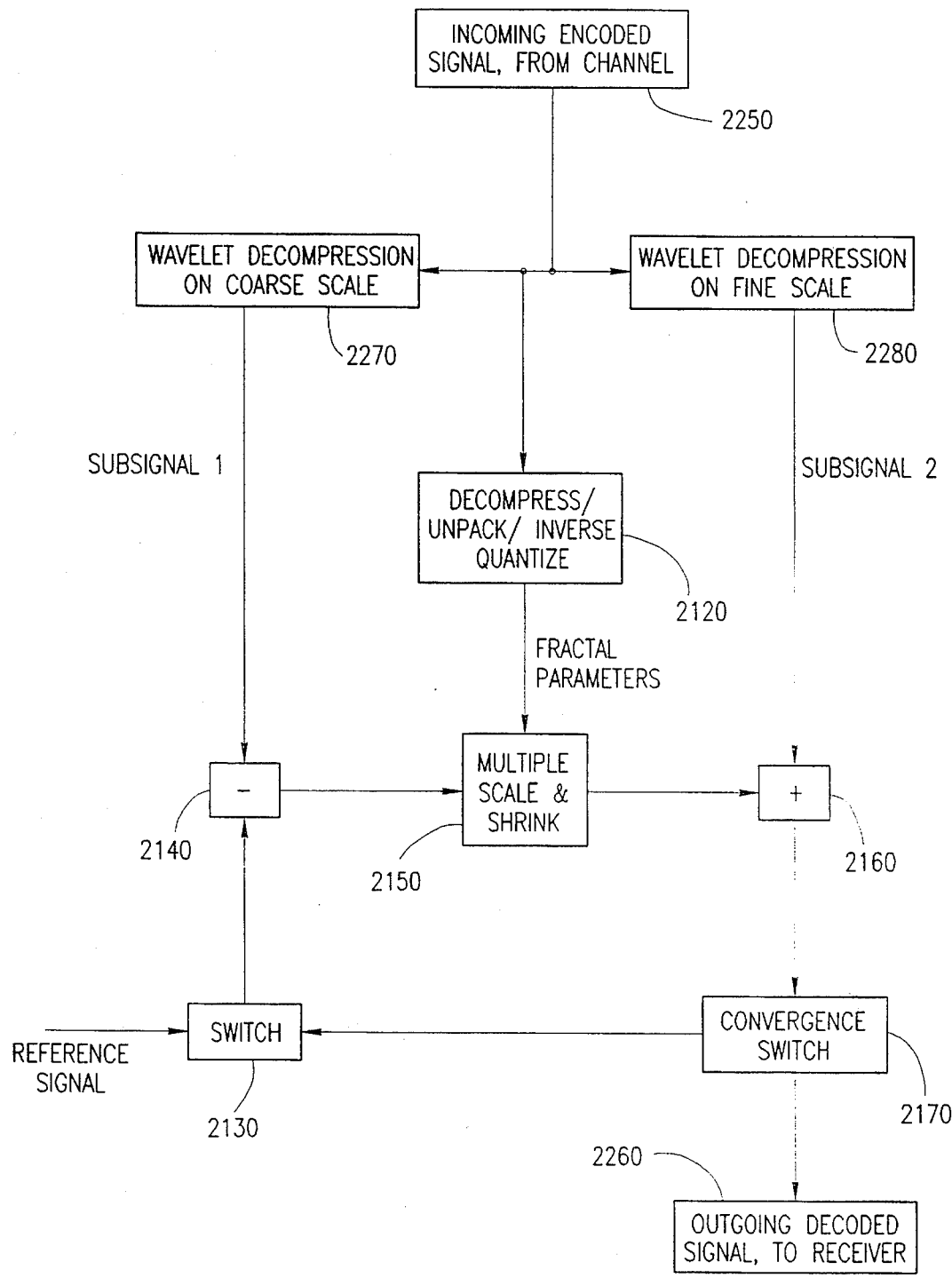
FIG. 28 is a simplified block diagram of a signal decoder constructed and operative in accordance with a preferred embodiment of the present invention which is useful in decoding signals encoded by the encoder of FIG. 27.

FIG. 28 is a preferred embodiment of a signal decoder which is useful in decoding signals encoded by the encoder of FIG. 27. The decoder of FIG. 28 accepts as input an encoded signal 2250 which may have been generated by the encoder of FIG. 27, and generates as output a decoded signal 2260 which approximates the original signal. The decoder of FIG. 28 is similar to the decoder of FIG. 26 and units in FIG. 28 which are similar to corresponding units in FIG. 26 bear identical reference numbers for convenience. However, coarse and fine scale JPEG decompression units 2100 and 2110 of FIG. 26 are replaced in FIG. 28 by coarse and fine scale wavelet decompression units 2270 and 2280 respectively.

Figure 29:
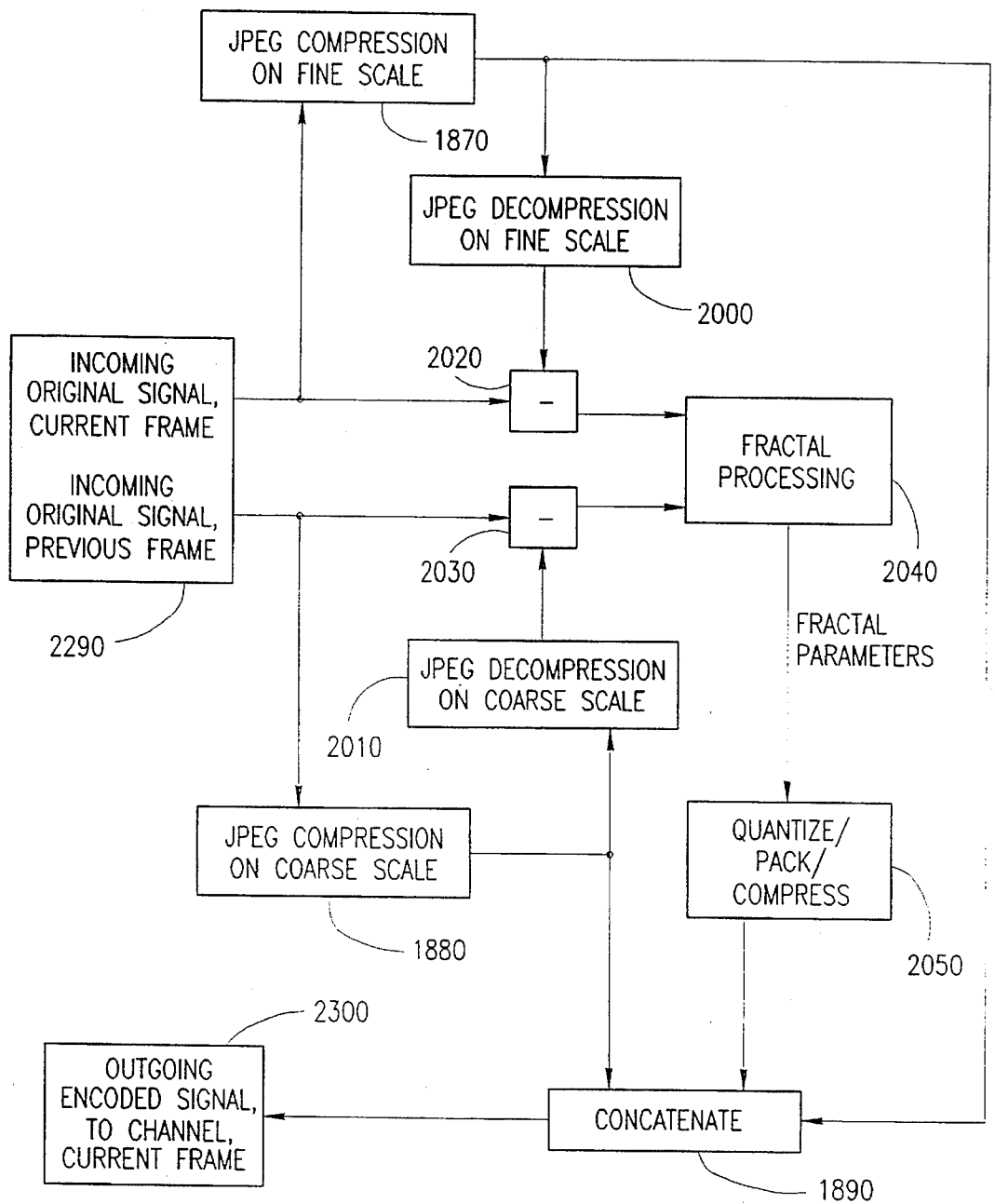
FIG. 29 is a simplified block diagram of a signal encoder constructed and operative in accordance with a preferred embodiment of the present invention which is operative to perform MPEG or H.261 enhancement.

FIG. 29 is a preferred embodiment of a video encoder which performs H.261 or MPEG enhancement. The video encoder of FIG. 29 accepts an original signal 2290 comprising a plurality of digital image frames, and generates as output an encoded signal 2300, the file size of which is much smaller than the file size of the input signal. The output file 2300 comprises a standard H.261 or MPEG file and an additional file representing a fractal enhancement.

The operation of the encoder of FIG. 29 is substantially similar to that of the encoder of FIG. 25 except that the fine scale JPEG compression and decompression is applied to a current frame, whereas the coarse scale JPEG compression and decompression is applied to a previous frame. In other words, the two signals being processed by fractal processor 2040 arrive from different frames. The signal arriving from subtractor 2800 is a difference signal based on the current frame, and the signal arriving from subtractor 2810 is a difference signal based on a previous frame.

Figure 30:
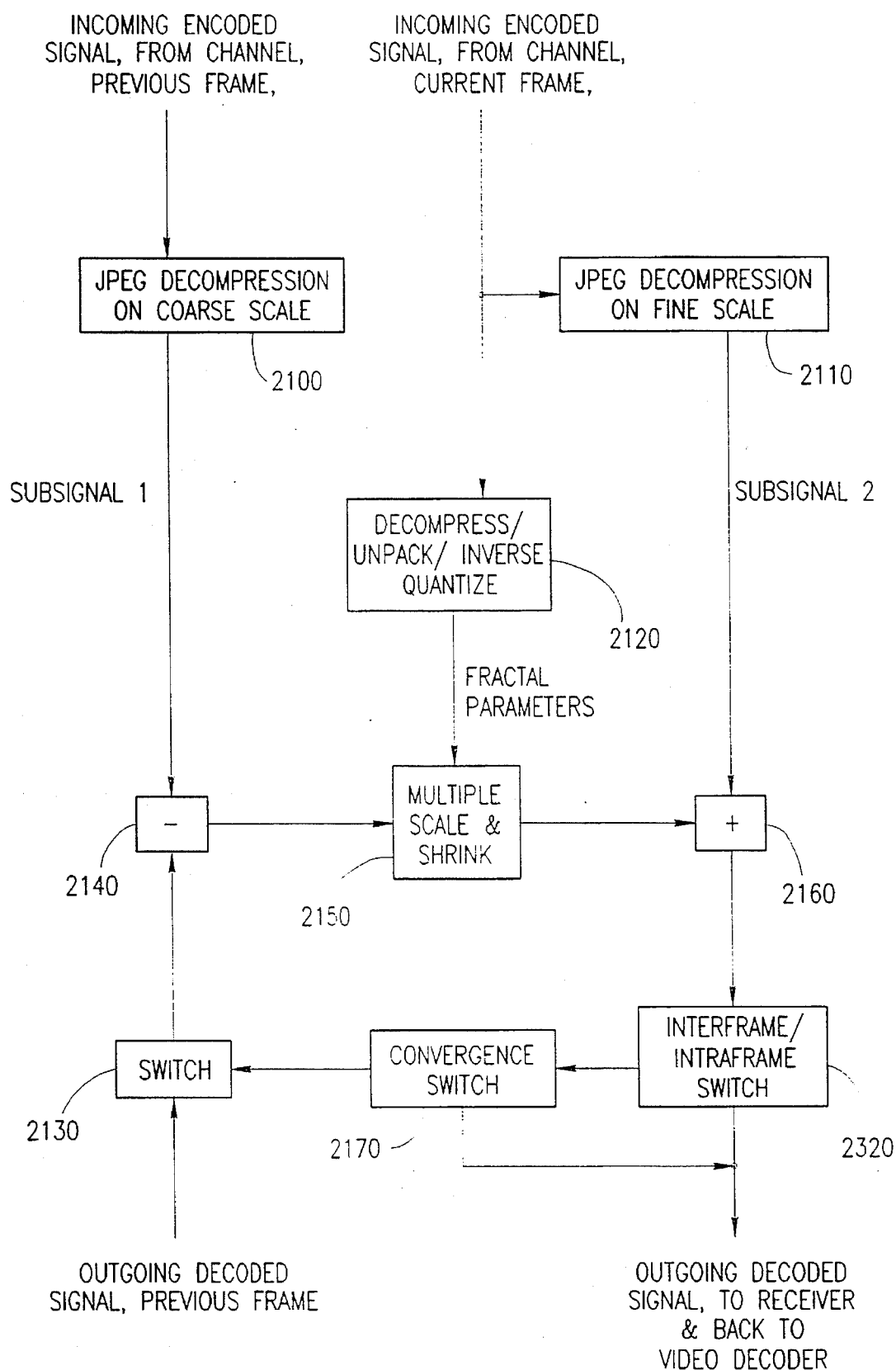
FIG. 30 is a simplified block diagram of a signal decoder constructed and operative in accordance with a preferred embodiment of the present invention which is useful in decoding signals encoded by the encoder of FIG. 29.

FIG. 30 is a preferred embodiment of a video decoder suitable for decoding video signals encoded by the apparatus of FIG. 29. The video decoder of FIG. 30 accepts an input file which contains an encoded signal which may have been generated by the encoder of FIG. 29. The output of the video decoder of FIG. 30 comprises a video sequence which approximates the original video signal.

On a frame-by-frame basis, the operation of the video decoder of FIG. 30 is similar to that of the decoder described above with reference to FIG. 26. However, the two subsignals involved in the decoding cycle originate from different frames in FIG. 30. Subsignal 1, which is the output of coarse-scale JPEG decompression unit 2100, originates from a previous frame, whereas subsignal 2, which is the output of fine-scale JPEG decompression unit 2110, originates from the current frame.

Also, in FIG. 30, an interframe/intraframe switch 2910 is provided which operates as follows: If the current frame is an interframe, switch 2910 ships out the result of combiner 2160 for display and/or to be written to a file, following the initial decoding cycle. If the current frame is an intraframe, then switch 2910 passes the result of combiner 2160 through to convergence switch 2170 and decoding cycles are repeated until the stopping criterion has been achieved. H.261 enhancement and MPEG enhancement are described in the above-referenced publication by Rabani, M. and Jones, P. W. ("Digital Image Compression Techniques", Tutorial Texts in Optical Engineering, V. TT7, SPIE Optical Engineering Press, Bellingham, Wash., 1991), the disclosure of which is incorporated herein by reference.

It is appreciated that any conventional means may be employed in any of the video encoders and decoders described hereinabove, to provide for simultaneous or near-simultaneous processing of a current frame and a preceding frame. For example, a temporary buffer may be provided to store the relevant portion or subsignal of each frame, while current, for subsequent use when the frame is no longer current.

JPEG algorithms are described in the following publication, the disclosure of which is incorporated herein by reference:

JPEG Still *Image Data Compression Standard*, Pennebaker, W. B. and Mitchell, J. L. Van Nostrand-Reinhold, 1993, New York.

Wavelet algorithms are described in the following publication, the disclosure of which is incorporated herein by reference:

Strang, G. "Wavelets and dilation equations: a brief introduction", SIAM Rev., 31, 614–627, 1989.

It is appreciated that, since the compression parameters of the methods shown and described herein are resolutionindependent, the reconstructed signal or image may be displayed at any user-selected or predetermined resolution and window size.

In the present specification, repeated reference has been made to finding a shrunk coarse component which "best fits" a particular fine component. However, it is appreciated that, alternatively, not all shrunk coarse components need be inspected so as to identify a best fitting one thereof and instead, inspecting of shrunk coarse components may be halted once a relatively well-fitting shrunk coarse component has been found, which answers to a suitable predetermined criterion of goodness-of-fit.

The present invention has been described such that the two components of the original signal or image which are each defined on each of two scales, the second components subsequently being fractal processed, are rough and smooth components of the original signal or image. However, it is appreciated that, more generally, the apparatus and methods shown and described herein are operative using any two suitable components of the original signal or image, each defined on each of two scales. For example, the two components may comprise an orthogonal projection of the original signal and the complement to the orthogonal projection, or they may comprise the compressed signal obtained from another compression method, such as JPEG, and the residual signal.

It is appreciated that features which, for clarity, are described herein in the context of separate embodiments, may nonetheless be provided in any suitable combination.

Appendix A to the present specification comprises a computer listing of a software-implemented preferred embodiment of the present invention. The listing of Appendix A is included herein merely to provide an extremely detailed description of one implementation of the present invention, it being appreciated that the particular implementation of Appendix A is merely exemplary of the many possible implementations of the invention shown and described herein.

Appendix B to the present specification comprises running and loading instructions for the computer listing of Appendix A.

It will be appreciated by persons skilled in the art that the present invention is not limited to what has been particularly shown and described hereinabove. Rather, the scope of the present invention is defined only by the claims that follow:

APPENDIX A

BSTREAM.H                Thursday, January 28, 1993 7:   pm                        Page 1

```c
#ifndef _H_BSTREAM
define _H_BSTREAM define BS_BUFSIZ       (8*1024)
define BS_THRESHSIZ    (BS_BUFSIZ - 16)         // enough safety...

class bitStream {
        int             fd;
        unsigned char   *buf;
        unsigned char   *bufTail, *bufThresh;
        int             bitOff;                  // bit offset inside the byte
        int             access;
        unsigned long   latch;

void            flushBuf(int lastFlushFlg);
        void            getBuf();

public:
        bitStream(const char *path, int access, int mode = 0);
        ~bitStream();
        int     read(void *ptr, int itemSize, int nItems, int nBitsPerItem,
                        int quantBits = 0, short addConst = 0);
        void    write(void *ptr, int itemSize, int nItems, int nBitsPerItem,
                        int quantBits = 0, short subConst = 0);
        int     skip(int nItems, int nBitsPerItem);
        void    rewind();               // rewind the file to beginning
};

#endif  _H_BSTREAM
```

COMPRESS.H                Thursday, January 28, 1993 7:  pm                Page 1

```
void    compress(const image& plane, uchar coarseLogX, uchar coarseLogY,
                 uchar fineLogX, uchar fineLogY, bitStream& outBs,
                 uchar flags, int vBits, int gBits);
```

DECMPRS.H                Thursday, January 28, 1993 7:.  pm                    Page 1

```
image *decompress(bitStream& bs);
```

GENERAL.H          Thursday, January 28, 1993 7:_ pm                    Page 1

```c
#ifndef _H_GENERAL
define _H_GENERAL include <stdio.h>
include "bstream.h"

/*
 | constants and types.
 */
#define FIXED_NBITS     6              // number of bits used for fixed point
#define PALETTE_SIZ     256

/*
 | YUV plane IDs
 */
#define PLANE_Y         0
#define PLANE_U         1
define PLANE_V         2 typedef unsigned short  ushort;
typedef unsigned char   uchar;
typedef unsigned long   ulong;
typedef short           VType;
typedef ushort pair[2];

class image;

/*
 | compressed file header flags.
 */
define CF_SHRINK       0x1    // S(Pf-Pc) contained in the file /*
 | TARGA image handler.
 */
class targa {
        typedef uchar   pixel[3];               // interlaced RGB pixel struct {
                unsigned char   numid;          // # of image ID bytes
                unsigned char   maptyp;
                unsigned char   imgtyp;         // type of image
                short           maporig;
                short           mapsize;        // color map size (entries)
                unsigned char   mapbits;        // bits per color map entry
                short           xorig;
                short           yorig;
                short           xsize;
                short           ysize;
                unsigned char   pixsize;        // bits per pixel (up to 32)
                unsigned char   imgdes;
        } header;

FILE            *pf;
        static const int R, G, B;               // pixel color indices
        pixel           **img;
        int             flipcode;
        long            dataStart;              // start point of pixel data // static data
        static short    mult03[], mult06[], mult08[], mult01[],
                        multInv16[], mult16[], multInv3[];
```

GENERAL.H          Thursday, January 28, 1993 7:_ pm                    Page 2

```
public:
        static void    initMultTables();      // init multiplication tables targa(const char *fileName, const char *mode, int xSize = -1,
                                          int ySize = -1);
        ~targa();

void   getPlane(image& targetImage, int planeId,
                           int cutX, int cutY);         // for read
        void   addPlane(const image& plane, int planeId);   // for write int    xSize()              { return header.xsize; }
        int    ySize()              { return header.ysize; } void   dump();              // output the image (write)
};

/*
| matchMatrix holds all the parameters needed for the two-scale
| reconstruction process. V and A are the matrices holding the
| matching index and the multiplicant for each fine box.
|
| Notice that vBits must be <= FIXED_NBITS.
*/
struct matchMatrix {
        uchar  log2ShrinkX, log2ShrinkY;     // log2 of coarse->fine shrink
        uchar  log2FineX, log2FineY;          // log2 of fine filter box size
        ushort nX, nY;                        // number of V & A elements
        VType  **V;                           // multiplicants matrix
        pair   **A;                           // match indices
        int    vBits;

matchMatrix(bitStream& bs);
        matchMatrix(uchar log2ShrinkX, uchar log2ShrinkY, uchar log2FineX,
              uchar log2FineY, ushort nX, ushort nY, int vBits);
        ~matchMatrix();

void   dump(bitStream& bs);
};

/*
| image holds a plane greylevel image, and provide the operators essential for
| the fractal decompressor manipulations.
*/
class image {
protected:
        ushort  dimX, dimY;          // image dimensions public:
        short   **imageData;         // pixels (integers, not fixed point)

image(int dimX, int dimY, int zero=1);  // generate a null image
        // get image from file
        image(bitStream& bs, int fileDimX = -1, int fileDimY = -1,
          int cutX = 0, int cutY = 0);
        image(targa& tgHandle, int planeId, int cutX, int cutY);
        virtual ~image();

ushort  xSize() const        { return dimX; }
        ushort  ySize() const        { return dimY; }
```

```
GENERAL.H                Thursday, January 22, 1993 7:  pm                    Page 3 void    S(image& result, const matchMatrix& m);  // shrink
        void    V(image& result, const matchMatrix& m);  // multiply and assign void    operator -=(const image& rhs);
        void    leftSub(const image& rhs);              // (*this)=rhs-(*this)
        void    add(short constVal);
        void    mult(short constVal);
        void    makePositive();         // make image positive (by abs. value)
#ifdef  FILTOUT
        void    filter124(image& result);
#endif
        void    findMatch(const image& coarse, matchMatrix& m);

void    dump(bitStream& bs, int dumpDimensions = 1);    // dump to file
};

/*
| filterImage holds an image which is the result of a filter projection,
| as well as the filter values at the gridpoints.
*/
class filterImage : public image {
        uchar   log2BoxX, log2BoxY;     // filter box dimensions (log2)
        ushort  gridSizeX, gridSizeY;   // # of grid elements
        short   **gridVals;             // grid values (fixed point)
        short   gridMin, gridMax;       // extremums of grid values
        int     gBits;

void    fillGrid(const image& source);  // filter the image
        void    quantize();             // quantize-truncate the grid values public:
        filterImage(bitStream& bs);                     // read from file & project
        filterImage(const image& source, uchar log2BoxX, uchar log2BoxY,
          int gBits);
        // following creates a null filter for (dimX, dimY) image.
        filterImage(ushort dimX, ushort dimY, uchar log2BoxX, uchar log2BoxY,
          int gBits);
        virtual ~filterImage();

void    dump(bitStream& bs);
        void    span();                         // spans the image
};

/*
| Configuration variables.
*/
extern int      nIter;                  // number of decompressor iterations endif  _H_GENERAL
```

TIMING.H    Thursday, January 28, 1993 7:50 pm    Page 1

```
#ifndef _H_TIMING
define _H_TIMING ifdef   TIMING include <timer.h> extern Timer globTimer;

endif   TIMING endif   _H_TIMING
```

BSTREAM.CPP            Thursday, January 28, 1993 7:38 pm                    Page 1

```cpp
#include <sys/stat.h>
#include <string.h>
#include <stdio.h>
include <stdlib.h>
#include <io.h>
#include <fcntl.h>
#include "bstream.h"

bitStream::bitStream(const char *path, int acc, int mode){
#ifdef  SAFETY
        if((acc & O_RDWR) != 0){
                fprintf(stderr, "bitStream::bitStream: Can't open for r/w!\n");
                exit(1);
        }
#endif
        buf = new unsigned char[BS_BUFSIZ];
        acc |= O_BINARY;                    // just to be sure...
        access = acc;
        if((fd = open(path, access, mode)) < 0){
#ifdef  SAFETY
                perror(path);
#endif
                return;
        }
        bitOff = 0;
        if((acc & O_WRONLY) != 0){
                bufThresh = &buf[BS_THRESHSIZ];
                bufTail = buf;
                memset(buf, 0, BS_BUFSIZ);
        }
        else{
                latch = 0L;
                getBuf();
        }
}  /* bitStream::bitStream */ void
bitStream::rewind(){
        lseek(fd, 0L, SEEK_SET);
        bitOff = 0;
        if((access & O_WRONLY) != 0){
                bufTail = buf;
                memset(buf, 0, BS_BUFSIZ);
        }
        else{
                latch = 0L;
                getBuf();
        }
}  /* bitStream::rewind */ bitStream::~bitStream(){
        if((access & O_WRONLY) != 0)
                flushBuf(1);
        delete []buf;
        close(fd);
}  /* bitStream::~bitStream */ void
bitStream::flushBuf(int lastFlushFlg){
        if(lastFlushFlg && bitOff > 0){
                bufTail++;
                bitOff = 0;
```

```cpp
        }
        else if(bufTail == buf)
                return;         // nothing to do
        unsigned char save = *bufTail;
        ::write(fd, buf, (unsigned)(bufTail - buf));
        memset(buf, 0, BS_BUFSIZ);
        bufTail = buf;
        if(bitOff > 0)
                *bufTail = save;
}   /* bitStream::flushBuf */ void
bitStream::write(void *ptr, int itemSize, int nItems, int nBitsPerItem,
                    int qBits, short subConst){
        unsigned char *cp = (unsigned char *)ptr;
#ifdef  SAFETY
        if(nBitsPerItem > 16){
                fprintf(stderr, "bitStream::write: Items too wide!\n");
                exit(1);
        }
#endif
        unsigned short mask;
        mask = (nBitsPerItem >= 16) ? 0xFFFFU : (1U << nBitsPerItem) - 1;
        while(nItems-- > 0){
                register unsigned short item = *(unsigned short *)cp-subConst;
                cp += itemSize;
                item = (item >> qBits) & mask;
                *(unsigned long *)bufTail |= (unsigned long)item << bitOff;
                bitOff += nBitsPerItem;
                bufTail += bitOff >> 3;
                bitOff &= 0x7;
                if(bufTail > bufThresh)
                        flushBuf(0);
        }
}   /* bitStream::write */ void
bitStream::getBuf(){
        int nbytes = ::read(fd, buf, BS_BUFSIZ);
        if(nbytes < 0){
#ifdef  SAFETY
                perror("bitStream::getBuf: read failed");
#endif
                nbytes = 0;
        }
        bufThresh = &buf[nbytes];
        bufTail = buf;
}   /* bitStream::getBuf */ int
bitStream::read(void *ptr, int itemSize, int nItems, int nBitsPerItem,
                    int qBits, short addConst){
        unsigned char *cp = (unsigned char *)ptr;
        int ni;
#ifdef  SAFETY
        if(nBitsPerItem > 16){
                fprintf(stderr, "bitStream::write: Items too wide!\n");
                exit(1);
        }
#endif
        unsigned short mask;
        register unsigned long l = latch;
```

```cpp
#ifdef  NO_AVG_ADD
        unsigned short A = 0;
#else
        unsigned short A = qBits <= 0 ? 0 : (1 << (qBits - 1));
#endif
        mask = (nBitsPerItem >= 16) ? 0xFFFFU : (1U << nBitsPerItem) - 1;
        if(itemSize != 0)
                memset(cp, 0, itemSize * nItems);
        for(ni = 0; ni < nItems; ni++){
                while(bitOff < nBitsPerItem){
                        if(bufTail >= bufThresh){
                                getBuf();
                                if(bufThresh <= buf){   // end of file!
                                        latch = 1;
                                        return ni;
                                }
                        }
                        l |= (unsigned long)(*bufTail++) << bitOff;
                        bitOff += 8;
                }
                if(itemSize != 0)
                        *(unsigned short *)cp |=
                                        ((l & mask) << qBits) + A + addConst;
                l >>= nBitsPerItem;
                bitOff -= nBitsPerItem;
                cp += itemSize;
        }
        latch = 1;
        return ni;
}   /* bitStream::read */ int
bitStream::skip(int nItems, int nBitsPerItem){
        return read((void *)0, 0, nItems, nBitsPerItem, 0, 0);
}   /* bitStream::skip */ ifdef  OLD_TEST
void
main(){
        int v[128], i;
        for(i = 0; i < sizeof(v)/sizeof(v[0]); i++)
                v[i] = i;
        {
                bitStream f("btst.dat", O_WRONLY|O_BINARY|O_CREAT|O_TRUNC,
                 S_IREAD|S_IWRITE);
                f.write(v, sizeof(v[0]), sizeof(v)/sizeof(v[0]), 3, 4);
        }
        {
                memset(v, 0, sizeof(v));
                bitStream f("btst.dat", O_RDONLY|O_BINARY);
                f.read(v, sizeof(v[0]), sizeof(v)/sizeof(v[0]), 3, 4);
        }
        for(i = 0; i < sizeof(v)/sizeof(v[0]); i++)
                printf("v[%d] = %d\n", i, v[i]);
}   /* main */
#endif
```

COMPRESS..CPP            Thursday, January 28, 1993 6. _ pm                    Page 1

```cpp
#include "general.h"

#ifdef  OLD_DEBUG
extern bitStream *fineBs, *coarseBs;
extern FILE *fineDbg, *coarseDbg, *matchDbg;
endif /*
 | a single plane compressor.
 |
 | Notes:
 |
 | 1. We calculate the high-pass image by subtracting the calculated low-pass
 |    from the original image. Note that this subtraction does not change
 |    the filterImage grid values, so when we dump it to the file we actually
 |    dump the lowpass parameters.
 */
void
compress(const image& img, uchar cLogX, uchar cLogY, uchar fLogX, uchar fLogY,
                    bitStream& bs, uchar flags, int vBits, int gBits){
        filterImage fine(img, fLogX, fLogY, gBits);
#ifdef  OLD_DEBUG
        fine.image::dump(*fineBs, 0);
        fine.debugDump(fineDbg);
#endif
        fine.leftSub(img);              // calculates the high pass
        filterImage coarse(img, cLogX, cLogY, gBits);
#ifdef  OLD_DEBUG
        coarse.image::dump(*coarseBs, 0);
        coarse.debugDump(coarseDbg);
#endif
        coarse.leftSub(img);
        matchMatrix match(cLogX - fLogX, cLogY - fLogY, fLogX, fLogY,
          img.xSize() >> fLogX, img.ySize() >> fLogY, vBits);
        image shrunkCoarse(img.xSize() >> match.log2ShrinkX,
          img.ySize() >> match.log2ShrinkY, 0);
        coarse.S(shrunkCoarse, match);
        fine.findMatch(shrunkCoarse, match);

// dump results to the file
        bs.write(&flags, sizeof(uchar), 1, 8 * sizeof(uchar), 0);
        match.dump(bs);
#ifdef  OLD_DEBUG
        match.debugDump(matchDbg);
#endif
        fine.dump(bs);
        if((flags & CF_SHRINK) != 0){           // calculate for decompressor
                fine.span();            // respans the fine low-pass image
                coarse.span();          // respans the coarse low-pass image
                coarse.leftSub(fine);   // Pc = Pf - Pc
                coarse.S(shrunkCoarse, match);  // shrunkCoarse = S(Pf - Pc)
                shrunkCoarse.dump(bs);
        }
        else
                coarse.dump(bs);
}  /* compress */
```

DECMPRS.CPP          Thursday, January 28, 1993 £  . pm                    Page 1

```
/*
 | Fast decompressor. The decompressor flow is as follows:
 |
 | 1. Precomputation: Compute (or get from file) M0=S(Pf-Pc), where Pf is
 |    the fine low-pass projection, Pc is the coarse low-pass projection,
 |    S is the shrink operator. Save Pf, the by-product of
 |    this computation, for future use.
 | 2. P0 = null shrinked image (zero on all planes). n=0.
 | 3. execute M=M0+Pn, i.e. add S(Pf-Pc) to Pn, and store the result in
 |    a temporary location.
 | 4. I=V(M), i.e. fill the fine boxes by multiplying the appropriate
 |    M boxes with the multiplicant.
 | 5. If there are more iterations left, calculate Pn+1=S(I) and goto 3.
 |    Otherwise, RESULT=I+Pf.
 |
 | If you store M0, you would get the following penalty, i.e. additional
 | bytes compared to the case where Pc is stored and S(Pf-Pc) is computed:
 |
 | penalty=(# of coarse boxes)*(size of fine box)-(# of coarse grid points)*
 |                              (grid point size)
 |
 | It is sometimes amazing how complex tasks become so simple...
 |
 | Written by Raz Gordon, Jan 1993.
 */
#ifdef  TIMING
include "timing.h"
endif
#include "general.h"

int     nIter = 2;              // # of decompressor iterations

/*
 | produce a decompressed image from the compressed file. Compressed file
 | format is:
 |
 | flags (1 byte), matchMatrix, fine low-pass, coarse low-pass / M0 (according
 | to flag).
 */
image *
decompress(bitStream& bs){
        uchar flags;
        image *M0, *I;
        int iter;
        bs.read(&flags, sizeof(uchar), 1, sizeof(uchar) * 8, 0);
#ifdef  TIMING
        globTimer.start();
#endif
        matchMatrix match(bs);
        filterImage *Pf = new filterImage(bs);
        if((flags & CF_SHRINK) != 0){              // S(Pf-Pc) stored
                M0 = new image(bs);
                I = new image(Pf->xSize(), Pf->ySize(), 0);
        }
        else{                                      // compute M0
#if     defined(TIMING) && defined(DEBUG)
                globTimer.stop();
                printf("M0 compute start time = %f\n", globTimer.time());
                globTimer.start();
#endif
                filterImage *Pc = new filterImage(bs);
                Pc->leftSub(*Pf);                  // Pc = Pf - Pc
```

DECMPRS.CPP          Thursday, January 28, 1993 6.1 pm                          Page 2

```
                MO = new image(Pf->xSize() >> match.log2ShrinkX,
                 Pf->ySize() >> match.log2ShrinkY, 0);
                Pc->S((*MO), match);            // MO = S(Pf - Pc)
                I = Pc;
        }
#if     defined(TIMING) && defined(DEBUG)
        globTimer.stop();
        printf("Before iterations, time = %f\n", globTimer.time());
        globTimer.start();
#endif
        image P(MO->xSize(), MO->ySize());
        for(iter = 0; iter < nIter - 1; iter++){
                P += (*MO);
                P.V((*I), match);
                I->S(P, match);
        }
        // last iteration
        P += (*MO);
        P.V((*I), match);
        (*I) += *Pf;
#ifdef  TIMING
        globTimer.stop();
#endif
        delete MO;
#ifdef  FILTOUT
        I->filter124(*Pf);
        delete I;
        return Pf;
#else
        delete Pf;
        return I;
#endif
}   /* decompress */
```

FASTDCMP.CPP                Thursday, January 28, 1993 8:02 pm                        Page 1

```cpp
/*
 | A 3-plane RGB file-to-file decompressor.
 */
#include <fcntl.h>
#include <sys/stat.h>
#include <timer.h>
#include "general.h"
#include "decmprs.h"

void
main(void){
        bitStream inBs("test.cmp", O_RDONLY|O_BINARY);
        bitStream outBs("out.bin", O_WRONLY|O_BINARY|O_TRUNC|O_CREAT,
         S_IREAD|S_IWRITE);
        int i;
        Timer timer;
        timer.reset();
        timer.start();
        for(i = 0; i < 3; i++){
                image *img = decompress(inBs);
                img->dump(outBs, 0);
                delete img;
        }
        timer.stop();
        printf("time = %f\n", timer.time());
}   /* main */
```

FASTECMP.CPP            Thursday, January 28, 1993 8:__ pm                    Page 1

```cpp
/*
 | A 3-plane RGB file-to-file compressor.
 */
#include <stdlib.h>
#include <stdio.h>
#include <fcntl.h>
#include <sys/stat.h>
#include "general.h"
#include "compress.h"

#ifdef  OLD_DEBUG
bitStream *fineBs, *coarseBs;
FILE *fineDbg, *coarseDbg, *matchDbg;
endif void
main(int argc, char *argv[]){
        if(argc != 4){
                fprintf(stderr, "Usage: fastecmp raw-file dimX dimY\n");
                exit(1);
        }
#ifdef  OLD_DEBUG
        fineBs = new bitStream("fine.bin", O_WRONLY|O_BINARY|O_CREAT|O_TRUNC,
          S_IREAD|S_IWRITE);
        coarseBs = new bitStream("coarse.bin",
          O_WRONLY|O_BINARY|O_CREAT|O_TRUNC, S_IREAD|S_IWRITE);
        if((fineDbg = fopen("fine.dbg", "w")) == NULL)
                perror("fine.dbg");
        if((coarseDbg = fopen("coarse.dbg", "w")) == NULL)
                perror("coarse.dbg");
        if((matchDbg = fopen("match.dbg", "w")) == NULL)
                perror("match.dbg");
#endif
        int i;
        bitStream inBs(argv[1], O_RDONLY|O_BINARY);
        bitStream outBs("test.cmp", O_CREAT|O_TRUNC|O_WRONLY|O_BINARY,
          S_IWRITE|S_IREAD);
        for(i = 0; i < 3; i++){
                int fileDimX = atoi(argv[2]), fileDimY = atoi(argv[3]);
                int log2CoarseX = 3, log2CoarseY = 3;
                int log2FineX = 2, log2FineY = 2;
                image plane(inBs, fileDimX, fileDimY,
                  fileDimX & ((1 << log2CoarseX) - 1),   // cut the modulu
                  fileDimY & ((1 << log2CoarseY) - 1));
                compress(plane, log2CoarseX, log2CoarseY, log2FineX,
                  log2FineY, outBs, 0, 7, 4);
        }
#ifdef  OLD_DEBUG
        delete fineBs;
        delete coarseBs;
        fclose(fineDbg);
        fclose(coarseDbg);
        fclose(matchDbg);
#endif
}  /* main */
```

GENERAL.CPP                Thursday, January 28, 1993 6... pm                Page 1

```cpp
#ifdef SAFETY
#include <limits.h>
#endif
#ifdef LIMITV
#include <math.h>
#endif
#include <malloc.h>
#include <stdlib.h>
#include <string.h>
#include "general.h"
#ifdef TIMING
#include "timing.h"
endif define N_STOP_LINES    1000                    // # of lines to improve short   targa::mult01[UCHAR_MAX + 1],
        targa::mult03[UCHAR_MAX + 1],
        targa::mult06[UCHAR_MAX + 1],
        targa::mult08[UCHAR_MAX + 1],
        targa::multInv3[UCHAR_MAX + 1],
        targa::mult16[UCHAR_MAX + 1],
        targa::multInv16[512 + 1];

const int
        targa::R = 2, targa::G = 1, targa::B = 0;       // pixel color indices static int
nbits(register unsigned val){
        register i = 0;
        while(val != 0){
                i++;
                val >>= 1;
        }
        return i;
}   /* nbits */

/*
 | matchMatrix.
 */
matchMatrix::matchMatrix(bitStream& bs){
        register int i, j;
        int aBitsX, aBitsY, qBits;
        VType vMin, vMax;
        bs.read(&log2ShrinkX, sizeof(log2ShrinkX), 1, 3, 0);
        bs.read(&log2ShrinkY, sizeof(log2ShrinkY), 1, 3, 0);
        bs.read(&log2FineX, sizeof(log2FineX), 1, 3, 0);
        bs.read(&log2FineY, sizeof(log2FineY), 1, 3, 0);
        bs.read(&nX, sizeof(nX), 1, 9, 0);
        bs.read(&nY, sizeof(nY), 1, 9, 0);
        aBitsX = nbits((nX >> log2ShrinkX) - 1);
        aBitsY = nbits((nY >> log2ShrinkY) - 1);
        bs.read(&vMin, sizeof(vMin), 1, sizeof(vMin) * 8, 0);
        bs.read(&vMax, sizeof(vMax), 1, sizeof(vMax) * 8, 0);
        bs.read(&vBits, sizeof(vBits), 1, 5, 0);
        if((qBits = nbits(vMax - vMin) - vBits) < 0)
                qBits = 0;
        V = new VType *[nY];
        for(i = 0; i < nY; i++){
                V[i] = new VType[nX];
                bs.read(V[i], sizeof(V[i][0]), nX, vBits, qBits, vMin);
        }
```

GENERAL.CPP            Thursday, January 28, 1993    pm            Page 2

```cpp
            A = new pair *[nY];
            register ushort *tmpVec = new ushort [nX];
            register pair *p;
            for(i = 0; i < nY; i++){
                    p = A[i] = new pair[nX];
                    bs.read(tmpVec, sizeof(tmpVec[0]), nX, aBitsY, 0);
                    for(j = 0; j < nX; j++)
                            (*p++)[0] = tmpVec[j];
                    p = A[i];
                    bs.read(tmpVec, sizeof(tmpVec[0]), nX, aBitsX, 0);
                    for(j = 0; j < nX; j++)
                            (*p++)[1] = tmpVec[j];
            }
            delete []tmpVec;
}   /* matchMatrix::matchMatrix */ matchMatrix::matchMatrix(uchar l2ShrinkX, uchar l2ShrinkY, uchar l2FineX,
            uchar l2FineY, ushort n_X, ushort n_Y, int vB){
            int i;
            log2ShrinkX = l2ShrinkX;
            log2ShrinkY = l2ShrinkY;
            log2FineX = l2FineX;
            log2FineY= l2FineY;
            nX = n_X;
            nY = n_Y;
            vBits = vB;
            V = new VType *[nY];
            A = new pair *[nY];
            for(i = 0; i < nY; i++){
                    V[i] = new VType[nX];
                    A[i] = new pair[nX];
            }
}   /* matchMatrix::matchMatrix */ matchMatrix::~matchMatrix(){
            register int i;
            for(i = 0; i < nY; i++){
                    delete []V[i];
                    delete []A[i];
            }
            delete []V;
            delete []A;
}   /* matchMatrix::~matchMatrix */ void
matchMatrix::dump(bitStream& bs){
            register int i, j;
            int aBitsX, aBitsY, qBits;
            VType vMin, vMax;
            bs.write(&log2ShrinkX, sizeof(log2ShrinkX), 1, 3, 0);
            bs.write(&log2ShrinkY, sizeof(log2ShrinkY), 1, 3, 0);
            bs.write(&log2FineX, sizeof(log2FineX), 1, 3, 0);
            bs.write(&log2FineY, sizeof(log2FineY), 1, 3, 0);
            bs.write(&nX, sizeof(nX), 1, 9, 0);
            bs.write(&nY, sizeof(nY), 1, 9, 0);
            vMin = vMax = V[0][0];
            for(i = 0; i < nY; i++){
                    register VType *p = V[i];
                    for(j = 0; j < nX; j++, p++){
                            if(*p < vMin)
                                    vMin = *p;
                            else if(*p > vMax)
```

GENERAL.CPP

```
                              vMax = *p;
                }
        }
        bs.write(&vMin, sizeof(vMin), 1, sizeof(vMin) * 8, 0);
        bs.write(&vMax, sizeof(vMax), 1, sizeof(vMax) * 8, 0);
        bs.write(&vBits, sizeof(vBits), 1, 5, 0);
        if((qBits = nbits(vMax - vMin) - vBits) < 0)
                qBits = 0;
        for(i = 0; i < nY; i++)
                bs.write(V[i], sizeof(V[i][0]), nX, vBits, qBits, vMin);
        register ushort *tmpVec = new ushort[nX];
        register pair *p;
        aBitsX = nbits((nX >> log2ShrinkX) - 1);
        aBitsY = nbits((nY >> log2ShrinkY) - 1);
        for(i = 0; i < nY; i++){
                p = A[i];
                for(j = 0; j < nX; j++)
                        tmpVec[j] = (*p++)[0];
                bs.write(tmpVec, sizeof(tmpVec[0]), nX, aBitsY, 0);
                p = A[i];
                for(j = 0; j < nX; j++)
                        tmpVec[j] = (*p++)[1];
                bs.write(tmpVec, sizeof(tmpVec[0]), nX, aBitsX, 0);
        }
        delete []tmpVec;
}   /* matchMatrix::dump */

/*
 | image.
 */
image::image(register int dX, register int dY, int zero){
#ifdef  TIMING
        int run = globTimer.status();
        if(run)
                globTimer.stop();
#endif
        register int i;
        dimX = dX;
        dimY = dY;
        imageData = new short *[dY];
        for(i = 0; i < dY; i++){
                imageData[i] = new short[dX];
                if(zero)
                        memset(imageData[i], 0, dX * sizeof(imageData[i][0]));
        }
#ifdef  TIMING
        if(run)
                globTimer.start();
#endif
}   /* image::image */ image::image(bitStream& bs, int dX, int dY, int cutX, int cutY){
        int binMode;
        ushort fileDimX, fileDimY, startY, startX;
#ifdef  TIMING
        int run = globTimer.status();
        if(run)
                globTimer.stop();
#endif
        if(dX < 0 || dY < 0){
                bs.read(&fileDimX, sizeof(ushort), 1, 12);
                bs.read(&fileDimY, sizeof(ushort), 1, 12);
```

```
                        binMode = 0;
        }
        else{
                        fileDimX = dX;
                        fileDimY = dY;
                        binMode = 1;
        }
        register int i, j;
        dimY = fileDimY - cutY;
        dimX = fileDimX - cutX;
        startY = cutY >> 1;
        startX = cutX >> 1;
        imageData = new short *[dimY];
        for(i = j = 0; i < fileDimY; i++){
                        if(i < startY || i >= startY + dimY){
                                    bs.skip(fileDimX, binMode ? 8 : 9);
                                    continue;
                        }
                        imageData[j] = new short[dimX];
                        if(binMode){
                                    bs.skip(startX, 8);
                                    bs.read(imageData[j],sizeof(imageData[j][0]),dimX,8);
                                    bs.skip(fileDimX - dimX - startX, 8);
                        }
                        else{
                                    bs.skip(startX, 9);
                                    bs.read(imageData[j], sizeof(imageData[j][0]), dimX,
                                      9, 0, -256);
                                    bs.skip(fileDimX - dimX - startX, 9);
                        }
                        j++;
            }
#ifdef  TIMING
        if(run)
                        globTimer.start();
#endif
}  /* image::image */ image::image(targa& tg, int planeId, int cutX, int cutY){
ifdef  TIMING
        int run = globTimer.status();
        if(run)
                        globTimer.stop();
#endif
        register int i;
        dimX = tg.xSize() - cutX;
        dimY = tg.ySize() - cutY;
        imageData = new short *[dimY];
        for(i = 0; i < dimY; i++)
                        imageData[i] = new short[dimX];
        tg.getPlane(*this, planeId, cutX, cutY);         // fill in imageData
#ifdef  TIMING
        if(run)
                        globTimer.start();
#endif
}  /* image::image */ void
image::dump(bitStream& bs, int dumpDimensions){
        register int i;
        int binMode;
        if(dumpDimensions){
```

GENERAL.CPP                Thursday, January 28, 1993 8  pm                      Page 5

```
                        bs.write(&dimX, sizeof(dimX), 1, 12);
                        bs.write(&dimY, sizeof(dimY), 1, 12);
                        binMode = 0;
                }
                else
                        binMode = 1;
                for(i = 0; i < dimY; i++){
                        if(binMode){
                                register int j;
                                register short *p;
                                for(j=dimX, p=imageData[i]; j > 0; j--, p++){
#ifdef  SAFETY
                                        if(*p < 0 || *p > UCHAR_MAX)
                                                fprintf(stderr,
                                                   "image::dump: Ill pixel value %d\n",
                                                   (int)*p);
#endif
                                        if(*p < 0)
                                                *p = 0;
                                        else if(*p > UCHAR_MAX)
                                                *p = UCHAR_MAX;
                                }
                                bs.write(imageData[i],sizeof(imageData[i][0]),dimX,8);
                        }
                        else
                                bs.write(imageData[i], sizeof(imageData[i][0]), dimX,
                                   9, 0, -256);
                }
}   /* image::dump */ image::~image(){
        register int i;
        for(i = dimY - 1; i >= 0; i--)
                delete []imageData[i];
        delete []imageData;
}   /* image::~image */ void
image::operator +=(const image& rhs){
        register short *l, *r;
        register int i, j;
#ifdef  SAFETY
        if(rhs.dimX != dimX || rhs.dimY != dimY){
                fprintf(stderr, "image::operator+=: size mismatch!\n");
                exit(1);
        }
#endif
        for(i = dimY - 1; i >= 0; i--){
                l = imageData[i];
                r = rhs.imageData[i];
                for(j = dimX; j > 0; j--)
                        *l++ += *r++;
        }
}   /* image::operator += */ void
image::add(short val){
        register short **r, *c;
        int y, x;
        for(y = dimY, r = imageData; y > 0; y--, r++)
                for(x = dimX, c = *r; x > 0; x--, *c++ += val);
}   /* image::add */
```

GENERAL.CPP          Thursday, January 28, 1993 8     pm                              Page 6

```cpp
void
image::mult(short val){
        register short **r, *c;
        int y, x;
        for(y = dimY, r = imageData; y > 0; y--, r++)
                for(x = dimX, c = *r; x > 0; x--, *c++ *= val);
}  /* image::mult */ void
image::makePositive(){
        register short **r, *c;
        int y, x;
        for(y = dimY, r = imageData; y > 0; y--, r++)
                for(x = dimX, c = *r; x > 0; x--, c++)
                        *c = abs(*c);
}  /* image::makePositive */ ifdef   FILTOUT static int
cmpShort(const void *e1, const void *e2){
        return *(short *)e1 - *(short *)e2;
}  /* cmpShort */ static short
median(int n, ...){
        short *p = (short *)...;
        qsort(p, n, sizeof(short), cmpShort);
        return p[n >> 1];
}  /* median */ void
image::filter124(image& r){
        int y, x;
#ifdef   SAFETY
        if(r.dimX != dimX || r.dimY != dimY){
                fprintf(stderr, "image::filter124: Dimension mismatch!\n");
                exit(1);
        }
#endif
        memcpy(r.imageData[0], imageData[0], dimX * sizeof(imageData[0][0]));
        for(y = 1; y < dimY - 1; y++){
                r.imageData[y][0] = imageData[y][0];
                for(x = 1; x < dimX; x++){
                        r.imageData[y][x] =
#ifdef   defined(FILTER124)
                                (imageData[y-1][x-1] +
                                (imageData[y-1][x] << 1) +
                                imageData[y-1][x+1] +
                                (imageData[y][x-1] << 1) +
                                (imageData[y][x] << 2) +
                                (imageData[y][x+1] << 1) +
                                imageData[y+1][x-1] +
                                (imageData[y+1][x] << 1) +
                                imageData[y+1][x+1]) >> 4;
#elif    defined(MEXICAN)
                                (-imageData[y-1][x]) +
                                (-imageData[y][x-1]) +
                                (imageData[y][x] * 5) +
                                (-imageData[y][x+1]) +
                                (-imageData[y+1][x]);
```

```
#else
                            median(9,
                              imageData[y-1][x-1], imageData[y-1][x],
                              imageData[y-1][x+1], imageData[y][x-1],
                              imageData[y][x], imageData[y][x+1],
                              imageData[y+1][x-1], imageData[y+1][x],
                              imageData[y+1][x+1]);
#endif
                }
                r.imageData[y][dimX - 1] = imageData[y][dimX - 1];
        }
        memcpy(r.imageData[dimY-1], imageData[dimY-1],
          dimX * sizeof(imageData[0][0]));
}   /* image::filter124 */ endif   FILTOUT void
image::leftSub(const image& rhs){
        register short *l, *r;
        register int i, j;
#ifdef  SAFETY
        if(rhs.dimX != dimX || rhs.dimY != dimY){
                fprintf(stderr, "image::operator+=: size mismatch!\n");
                exit(1);
        }
#endif
        for(i = dimY - 1; i >= 0; i--){
                l = imageData[i];
                r = rhs.imageData[i];
                for(j = dimX; j > 0; l++, j--)
                        *l = *r++ - *l;
        }
}   /* image::leftSub */

/*
 | Shrink operator.
 */
void
image::S(image& r, const matchMatrix& m){
        int x, y, lx, ly;
        register int cx, cy;
        uchar log2ShrinkX = m.log2ShrinkX;
        uchar log2ShrinkY = m.log2ShrinkY;
        register short  **row, *col;
#ifdef  SAFETY
        if((r.dimX << log2ShrinkX) != dimX || (r.dimY << log2ShrinkY) != dimY){
                fprintf(stderr, "image::S: wrong dimensions!\n");
                exit(1);
        }
        if(log2ShrinkX > FIXED_NBITS || log2ShrinkY > FIXED_NBITS){
                fprintf(stderr, "image::S: Shrink factor(s) too large.\n");
                exit(1);
        }
#endif
        lx = 1 << log2ShrinkX;
        ly = 1 << log2ShrinkY;
        for(y = r.dimY - 1; y >= 0; y--)
                for(x = r.dimX - 1; x >= 0; x--){
                        register short ySum = 0;
                        for(row = &imageData[y << log2ShrinkY], cy = ly;
                          cy > 0; row++, cy--){
```

GENERAL.CPP                Thursday, January 28, 1993 8.  pm                          Page 8

```
                            register short xSum = 0;
                            for(col = &(*row)[x << log2ShrinkX], cx = lx;
                             cx > 0; col++, cx--)
                                    xSum += *col;
                            if(xSum >= 0)
                                    ySum+= (xSum + (lx>>1)) >> log2ShrinkX;
                            else
                                    ySum+= -(((-xSum) + (lx >> 1)) >>
                                      log2ShrinkX);
                    }
                    r.imageData[y][x] = (ySum >= 0) ? ySum >> log2ShrinkY :
                     -((-ySum) >> log2ShrinkY);
            }
} /* image::S */ void
image::V(image& r, const matchMatrix& m){
        int fx, fy;
        register int cy, cx;
        short **srcRow, **dstRow;
        int dstColIdx, srcColIdx;
        uchar log2FineX = m.log2FineX, log2FineY = m.log2FineY;
        ushort lx = 1 << log2FineX, ly = 1 << log2FineY;
#ifdef SAFETY
        if(r.dimX != (m.nX << m.log2FineX) || r.dimY != (m.nY << m.log2FineY)){
                fprintf(stderr, "image::V: Size mismatch!\n");
                exit(1);
        }
#endif
        for(fy = m.nY - 1; fy >= 0; fy--){
                pair *lp = m.A[fy];
                VType *lV = m.V[fy];
                short **dstRowHook = &r.imageData[fy << log2FineY];
                for(fx = m.nX - 1; fx >= 0; fx--){
                        // fill in the (fy, fx) fine box of r from
                        // the A[fy][fx] fine box of this multiplied by
                        // V[fy][fx]
                        pair& p = lp[fx];
                        VType V = lV[fx];
                        srcRow = &imageData[p[0] << log2FineY];
                        dstRow = dstRowHook;
                        srcColIdx = p[1] << log2FineX;
                        dstColIdx = fx << log2FineX;
                        for(cy = ly; cy > 0; cy--){
                                register short *srcCol =
                                                &(*srcRow++)[srcColIdx];
                                register short *dstCol =
                                                &(*dstRow++)[dstColIdx];
                                for(cx = lx; cx > 0; cx--){
                                        register short mres = V * *srcCol++;
                                        *dstCol++ = (mres >= 0) ?
                                         (mres >> FIXED_NBITS) :
                                         -((-mres) >> FIXED_NBITS);
                                }
                        }
                }
        }
} /* image::V */ static long
innerProd(short row1, int col1, short row2, int col2, int boxX, int boxY){
        register long sum = 0;
```

```
                register short *p1, *p2;
                register int i;
                while(boxY-- > 0){
                        p1 = &(*row1++)[col1];
                        p2 = &(*row2++)[col2];
                        for(i = boxX; i > 0; i--)
                                sum += (long)(*p1++) * (long)(*p2++);
                }
                return sum;
        }  /* innerProd */ static float
sqInProd(short row1, int col1, short row2, int col2, int boxX, int boxY,
 long& inProd){
        register long sum = 0;
        register short *p1, *p2;
        register int i;
        while(boxY-- > 0){
                p1 = &(*row1++)[col1];
                p2 = &(*row2++)[col2];
                for(i = boxX; i > 0; i--)
                        sum += (long)(*p1++) * (long)(*p2++);
        }
        inProd = sum;
        return (float)sum * (float)sum;
}  /* sqInProd */

/*
| Foreach fine box of the image, finds the best-matching shrunk coarse
| box, and calculates the multiplication factor for that match.
*/
void
image::findMatch(const image& shrunkCoarse, matchMatrix& m){
        int fineX, fineY, yVal;
        int cY, cX;
        int xCnt, stopCnt, col;
        int prime = 11;
        int nXCBoxes = m.nX >> m.log2ShrinkX;
        int nYCBoxes = m.nY >> m.log2ShrinkY;
        int log2FineX = m.log2FineX, log2FineY = m.log2FineY;
        int fineBoxX = 1 << log2FineX, fineBoxY = 1 << log2FineY;
        short **row, **fineRow;
        float **invSqCNorm;                         // values of ||Cij||^2
#ifdef  SAFETY
        int ovCnt = 0;
        VType maxOvVal = 0;
        if(dimX != (m.nX << log2FineX) || dimY != (m.nY << log2FineY)){
                fprintf(stderr, "image::findMatch: Illegal sizes!\n");
                exit(1);
        }
        if(shrunkCoarse.dimX != (dimX >> m.log2ShrinkX) ||
           shrunkCoarse.dimY != (dimY >> m.log2ShrinkY)){
                fprintf(stderr, "image::findMatch: Illegal coarse sizes!\n");
                exit(1);
        }
#endif
        invSqCNorm = new float *[nYCBoxes];
        for(cY = 0, row = shrunkCoarse.imageData; cY < nYCBoxes; cY++,
          row += fineBoxY){
                register float *p = invSqCNorm[cY] = new float[nXCBoxes];
                for(cX = 0, xCnt = 0; cX < nXCBoxes; cX++, xCnt += fineBoxX){
                        register float ip = (float)innerProd(row, xCnt, row,
```

GENERAL.CPP                Thursday, January 28, 1993  8:   pm                Page 10

```cpp
                                        xCnt, fineBoxX, fineBoxY);
                                *p++ = ip != 0 ? (1.0 / ip) : 0;
                        }
                }
                // performs the search
                for(fineY = 0, fineRow = imageData; fineY < m.nY; fineY++,
                  fineRow += fineBoxY){
                        for(fineX = xCnt = 0; fineX < m.nX; fineX++, xCnt += fineBoxX){
                                float bestCos = 0;
                                int bestX = 0, bestY = 0;
                                long bestInProd = 0;
                                for(cY = 0, yVal = 0, stopCnt = N_STOP_LINES;
                                  cY < nYCBoxes && stopCnt > 0;
                                  cY++, yVal = (yVal + prime) % nYCBoxes, stopCnt--){
                                        row = &shrunkCoarse.imageData[yVal<<log2FineY];
                                        for(cX = col = 0; cX < nXCBoxes; cX++,
                                          col += fineBoxX){
                                                long inProd;
                                                register float sqCosVal =
                                                  sqInProd(row, col,
                                                  fineRow, xCnt, fineBoxX, fineBoxY,
                                                  inProd) * invSqCNorm[yVal][cX];
                                                if(sqCosVal > bestCos
#ifdef  LIMITV
                                                  && fabs(inProd*invSqCNorm[yVal][cX])<1
#endif
                                                  ){
                                                        bestCos = sqCosVal;
                                                        bestX = cX;
                                                        bestY = yVal;
                                                        bestInProd = inProd;
                                                        stopCnt = N_STOP_LINES;
                                                }
                                        }
                                }
                                m.V[fineY][fineX] = (VType)(bestInProd *
                                  invSqCNorm[bestY][bestX] * (1 << FIXED_NBITS));
#ifdef  SAFETY
                                if(m.V[fineY][fineX] < -(1 << FIXED_NBITS) ||
                                  m.V[fineY][fineX] > (1 << FIXED_NBITS)){
                                        ovCnt++;
                                        if(abs(m.V[fineY][fineX]) > maxOvVal)
                                                maxOvVal = abs(m.V[fineY][fineX]);
                                }
#endif
                                pair& p = m.A[fineY][fineX];
                                p[0] = bestY;
                                p[1] = bestX;
                        }
                }
#ifdef  DEBUG
        if(ovCnt > 0)
                printf("%d Overflows, max %d\n", ovCnt, (int)maxOvVal);
#endif
}  /* image::findMatch */

/*
 | filter images.
 */
filterImage::filterImage(bitStream& bs) : image(
                (bs.read(&dimX, sizeof(dimX), 1, 12), dimX),
                (bs.read(&dimY, sizeof(dimY), 1, 12), dimY)){
```

GENERAL.CPP          Thursday, January 28, 1993 8:  pm                    Page 11

```cpp
        register int j;
        int qBits;
#ifdef  TIMING
        int run = globTimer.status();
        if(run)
                globTimer.stop();
#endif
        bs.read(&gBits, sizeof(gBits), 1, 4);
        bs.read(&log2BoxX, sizeof(log2BoxX), 1, 3);
        bs.read(&log2BoxY, sizeof(log2BoxY), 1, 3);
        bs.read(&gridMin, sizeof(gridMin), 1, 8, FIXED_NBITS);
        bs.read(&gridMax, sizeof(gridMax), 1, 8, FIXED_NBITS);
        if((qBits = nbits(gridMax - gridMin) - gBits) < 0)
                qBits = 0;
        gridSizeX = (dimX >> log2BoxX) + 1;
        gridSizeY = (dimY >> log2BoxY) + 1;
        gridVals = new short *[gridSizeY];
        for(j = 0; j < gridSizeY; j++){
                gridVals[j] = new short[gridSizeX];
                bs.read(gridVals[j], sizeof(gridVals[j][0]), gridSizeX, gBits,
                  qBits, gridMin);
        }
#ifdef  TIMING
        if(run)
                globTimer.start();
#endif
        span();          // spans the image
}   /* filterImage::filterImage */ void
filterImage::dump(bitStream& bs){
        int j, qBits;
        bs.write(&dimY, sizeof(dimY), 1, 12);
        bs.write(&dimX, sizeof(dimX), 1, 12);
        bs.write(&gBits, sizeof(gBits), 1, 4);
        bs.write(&log2BoxX, sizeof(log2BoxX), 1, 3);
        bs.write(&log2BoxY, sizeof(log2BoxY), 1, 3);
        if((qBits = nbits(gridMax - gridMin) - gBits) < 0)
                qBits = 0;
        bs.write(&gridMin, sizeof(gridMin), 1, 8, FIXED_NBITS);
        bs.write(&gridMax, sizeof(gridMax), 1, 8, FIXED_NBITS);
        for(j = 0; j < gridSizeY; j++)
                bs.write(gridVals[j], sizeof(gridVals[j][0]), gridSizeX, gBits,
                  qBits, gridMin);
}   /* filterImage::dump */ filterImage::filterImage(const image& src, uchar l2BoxX, uchar l2BoxY,
                        int gb) : image(src.xSize(), src.ySize(), 0){
        register int i;
        gBits = gb;
        log2BoxX = l2BoxX;
        log2BoxY = l2BoxY;
        gridSizeX = (src.xSize() >> l2BoxX) + 1;
        gridSizeY = (src.ySize() >> l2BoxY) + 1;
        gridVals = new short *[gridSizeY];
        for(i = 0; i < gridSizeY; i++)
                gridVals[i] = new short[gridSizeX];
        fillGrid(src);           // determines grid values
        quantize();              // quantize the grid values
        span();                  // spans the lowpass image
}   /* filterImage::filterImage */
```

GENERAL.CPP             Thursday, January 28, 1993 8:   pm                    Page 12

```cpp
/*
 | Creates a null filter (zero grid values), and a null image.
 */
filterImage::filterImage(ushort dX, ushort dY, uchar l2BoxX, uchar l2BoxY,
                                int gb) : image(dX, dY, 1){
        register int i;
        gBits = gb;
        log2BoxX = l2BoxX;
        log2BoxY = l2BoxY;
        gridSizeX = (dX >> l2BoxX) + 1;
        gridSizeY = (dY >> l2BoxY) + 1;
        gridVals = new short *[gridSizeY];
        gridMin = gridMax = 0;
        for(i = 0; i < gridSizeY; i++){
                gridVals[i] = new short[gridSizeX];
                memset(gridVals[i], 0, gridSizeX * sizeof(gridVals[i][0]));
        }
} /* filterImage::filterImage */ if     defined(CONVOLUTION)

void
filterImage::fillGrid(const image& src){
        int gx, gy;
        const short **yp, *xp;
        int halfYBox = 1 << (log2BoxY - 1), halfXBox = 1 << (log2BoxX - 1);
        for(gy = 0; gy < gridSizeY; gy++){
                int startY = (gy << log2BoxY) - halfYBox;
                int endY = (gy << log2BoxY) + halfYBox;
                int yShift = 0;
                if(gy <= 0){
                        yShift = 1;
                        startY = 0;
                }
                else if(gy >= gridSizeY - 1){
                        yShift = 1;
                        endY -= halfYBox;
                }
                for(gx = 0; gx < gridSizeX; gx++){
                        int startX = (gx << log2BoxX) - halfXBox;
                        int endX = (gx << log2BoxX) + halfXBox;
                        int xShift = 0, y, x;
                        short ySum = 0;
                        if(gx <= 0){
                                xShift = 1;
                                startX = 0;
                        }
                        else if(gx >= gridSizeX - 1){
                                xShift = 1;
                                endX -= halfYBox;
                        }
                        for(y = endY - startY, yp = &src.imageData[startY];
                         y > 0; y--, yp++){
                                short xSum = 0;
                                for(x = endX - startX, xp = &(*yp)[startX];
                                 x > 0; x--)
                                        xSum += *xp++;
#ifdef  SAFETY
                                if(xSum < 0){
                                        fprintf(stderr,
                                          "filterImage::fillGrid: "
                                          "Negative xSum!\n");
```

GENERAL.CPP        Thursday, January 28, 1993 8:   )m        Page 13

```cpp
                                        exit(1);
                                }
#endif
                                ySum += (xSum + (halfXBox >> xShift)) >>
                                  (log2BoxX - xShift);
                        }
                        gridVals[gy][gx] =
                          (ySum >> (log2BoxY - yShift)) << FIXED_NBITS;
                }
        }
}  /* filterImage::fillGrid */ elif   defined(GRID)

void
filterImage::fillGrid(const image& src){
        int gx, gy;
        const short **yp, *xp;
        int halfYBox = 1, halfXBox = 1;
        for(gy = 0; gy < gridSizeY; gy++){
                int startY = (gy << log2BoxY) - halfYBox;
                int endY = (gy << log2BoxY) + halfYBox;
                int yShift = 0;
                if(gy <= 0){
                        yShift = 1;
                        startY = 0;
                }
                else if(gy >= gridSizeY - 1){
                        yShift = 1;
                        endY -= halfYBox;
                }
                for(gx = 0; gx < gridSizeX; gx++){
                        int startX = (gx << log2BoxX) - halfXBox;
                        int endX = (gx << log2BoxX) + halfXBox;
                        int xShift = 0, y, x;
                        short ySum = 0;
                        if(gx <= 0){
                                xShift = 1;
                                startX = 0;
                        }
                        else if(gx >= gridSizeX - 1){
                                xShift = 1;
                                endX -= halfYBox;
                        }
                        for(y = endY - startY, yp = &src.imageData[startY];
                         y > 0; y--, yp++){
                                short xSum = 0;
                                for(x = endX - startX, xp = &(*yp)[startX];
                                 x > 0; x--)
                                        xSum += *xp++;
#ifdef  SAFETY
                                if(xSum < 0){
                                        fprintf(stderr,
                                          "filterImage::fillGrid: "
                                          "Negative xSum!\n");
                                        exit(1);
                                }
#endif
                                ySum += (xSum + (halfXBox >> xShift)) >>
                                  (1 - xShift);
                        }
                        gridVals[gy][gx] =
```

GENERAL.CPP        Thursday, January 28, 1993 8:... ,m        Page 14

```cpp
                            (ySum >> (1 - yShift)) << FIXED_NBITS;
            }
        }
}   /* filterImage::fillGrid */ elif   defined(BILINEAR)

void
filterImage::fillGrid(const image& src){
        int gy, gx, col;
        short **hookY, **yp, *xp;
        int xBoxSize = 1 << log2BoxX, yBoxSize = 1 << log2BoxY;
        int xBox12 = xBoxSize * 12, yBox12 = yBoxSize * 12;
        long x2minus1Y = ((long)xBoxSize * xBoxSize - 1L) * yBoxSize;
        long y2minus1X = ((long)yBoxSize * yBoxSize - 1L) * xBoxSize;
        long x2y2minus1 = ((long)xBoxSize * xBoxSize - 1L) *
                            ((long)yBoxSize * yBoxSize - 1L);
        int yShiftFirst, yShiftSecond, xShiftFirst, xShiftSecond;
        int y, x;
        memset(gridVals[0], 0, gridSizeX * sizeof(gridVals[0][0]));
        for(gy = 0, hookY = src.imageData; gy < gridSizeY - 1; gy++,
         hookY += yBoxSize){
                yShiftFirst = (gy <= 0) ? 0 : 1;
                yShiftSecond = (gy < gridSizeY - 2) ? 1 : 0;
                gridVals[gy + 1][0] = 0;
                for(gx = 0, col = 0; gx < gridSizeX-1; gx++, col += xBoxSize){
                        long sum1 = 0, sumX = 0, sumY = 0, sumXY = 0;
                        xShiftFirst = (gx <= 0) ? 0 : 1;
                        xShiftSecond = (gx < gridSizeX - 2) ? 1 : 0;
                        for(y = 0, yp = hookY; y < yBoxSize; y++, yp++){
                                xp = &(*yp)[col];
                                for(x = 0; x < xBoxSize; x++){
                                        register short pixVal = *xp++;
                                        sum1 += pixVal;
                                        sumX += (long)x * pixVal;
                                        sumY += (long)y * pixVal;
                                        sumXY += (long)x * y * pixVal;
                                }
                        }
                        sumX <<= 1;
                        sumY <<= 1;
                        sumXY <<= 2;
                        long a = sum1 >> 2;
                        long b = sumX + sum1;
                        long c = sumY + sum1;
                        long d = sumXY + b + c - sum1;
                        b = (b >> (2 + log2BoxX)) - a;
                        c = (c >> (2 + log2BoxY)) - a;
                        d = ((d>>(2+log2BoxX+log2BoxY))-b-c-a)>>2;
                        // normalize parameters
                        a = sum1 >> (log2BoxX + log2BoxY);
                        b = b * xBox12 / x2minus1Y;
                        c = c * yBox12 / y2minus1X;
                        d = d * xBox12 * yBox12 / x2y2minus1;
                        gridVals[gy][gx] += (short)
                          ((a-b-c+d)<<(FIXED_NBITS-xShiftFirst-yShiftFirst));
                        gridVals[gy][gx+1] += (short)
                          ((a+b-c-d)<<(FIXED_NBITS-xShiftSecond-yShiftFirst));
                        gridVals[gy+1][gx] += (short)
                          ((a-b+c-d)<<(FIXED_NBITS-xShiftFirst-yShiftSecond));
                        gridVals[gy+1][gx+1] = (short)
                          ((a+b+c+d)<<(FIXED_NBITS-xShiftSecond-yShiftSecond));
```

GENERAL.CPP        Thursday, January 28, 1993 8:( m        Page 15

```cpp
                }
        }
        for(gy = 0; gy < gridSizeY; gy++)
                for(gx = 0; gx < gridSizeX; gx++)
                        if(gridVals[gy][gx] < 0)
                                gridVals[gy][gx] = 0;
                        else if(gridVals[gy][gx] >
                           ((short)UCHAR_MAX << FIXED_NBITS))
                                gridVals[gy][gx] =
                                   ((short)UCHAR_MAX << FIXED_NBITS);
}   /* filterImage::fillGrid */ elif   defined(FIF)

void
filterImage::fillGrid(const image& src){
        int gy, gx, col, y, x;
        short **hookY, **yp, *xp;
        int xBoxSize = 1 << log2BoxX, yBoxSize = 1 << log2BoxY;

for(gy = 0, hookY = src.imageData; gy < gridSizeY - 1; gy++,
         hookY += yBoxSize){
                for(gx = 0, col = 0; gx < gridSizeX-1; gx++, col += xBoxSize){
                        register long sum = 0;
                        for(y = 0, yp = hookY; y < yBoxSize; y++, yp++){
                                xp = &(*yp)[col];
                                for(x = 0; x < xBoxSize; x++, sum += *xp++);
                        }
                        gridVals[gy][gx] = (short)
                           ((sum << FIXED_NBITS) >> (log2BoxX + log2BoxY));
                }
                // fill in the last item on the row
                gridVals[gy][gx] = gridVals[gy][gx-1];
        }
        // fill in the last row
        for(gx = 0; gx < gridSizeX; gx++)
                gridVals[gy][gx] = gridVals[gy-1][gx];
}   /* filterImage::fillGrid */ endif if     defined(CONVOLUTION) || defined(BILINEAR) || defined(GRID)

void
filterImage::span(){
        int gridY, hookY, gridX, hookX;
        short C0, C1, C2, C3, yInc, xInc, rowStartZVal, zVal;
        short C31, C32, C121;
        int yGridLen = gridSizeY - 1, xGridLen = gridSizeX - 1;
        uchar log2BoxXY = log2BoxX + log2BoxY;
        ushort yGridBox = 1 << log2BoxY, xGridBox = 1 << log2BoxX;
        short pixelY, pixelX;
        short *rowPtr;

for(gridY = 0, hookY = 0; gridY < yGridLen; gridY++, hookY+=yGridBox){
                short *thisGridRow = gridVals[gridY];
                short *nextGridRow = gridVals[gridY + 1];
                for(gridX = 0, hookX = 0; gridX < xGridLen;
                 gridX++, hookX += xGridBox){
                        // Calculate bilinear coefficients
                        C0 = thisGridRow[gridX];
                        C1 = thisGridRow[gridX+1] - C0;
```

```cpp
                        C2 = nextGridRow[gridX] - C0;
                        C3 = nextGridRow[gridX+1] - C1 - C2 - C0;
                        C1 = C1<0 ? -((-C1) >> log2BoxX) : (C1 >> (log2BoxX));
                        C2 = C2<0 ? -((-C2) >> log2BoxY) : (C2 >> (log2BoxY));
                        if(C3 >= 0){
                                C3 >>= log2BoxXY;
                                C31 = C3 >> 1;
                                C32 = C3 >> 2;
                        }
                        else{
                                C3 = -C3;
                                C3 >>= log2BoxXY;
                                C31 = -(C3 >> 1);
                                C32 = -(C3 >> 2);
                                C3 = -C3;
                        }
                        C121 = C1 + C2;
                        C121 = C121 < 0 ? -((-C121) >> 1) : (C121 >> 1);
                        yInc = C2 + C31;
                        xInc = C1 + C31;
                        rowStartZVal = C0 + C121 + C32;
                        for(pixelY = 0; pixelY < yGridBox; pixelY++){
                                rowPtr = &imageData[hookY + pixelY][hookX];
                                zVal = rowStartZVal;
                                for(pixelX = 0; pixelX < xGridBox; pixelX++){
                                        *rowPtr++ = zVal >> FIXED_NBITS;
                                        zVal += xInc;
                                }
                                rowStartZVal += yInc;
                                xInc += C3;
                        }
                }
        }
}  /* filterImage::span */ elif   defined(FIF)

void
filterImage::span(){
        int gy, gx, col, y, x;
        short **hookY, **yp, *xp;
        int xBoxSize = 1 << log2BoxX, yBoxSize = 1 << log2BoxY;

for(gy = 0, hookY = imageData; gy < gridSizeY - 1; gy++,
         hookY += yBoxSize){
                for(gx = 0, col = 0; gx < gridSizeX-1; gx++, col += xBoxSize){
                        register short gVal = gridVals[gy][gx] >> FIXED_NBITS;
                        for(y = 0, yp = hookY; y < yBoxSize; y++, yp++){
                                xp = &(*yp)[col];
                                for(x = 0; x < xBoxSize; x++, *xp++ = gVal);
                        }
                }
        }
}  /* filterImage::span */ endif void
filterImage::quantize(){
        int i, j, qBits;
        gridMin = gridMax = gridVals[0][0];
        for(j = 0; j < gridSizeY; j++){
```

```
                register short *p = gridVals[j];
                for(i = gridSizeX; i > 0; i--, p++)
                        if(*p < gridMin)
                                gridMin = *p;
                        else if(*p > gridMax)
                                gridMax = *p;
        }
#ifdef  OLD_SAFETY
        if(gridMin < 0 || gridMax > ((unsigned short)UCHAR_MAX<<FIXED_NBITS)){
                fprintf(stderr, "filterImage::dump: Illegal grid value!\n");
                exit(1);
        }
#endif
        if((qBits = nbits(gridMax - gridMin) - gBits) < 0)
                return;          // qBits == 0, nothing to do
#ifdef  NO_AVG_ADD
        unsigned short A = 0;
#else
        unsigned short A = qBits <= 0 ? 0 : (1 << (qBits - 1));
#endif
        for(j = 0; j < gridSizeY; j++){
                register short *p = gridVals[j];
                for(i = gridSizeX; i > 0; i--, p++)
                        *p = (((*p - gridMin) >> qBits) << qBits)+A+gridMin;
        }
}   /* filterImage::quantize */ filterImage::~filterImage(){
        register int i;
        for(i = 0; i < gridSizeY; delete []gridVals[i++]);
        delete []gridVals;
}   /* filterImage::~filterImage */

/*
 | TARGA image handler.
 */
targa::targa(const char *fileName, const char *mode, int dimX, int dimY){
        int i;
        if(dimX > 0 && dimY > 0 && mode[0] == 'w'){
                header.xsize = dimX;
                header.ysize = dimY;
                img = new pixel *[dimY];
                for(i = 0; i < dimY; i++){
                        img[i] = new pixel[dimX];
                        memset(img[i], 0, dimX * sizeof(img[i][0]));
                }
        }
        else
                img = 0;
        if((pf = fopen(fileName, mode)) == NULL){
                perror(fileName);
                exit(1);
        }
        if(mode[0] == 'r'){               // get header
                fread(&header, sizeof(header), 1, pf);
                flipcode = (header.imgdes>>4) & 0x3;                  // ???
                // skip id data
                if(fseek(pf, header.numid, SEEK_CUR) != 0){
fatalSeek:
                        fprintf(stderr,
                          "targa::targa: Seek error! (not a TARGA file?)\n");
                        exit(1);
```

```
                }
                // skip color map data
                if(header.mapsize > 0){
                        switch(header.mapbits){
                        case 15:
                        case 16:
                                i = 2;
                                break;
                        case 24:
                                i = 3;
                                break;
                        case 32:
                                i = 4;
                                break;
                        default:
                                fprintf(stderr,
                                  "targa::targa: bad map entry size %d\n",
                                  header.mapbits);
                                exit(1);
                        }
                        if(fseek(pf, header.mapsize * i, SEEK_CUR) != 0)
                                goto fatalSeek;
                }
                // test image type
                if(header.imgtyp != 2 && header.imgtyp != 3){
                        fprintf(stderr,
                          "Error: Can read only type 2 and 3 TARGA files\n");
                        exit(1);
                }
                if((dataStart = ftell(pf)) < 0){
                        perror("targa::targa: ftell failed");
                        exit(1);
                }
        }
        else
                dataStart = -1;
}   /* targa::targa */ targa::~targa(){
        if(img != 0){
                int i;
                for(i = 0; i < header.ysize; i++)
                        delete []img[i];
                delete []img;
        }
        fclose(pf);
}   /* targa::~targa */ void
targa::getPlane(image& dst, int planeId, int cutX, int cutY){
        char dummy[1];
        dummy[0] = 0;           // for alloca
        unsigned char *lineBuf;
        register unsigned char r, g, b;
        int itemSize, y, x;
        int dimX = header.xsize, dimY = header.ysize;
#ifdef  SAFETY
        if(dimX - cutX != dst.xSize() || dimY - cutY != dst.ySize()){
                fprintf(stderr, "targa::getPlane: size mismatch!\n");
                exit(1);
        }
#endif
        if(dataStart < 0){
```

GENERAL.CPP                Thursday, January 28, 1993 8:  pm                Page 19

```
                fprintf(stderr, "targa::getPlane: Cannot read!\n");
                exit(1);
        }
#endif
        if(header.pixsize == 15)
                itemSize = 2;
        else
                itemSize = header.pixsize >> 3;
        if((lineBuf = (unsigned char *)alloca(dimX * itemSize)) == 0){
                fprintf(stderr, "Fatal: Out of stack!\n");
                exit(1);
        }
        fseek(pf, dataStart, SEEK_SET);
        // skip cutY / 2 lines
        for(y = cutY >> 1; y > 0; y--){
                if(fread(lineBuf, 1, dimX * itemSize, pf) != dimX * itemSize){
                        fprintf(stderr, "targa::getPlane: read error\n");
                        exit(1);
                }
        }
        for(y = 0; y < dimY - cutY; y++){
                register short *dstLine = dst.imageData[y];
                register unsigned char *srcLine =
                                        &lineBuf[(cutX >> 1) * itemSize];
                unsigned short pix;
                short yVal;
                if(fread(lineBuf, 1, dimX * itemSize, pf) != dimX * itemSize){
                        fprintf(stderr, "targa::getPlane: read error\n");
                        exit(1);
                }
                for(x = 0; x < dimX - cutX; x++){
                        // first, extract RGB values
                        switch(itemSize){
                        case 4:         // B, G, R, Alpha
                                b = *srcLine++;
                                g = *srcLine++;
                                r = *srcLine++;
                                srcLine++;
                                break;
                        case 3:         // B, G, R
                                b = *srcLine++;
                                g = *srcLine++;
                                r = *srcLine++;
                                break;
                        case 2:
                                pix = *(unsigned short *)srcLine;
                                srcLine += sizeof(unsigned short);
                                r = (255*((pix>>10)&0x1f))/0x1f;
                                g = (255*((pix>>5)&0x1f))/0x1f;
                                b = (255*(pix&0x1f))/0x1f;
                                break;
                        case 1:
                                r = g = b = *srcLine++;
                                break;
                        default:
                                fprintf(stderr,
                                  "Error: Unsupported TARGA pixel size %d!\n",
                                  header.pixsize);
                                break;
                        }
                        // now calculate the pixel value
                        yVal = mult03[r] + mult06[g] + mult01[b];
```

```cpp
                                switch(planeId){
                                case PLANE_Y:
                                        *dstLine++ = yVal;
                                        break;
                                case PLANE_U:            // actually Cb
                                        *dstLine++ = ((short)b - yVal + 256) >> 1;
                                        break;
                                case PLANE_V:            // actually Cr
                                        *dstLine++ =
                                         multInv16[(short)r - yVal +
                                           (short)(1.6 * 128)];
                                        break;
#ifdef  SAFETY
                                default:
                                        fprintf(stderr,
                                         "targa::getPlane: illegal plane ID\n");
                                        exit(1);
#endif
                                }
#ifdef  DEBUG
                                if(dstLine[-1] < 0 || dstLine[-1] > UCHAR_MAX){
                                        fprintf(stderr,
                                         "Illegal plane %d value %d: RGB=(%d,%d,%d)\n",
                                         planeId, dstLine[-1], r, g, b);
                                }
#endif
                        }
                }
}  /* targa::getPlane */ void
targa::initMultTables(){
        int i;
        for(i = 0; i <= UCHAR_MAX; i++){
                mult01[i] = i * .1;
                mult03[i] = i * .3;
                mult06[i] = i * .6;
                mult08[i] = i * .8;
                multInv3[i] = i * (1/3.0);
                mult16[i] = i * 1.6;
        }
        for(i = 0; i <= 512; i++)
                multInv16[i] = i * (1 / 1.6);           // faster than "i/1.6"
}  /* targa::initMultTables */ void
targa::dump(){
        register int y;
        if(img == 0){
#ifdef  SAFETY
                fprintf(stderr, "targa::dump: Warning: nothing to dump!\n");
#endif
                return;         // nothing to dump
        }
        // fill in everything left to fill in header (except sizes)
        header.numid = 0;
        header.maptyp = 0;
        header.imgtyp = 2;
        header.maporig = 0;
        header.mapsize = 0;
        header.mapbits = 0;
        header.xorig = 0;
```

```cpp
                header.yorig = 0;
                header.pixsize = 24;
                header.imgdes = 0;
                fwrite(&header, sizeof(header), 1, pf);
                for(y = 0; y < header.ysize; y++)
                        fwrite(img[y], sizeof(img[y][0]), header.xsize, pf);
} /* targa::dump */ inline void
ucharAdd(uchar& r, const short& addVal){
        register short tmp = (short)r + addVal;
        if(tmp < 0)
                r = 0;
        else if(tmp > UCHAR_MAX)
                r = UCHAR_MAX;
        else
                r = (uchar)tmp;
} /* ucharAdd */ void
targa::addPlane(const image& plane, int planeId){
        int y, x;
#ifdef  SAFETY
        if(plane.xSize() != header.xsize || plane.ySize() != header.ysize){
                fprintf(stderr, "targa::addPlane: size mismatch!\n");
                exit(1);
        }
        if(planeId != PLANE_Y && planeId != PLANE_U && planeId != PLANE_V){
                fprintf(stderr, "targa::addPlane: Illegal planeId!\n");
                exit(1);
        }
#endif
        for(y = 0; y < header.ysize; y++){
                register pixel *dstLine = img[y];
                short *srcLine = plane.imageData[y];
                for(x = header.xsize; x > 0; x--){
                        register short srcVal = *srcLine++;
#ifdef  ENHANCE_COLOR
                        if(planeId == PLANE_U || planeId == PLANE_V)
                                srcVal *= 1.1;
#endif
                        if(srcVal < 0)
                                srcVal = 0;
                        else if(srcVal > UCHAR_MAX)
                                srcVal = UCHAR_MAX;
                        switch(planeId){
                        case PLANE_Y:           // srcVal is Y coordinate
                                ucharAdd((*dstLine)[R], srcVal);        // R
                                ucharAdd((*dstLine)[G], srcVal);        // G
                                ucharAdd((*dstLine++)[B], srcVal);      // B
                                break;
                        case PLANE_U:           // srcVal is Cb coordinate
                                ucharAdd((*dstLine)[G],                 // G
                                  ((short)(128/3.0) - multInv3[srcVal]));
                                ucharAdd((*dstLine++)[B],               // B
                                  (srcVal << 1) - (128 << 1));
                                break;
                        case PLANE_V:           // srcVal is Cr coordinate
                                ucharAdd((*dstLine)[R],                 // R
                                  mult16[srcVal] - (short)(128 * 1.6));
                                ucharAdd((*dstLine++)[G],               // G
                                  ((short)(128*.8) - mult08[srcVal]));
```

```
                                break;
                    }
                }
        }
}   /* targa::addPlane */
```

IMGDIFF.CPP		Thursday, January 28, 1993 8  pm		Page 1

```cpp
#include <stdlib.h>
#include <stdio.h>
#include <fcntl.h>
#include <sys/stat.h>
#include "general.h"

void
main(int argc, char *argv[]){
	int i;
	if(argc != 6){
		fprintf(stderr, "Usage: imgdiff raw1 raw2 dimX dimY mult\n");
		exit(1);
	}
	bitStream img1(argv[1], O_RDONLY|O_BINARY);
	bitStream img2(argv[2], O_RDONLY|O_BINARY);
	bitStream out("diff.bin", O_CREAT|O_TRUNC|O_WRONLY|O_BINARY,
	 S_IREAD|S_IWRITE);
	for(i = 0; i < 3; i++){
		image plane1(img1, atoi(argv[3]), atoi(argv[4]));
		image plane2(img2, atoi(argv[3]), atoi(argv[4]));
		plane1.leftSub(plane2);
//		plane1.addConst(128);
		plane1.makePositive();
		plane1.mult(atoi(argv[5]));
		plane1.dump(out, 0);
	}
} /* main */
```

MKMONO.CPP                Thursday, January 28, 1993 8:   ₂m                        Page 1

```cpp
#include <fcntl.h>
#include <sys/stat.h>
#include "general.h"

void
main(){
        int i, j, k;
        bitStream outBs("sample.bin", O_CREAT|O_TRUNC|O_WRONLY|O_BINARY,
         S_IWRITE|S_IREAD);
        for(i = 0; i < 3; i++){
                image plane(256, 256);
                plane.add(0x30);
                for(k = 0; k < 128 / 2; k++)
                        for(j = 0; j < 192 / 2; j++)
                                plane.imageData[k][j] = 0xFF;
                plane.dump(outBs, 0);
        }
}  /* main */
```

RGB2YUV.CPP                Thursday, January 28, 1993 8.   pm                               Page 1

```cpp
#include <limits.h>
#include <stdlib.h>
#include <dir.h>
#include <fcntl.h>
#include <io.h>
#include <sys/stat.h>
#include <stdio.h>
include "bstream.h"
#include "general.h"

void
RGBToIRGB(FILE *rawPf, FILE *intrPf, int dimX, int dimY){
        int y, x, plane;
        unsigned char pixVal;
        rewind(rawPf);
        for(plane = 0; plane < 3; plane++){
                fseek(intrPf, plane, SEEK_SET);
                for(y = 0; y < dimY; y++)
                        for(x = 0; x < dimX; x++){
                                fread(&pixVal, 1, 1, rawPf);
                                fwrite(&pixVal, 1, 1, intrPf);
                                if(y < dimY - 1 || x < dimX - 1)
                                        fseek(intrPf, 2L, SEEK_CUR);
                        }
        }
} /* RGBToIRGB */ void
IRGBToRGB(FILE *intrPf, FILE *rawPf, int dimX, int dimY){
        int y, x, plane;
        unsigned char pixVal;
        rewind(rawPf);
        for(plane = 0; plane < 3; plane++){
                fseek(intrPf, plane, SEEK_SET);
                for(y = 0; y < dimY; y++)
                        for(x = 0; x < dimX; x++){
                                fread(&pixVal, 1, 1, intrPf);
                                fwrite(&pixVal, 1, 1, rawPf);
                                if(y < dimY - 1 || x < dimX - 1)
                                        fseek(intrPf, 2L, SEEK_CUR);
                        }
        }
} /* IRGBToRGB */ void
IRGBToIYUV(FILE *intrPf, bitStream& yuvBs, int dimX, int dimY){
        int y, x;
        unsigned char rgb[3];
        short yuv[3];
        rewind(intrPf);
        yuvBs.rewind();
        for(y = 0; y < dimY; y++)
                for(x = 0; x < dimX; x++){
                        fread(rgb, 1, 3, intrPf);
                        yuv[0] = .3*rgb[0] + .6*rgb[1] + .1*rgb[2];
                        yuv[1] = rgb[0] - yuv[0];
                        yuv[2] = rgb[2] - yuv[0];
                        // translate from YUV to YCbCr
                        yuv[1] = yuv[1] / 2.0 + 128;
                        yuv[2] = yuv[2] / 1.6 + 128;
#ifdef DEBUG
                        if(yuv[0] < 0 || yuv[0] > UCHAR_MAX ||
```

RGB2YUV.CPP                Thursday, January 28, 1993 8:.. pm                Page 2

```
                              yuv[1] < 0 || yuv[1] > UCHAR_MAX ||
                              yuv[2] < 0 || yuv[2] > UCHAR_MAX){
                                      fprintf(stderr,
                                        "Erroneous YCbCr value: RGB=(%d, %d, %d), "
                                        "YCbCr=(%d, %d, %d)!\n",
                                         rgb[0], rgb[1], rgb[2],
                                         yuv[0], yuv[1], yuv[2]);
                                      exit(1);
                              }
#endif
                              yuvBs.write(yuv, sizeof(yuv[0]), 3, 9, 0, -256);
                }
} /* IRGBToIYUV */ void
IYUVToIRGB(bitStream& yuvBs, FILE *intrPf, int dimX, int dimY){
        int y, x;
        unsigned char rgb[3];
        short yuv[3], srgb[3];
        rewind(intrPf);
        yuvBs.rewind();
        for(y = 0; y < dimY; y++)
                for(x = 0; x < dimX; x++){
                        yuvBs.read(yuv, sizeof(yuv[0]), 3, 9, 0, -256);
                        // translate from YCbCr to YUV
                        yuv[1] = (yuv[1] - 128) * 2;
                        yuv[2] = (yuv[2] - 128) * 1.6;
                        // color contrast improvements
                        yuv[1] *= 1.5;
                        yuv[2] *= 1.5;
                        // translate from YUV to RGB
                        srgb[0] = yuv[0] + yuv[1];
                        srgb[1] = yuv[0]-.5*yuv[1]-yuv[2]/6.0;
                        srgb[2] = yuv[0] + yuv[2];
#ifdef  DEBUG
                        if(srgb[0] < 0 || srgb[0] > UCHAR_MAX ||
                           srgb[0] < 0 || srgb[0] > UCHAR_MAX ||
                           srgb[0] < 0 || srgb[0] > UCHAR_MAX)
                                fprintf(stderr,
                                   "RGB val overflows (%d,%d,%d)!\n",
                                   srgb[0], srgb[1], srgb[2]);
#endif
                        rgb[0] = srgb[0] < 0 ? 0 :
                                (srgb[0] > UCHAR_MAX ? UCHAR_MAX : srgb[0]);
                        rgb[1] = srgb[1] < 0 ? 0 :
                                (srgb[1] > UCHAR_MAX ? UCHAR_MAX : srgb[1]);
                        rgb[2] = srgb[2] < 0 ? 0 :
                                (srgb[2] > UCHAR_MAX ? UCHAR_MAX : srgb[2]);
                        fwrite(rgb, 1, 3, intrPf);
                }
} /* IYUVToIRGB */ void
IYUVToYUV(bitStream& ibs, bitStream& bs, int dimX, int dimY){
        int y, x, plane;
        short val;
        image outPlane(dimX, dimY, 0);
        bs.rewind();
        for(plane = 0; plane < 3; plane++){
                ibs.rewind();
                ibs.skip(plane, 9);              // align
                for(y = 0; y < dimY; y++)
```

RGB2YUV.CPP                Thursday, January 28, 1993 6:3 pm                    Page 3

```
                        for(x = 0; x < dimX; x++){
                                ibs.read(&val, sizeof(val), 1, 9, 0, -256);
                                if(y < dimY - 1 || x < dimX - 1)
                                        ibs.skip(2, 9);
                                outPlane.imageData[y][x] = val;
                        }
                outPlane.dump(bs);
        }
} /* IYUVToYUV */ void
YUVToIYUV(bitStream& bs, bitStream& ibs, int dimX, int dimY){
        int y, x, plane;
        image *inPlane[3];
        short val;
        bs.rewind();
        for(plane = 0; plane < 3; plane++)
                inPlane[plane] = new image(bs);
        ibs.rewind();
        for(y = 0; y < dimY; y++)
                for(x = 0; x < dimX; x++){
                        for(plane = 0; plane < 3; plane++){
                                val = inPlane[plane]->imageData[y][x];
                                ibs.write(&val, sizeof(val), 1, 9, 0, -256);
                        }
                }
} /* YUVToIYUV */ void
main(int argc, char *argv[]){
        FILE *inPf, *outPf, *irgb;
        char *iyuvName = "iyuvXXXXXX";
        char *irgbName = "irgbXXXXXX";
        mktemp(iyuvName);
        mktemp(irgbName);
        bitStream *yuv, *iyuv;
        if(argc != 6){
usage:
                fprintf(stderr,"Usage: rgbyuv r rgb-file yuv-file dimX dimY\n"
                        "   or: rgbyuv y yuv-file rgb-file dimX dimY\n"
                        );
                exit(1);
        }
        int dimX = atoi(argv[4]), dimY = atoi(argv[5]);
        switch(argv[1][0]){
        case 'r':               // rgb to yuv
                if((inPf = fopen(argv[2], "rb")) == NULL){
                        perror(argv[2]);
                        exit(1);
                }
                if((irgb = fopen(irgbName, "wb+")) == NULL){
                        perror(irgbName);
                        exit(1);
                }
                RGBToIRGB(inPf, irgb, dimX, dimY);
                iyuv = new bitStream(iyuvName,
                 O_CREAT|O_BINARY|O_WRONLY|O_TRUNC, S_IREAD|S_IWRITE);
                IRGBToIYUV(irgb, *iyuv, dimX, dimY);
                delete iyuv;
                iyuv = new bitStream(iyuvName, O_BINARY|O_RDONLY);
                yuv = new bitStream(argv[3],
                 O_CREAT|O_BINARY|O_WRONLY|O_TRUNC, S_IREAD|S_IWRITE);
```

RGB2YUV.CPP			Thursday, January 28, 1993   pm			Page 4

```
                IYUVToYUV(*iyuv, *yuv, dimX, dimY);
                delete yuv;
                delete iyuv;
                fclose(inPf);
                fclose(irgb);
                break;
        case 'y':       // yuv to rgb
                yuv = new bitStream(argv[2], O_RDONLY|O_BINARY);
                iyuv = new bitStream(iyuvName,
                 O_CREAT|O_BINARY|O_WRONLY|O_TRUNC, S_IREAD|S_IWRITE);
                YUVToIYUV(*yuv, *iyuv, dimX, dimY);
                delete iyuv;
                iyuv = new bitStream(iyuvName, O_BINARY|O_RDONLY);
                if((irgb = fopen(irgbName, "wb+")) == NULL){
                        perror(irgbName);
                        exit(1);
                }
                IYUVToIRGB(*iyuv, irgb, dimX, dimY);
                if((outPf = fopen(argv[3], "wb")) == NULL){
                        perror(argv[3]);
                        exit(1);
                }
                IRGBToRGB(irgb, outPf, dimX, dimY);
                delete iyuv;
                delete yuv;
                fclose(outPf);
                fclose(irgb);
                break;
        default:
                goto usage;
        }
        unlink(irgbName);
        unlink(iyuvName);
}   /* main */
```

YUVDCMP.CPP        Thursday, January 28, 1993 6    pm                    Page 1

```
/*
 | YUV decompressor.
 */
#include <fcntl.h>
#include <io.h>
#include <sys/stat.h>
#include <stdlib.h>
#include <string.h>
#include <stdio.h>
#include "general.h"
#include "decmprs.h"
#ifdef  TIMING
include "timing.h"
endif extern int nIter;

void
main(int argc, char *argv[]){
        int i;
        if(!strcmp(argv[1], "-s")){
                nIter = 1;
                argc--;
                argv++;
        }
        if(argc != 3){
                fprintf(stderr,
                  "Usage: decomp [-s] <compressed-file> <output-TARGA-file>\n");
                exit(1);
        }
        targa::initMultTables();
        bitStream inBs(argv[1], O_RDONLY|O_BINARY);
#ifdef  TIMING
        globTimer.reset();
#endif
        image *Yplane = decompress(inBs);
        targa outTg(argv[2], "wb", Yplane->xSize(), Yplane->ySize());
        outTg.addPlane(*Yplane, PLANE_Y);
        delete Yplane;
#ifdef  TIMING
#ifdef  DEBUG
        printf("After decompress, time = %f\n", globTimer.time());
#endif
        globTimer.start();
#endif
        for(i = 0; i < 2; i++){
                filterImage plane(inBs);
#ifdef  TIMING
                globTimer.stop();
#endif
                outTg.addPlane(plane, i == 0 ? PLANE_U : PLANE_V);
#ifdef  TIMING
                globTimer.start();
#endif
        }
#ifdef  TIMING
        globTimer.stop();
#endif
#ifdef  TIMING
        printf("total decompression time = %f\n", globTimer.time());
#endif
        outTg.dump();
```

```
}   /* main */
```

CPNEW.CPP        Thursday, January 28, 1993 8:  pm

```cpp
#include <stdio.h>
include <stdlib.h> void *
operator new(size_t nbytes){
        void *addr;
        if((addr = malloc(nbytes)) == 0){
                fprintf(stderr, "Fatal: Out of memory!\n");
                exit(1);
        }
        return addr;
}  /* operator new */
```

TIMING.CPP

```
ifdef  TIMING include "timing.h"

Timer globTimer;

#endif
```

MAKEFILE                Thursday, January 28, 1993 8:( n                Page 1

```
.autodepend

CFLAGS=-DSAFETY -DTIMING -vi -O2 -Z -G -k- -w -ml -DTEST -DBILINEAR # -DFILTOUT -DM
EXICAN -DLIMITV

DOBJS=fastdcmp.obj general.obj bstream.obj decmprs.obj timing.obj opnew.obj
EOBJS=fastecmp.obj general.obj bstream.obj compress.obj timing.obj opnew.obj
IOBJS=imgdiff.obj general.obj bstream.obj timing.obj opnew.obj
MONOBJS=mkmono.obj general.obj bstream.obj timing.obj opnew.obj
RGB2YUVOBJS=rgb2yuv.obj general.obj bstream.obj timing.obj opnew.obj
YUVEOBJS=yuvecmp.obj general.obj bstream.obj compress.obj timing.obj opnew.obj
YUVDOBJS=yuvdcmp.obj general.obj bstream.obj decmprs.obj timing.obj opnew.obj
LIBS=bidsl.lib .cpp.obj:
        bcc -c $(CFLAGS) {$< } all: fastecmp.exe fastdcmp.exe imgdiff.exe mkmono.exe rgb2yuv.exe yuvecmp.exe \
        yuvdcmp.exe fastdcmp.exe: $(DOBJS)
        bcc $(CFLAGS) -efastdcmp @&&!
$(DOBJS) $(LIBS)
!

fastecmp.exe: $(EOBJS)
        bcc $(CFLAGS) -efastecmp @&&!
$(EOBJS) $(LIBS)
!

imgdiff.exe: $(IOBJS)
        bcc $(CFLAGS) -eimgdiff @&&!
$(IOBJS) $(LIBS)
!

mkmono.exe: $(MONOBJS)
        bcc $(CFLAGS) -emkmono @&&!
$(MONOBJS) $(LIBS)
!

rgb2yuv.exe: $(RGB2YUVOBJS)
        bcc $(CFLAGS) -ergb2yuv @&&!
$(RGB2YUVOBJS) $(LIBS)
!

yuvecmp.exe: $(YUVEOBJS)
        bcc $(CFLAGS) -eyuvecmp @&&!
$(YUVEOBJS) $(LIBS)
!

yuvdcmp.exe: $(YUVDOBJS)
        bcc $(CFLAGS) -eyuvdcmp @&&!
$(YUVDOBJS) $(LIBS)
!
```

APPENDIX B

The information contained in these sheets is confidential. It is being provided with the understanding that it shall not be used or disclosed — in whole or in part — for any purpose.

LOAD & RUN INSTRUCTIONS

Provided below are listings of the software (written in C++) which can be used to create a preferred embodiment of the image encoding and decoding method which is the subject of this patent, along with detailed instructions on how to load and run it. The software and instructions given below are specific to a Personal Computer running with the DOS 5 operating system. It operates on images which are stored using the TARGA format.

The software listing provided contains files with different extensions. The ".cpp" files are the program files, and the ".h" files are the header files. In addition a file named makefile is also included. The files need to be *compiled* before the program can be executed. The compilation process is automated using the *make program*. The makefile contains the compilation instructions to be used by the *make program*. The software package is designed so as to be compiled using Borland's C++ 3.1 compiler and make utility.

To load the exectuables, put all the source files (i.e. the ".cpp" files, the ".h" files and the makefile) in a directory of your choice, and set it to be the current working directory using the DOS command *cd*. To compile, just type

*make* at the DOS command prompt. The *make* command is supposed to activate the Borland make utility. If it doesn't, then set your DOS environment variable "PATH" to include the directory containing the Borland binaries. (The Borland directory is usually named /borlandc/bin on the drive where the Borland package was installed.) Once the *make* command is accepted, it invokes the *make utility* which runs the compiler program several times, in the correct sequence that creates the executables. Running *make* will produce the compressor executable, yuvecmp.exe, and the decompressor executable, yuvdcmp.exe.

To run the compressor, type

*yuvecmp infile outfile* where:

infile is the name of a TARGA image file to be compressed, outfile is the name to be assigned to the compressed file.

To run the decompressor, type

*yuvdcmp [−s] infile outfile* where:

infile is the name of a compressed file produced by *yuvecmp*, outfile is the name to be assigned to the output file, which will be stored in TARGA format, the −s option is for speed; i.e. when activated it instructs the decompressor to run faster.

The compressor and decompressor run on any 80x86 architecture. Due to the fact that the compressor uses some floating point instructions, it is recommended that the compressing machine have a floating point unit. This is not necessary for the decompression.

The information contained in these sheets is confidential. It is being provided with the understanding that it shall not be used or disclosed — in whole or in part — for any purpose.

Listings for the software described above are provided below. The various programs and headers are ordered alphabetically, as follows:

1. bstream.cpp
2. bstream.h
3. compress.cpp
4. compress.h
5. decmprs.cpp
6. decmprs.h
7. fastdcmp.cpp
8. fastecmp.cpp
9. general.cpp
10. general.h
11. imgdiff.cpp
12. makefile
13. mkmono.cpp
14. opnew.cpp
15. rgb2yuv.cpp
16. timing.cpp
17. timing.h
18. yuvdcmp.cpp
19. yuvecmp.cpp

I claim:

1. A digital signal encoding method for image compression followed by at least one of storage and transmission thereof, comprising the step of:

defining relatively high frequency and relatively low frequency components of an original digital signal representing an image comprised of segments on each of two scales, said components being defined for each segment;

fractal-processing the two relatively high frequency components by conducting a comparison therebetween;

generating an encoded digital signal comprising a representation of at least one of the relatively low frequency components and a representation of a result of the fractal-processing step for each segment;

utilizing said encoded digital signal to provide at least one of storage and transmission of a compressed image.

2. A method according to claim 1 wherein said step of defining comprises the step of:

defining a relatively high frequency component on one of the two scales as the difference between the original signal and the relatively low frequency component on said scale.

3. A method according to claim 1 wherein said step of defining comprises the step of:

segmenting the original digital signal by defining coarse and fine grids corresponding to first and second ones of the two scales, respectively.

4. A method according to claim 3 wherein said step of defining comprises the following steps:

computing an average value for the original digital signal in each segment from among two pluralities of segments defined by the coarse and fine grids respectively; and for each plurality of segments, passing functions through the average values, thereby defining the relatively low frequency components for each of the two scales.

5. A method according to claim 3 wherein said step of defining comprises the step of:

low-pass filtering the original digital signal with first and second cut-off frequencies determined respectively by the coarse and fine grids, thereby defining the relatively low frequency components.

6. A method according to claim 5 wherein said step of low-pass filtering comprises the steps of:

computing a Discrete Fourier Transform of the original digital signal;

truncating the Discrete Fourier Transform at the first and second cut-off frequencies, thereby defining truncated signals; and performing an inverse Discrete Fourier Transform on the truncated signals.

7. A method according to claim 5 wherein said step of low-pass filtering comprises the steps of:

computing a Discrete Cosine Transform of the original digital signal;

truncating the Discrete Cosine Transform at the first and second cut-off frequencies, thereby defining truncated signals; and performing an inverse Discrete Cosine Transform on the truncated signals.

8. A method according to claim 1 wherein the original signal comprises a video signal including a plurality of frames and wherein the step of defining comprises for each frame of the video signal, the steps of:

defining first relatively high frequency and relatively low frequency components of the current frame on a first scale; and defining second relatively high frequency and relatively low frequency components on a frame following the current frame on a second scale.

9. A method according to claim 1 wherein the original signal comprises and audio signal sampled digitally, and wherein the sampled signal is segmented into windows which are adaptively clipped as the signal is generated, and the steps of defining, fractal-processing and generating are carried out separately for each clipped window of the sampled signal.

10. A method according to claim 1 wherein the original signal comprises a greyscale image.

11. A method according to claim 1 wherein the original signal comprises a color image defining a plurality of color component images.

12. A method according to claim 11 wherein the steps of defining, fractal-processing and generating are performed on each of the plurality of color component images.

13. A method according to claim 1 wherein the original signal comprises a color image defined by a color palette.

14. A method according to claim 11 and also comprising a palette selection step in which the plurality of color component images are compressed into a color values palette comprising a multiplicity of color palette values and wherein the original digital signal processed in said steps of defining, fractal-processing and generating comprises the multiplicity of color palette values.

15. A method according to claim 3 wherein the step of fractal-processing comprises the steps of:

shrinking a portion of the relatively high frequency component of the original digital signal contained in each coarse grid segment so as to fit the size of a fine grid segment;

for each fine grid segment, performing the step of:

searching among the shrunk relatively high frequency component portions for a shrunk relatively high frequency component portion which matches well with a portion of the relatively high frequency component contained in the fine grid segment.

16. A method according to claim 15 and also comprising the step of:

storing a result of the searching step comprising a shrunk relatively high frequency component portion index and a matching operation.

17. A method according to claim 15 wherein said shrinking comprises, for each fine grid pixel, the step of:

averaging pixel values of the relatively high frequency component defined in the coarse scale, over a region corresponding to the fine grid pixel position.

18. A method according to claim 16 wherein said matching operation comprises a scale factor by which the shrunk relatively high frequency portion is multiplied, and wherein said well-matching portion is identified using a sum of squares error criterion.

19. A method according to claim 1 and also comprising the step of providing a packed encoded digital signal, the step of providing comprising the steps of:

quantizing the encoded digital signal, thereby defining a quantized encoded digital signal;

storing the quantized encoded digital signal in byte form, thereby defining a stored quantized encoded digital signal; and compressing the stored quantized encoded digital signal.

20. A method according to claim 19 wherein the step of compressing comprises the step of operating at least one of the following compression algorithms on the stored quantized encoded digital signal:

a Lempel-Ziv compression algorithm; and a Huffman compression algorithm.

21. A method according to claim 1 and also comprising the step of generating the original digital signal by transforming a precursor digital signal to a frequency domain.

22. A method according to claim 21 wherein the step of generating an original digital signal comprises the step of performing a Discrete Fourier Transform on the precursor digital signal.

23. A method according to claim 21 wherein the step of generating an original digital signal comprises the step of performing a Discrete Cosine Transform on the precursor digital signal.

24. A method for decoding a received digital signal representing an encoded image comprised of segments, the method comprising the steps of:

extracting for each segment a coarse relatively low frequency signal component, a fine relatively low frequency signal component and fractal information from the received encoded digital signal;

computing for each segment a difference between a reference digital signal and the coarse relatively low frequency signal component, thereby defining a difference signal;

performing a plurality of linear shrinking and scaling operations on a plurality of portions of said difference signal contained in respective coarse grid segments using the fractal information, thereby defining a modified difference signal; and adding for each segment the fine relatively low frequency signal component with the modified difference signal, thereby defining a decoded digital signal which substantially reconstructs each segment of the original signal.

25. A method according to claim 24 wherein the received signal comprises an encoded video signal including a plurality of frames and wherein the step of extracting comprises, for each frame of the video signal, the step of:

defining said coarse relatively low frequency signal component and said fine relatively low frequency signal component from frame preceding the current frame and from the current frame, respectively.

26. A method according to claim 24 wherein a plurality of signals are received and decoded, each received signal comprising a window of an encoded audio signal sampled digitally which is segmented into windows as it is generated.

27. A method according to claim 24 wherein the received signal comprises an encoded greyscale image.

28. A method according to claim 24 wherein a plurality of signals are received, each received signal comprising an encoded color component image from a color image.

29. A method according to claim 28 wherein said of extracting, computing, performing and adding are performed on each of the plurality of encoded color component images.

30. A method according to claim 24 wherein the received signal comprises an encoded color image defined by a color palette, and wherein the decoded signal is further processed by a table look-up through the color palette.

31. A method according to claim 24 wherein said steps of extracting, computing, performing and adding are repeated at least once, wherein for each repetition the reference signal comprises the decoded signal from a previous repetition.

32. A method according to claim 24 wherein the steps of extracting, computing, performing and adding are repeated until the decoded signal remains substantially unchanged over repetition.

33. A method according to claim 24 wherein the steps of extracting, computing, performing and adding are repeated a predetermined number of times.

34. A method according to claim 24 wherein the received encoded digital signal comprises a received packed encoded digital signal, and the method also comprises, prior to the step of extracting, the steps of:

decompressing the packed encoded digital signal into a plurality of bytes;

reconstructing a quantized encoded digital signal from the plurality of bytes; and performing inverse quantization on the quantized encoded digital signal, thereby to generate the encoded digital signal.

35. A method according to claim 34 wherein the step of decompressing comprises the step of operating at least one of the following decompression algorithms on the packed encoded digital signal;

a Lempel-Ziv decompression algorithm; and

Huffman decompression algorithm.

36. A method according to claim 24 wherein the step of performing comprises, for each fine grid segment, the following steps:

deriving an index and a matching operation from the fractal information;

shrinking the portion of the difference signal contained in a coarse grid segment corresponding to the index so as to fit the size of a fine grid segment; and applying the matching operation to the shrunk portion of the difference signal, thereby to define the modified difference signal within the fine grid segment.

37. A method according to claim 36 wherein said shrinking step comprises, for each fine grid pixel, the step of:

averaging pixel values of the difference signal over a region corresponding to the fine grid pixel position.

38. A method according to claim 36 wherein said matching operation comprises a multiplication of the shrunk rough portion by a scale factor.

39. A method according to claim 24 and also comprising the step of:

transforming the decoded signal out of a frequency domain.

40. A method according to claim 39 wherein the step of transforming out of a frequency domain comprises the step of:

performing an inverse Discrete Fourier Transform on the decoded signal.

41. A method according to claim 39 wherein the step of transforming out of a frequency domain comprises the step of:

performing an inverse Discrete Cosine Transform on the decoded signal.

42. A method according to claim 1 and also comprising the steps of:

transmitting the encoded signal along a telecommunication channel;

receiving the encoded signal from the telecommunication channel; and decoding the received encoded signal.

43. A method according to claim 42 wherein said step of decoding comprises the steps of:

extracting a coarse relatively low frequency signal component, a fine relatively low frequency signal component and fractal information from the received encoded digital signal;

computing a difference between a reference digital signal and the coarse relatively low frequency signal component, thereby defining a difference signal;

performing a plurality of linear shrinking and scaling Operations on a plurality of portions of said difference signal contained in respective coarse grid segments using the fractal information, thereby defining a modified difference signal; and adding the fine relatively low frequency signal component with the modified difference signal, thereby defining a decoded digital signal which substantially reconstructs the original signal.

44. A method according to claim 43 whereby the original signal comprises a video signal including a plurality of frames, and wherein the step of extracting comprises, for each current frame of the video signal, the steps of:

defining first relatively high frequency and relatively low frequency components of the current frame on a first scale;

defining second relatively high frequency and relatively low frequency components of a frame following the current frame on a second scale;

and wherein the step of extracting comprises, for each frame of the video signal, the step of:

defining a coarse relatively low frequency signal component and a fine relatively low frequency signal component from a frame preceding the current frame and from the current frame, respectively.

45. A method according to claim 43 wherein the original signal is an audio signal sampled digitally, and the sampled signal is segmented into windows which are adaptively clipped as the signal is generated, and the steps of defining, fractal-processing, generating, transmitting, receiving, extracting, computing, performing and adding are carried out separately for each clipped window of the sampled signal.

46. A method according to claim 43 wherein the original signal comprises a greyscale image.

47. A method according to claim 43 wherein the original signal comprises a color image defining a plurality of color component images.

48. A method according to claim 47 wherein the steps of defining, fractal-processing, generating, transmitting, receiving, extracting, computing, performing and adding are performed on each of the plurality of color component images.

49. A method according to claim 43 wherein the original signal comprises a color image defined by a color palette.

50. A method according to claim 47 and also comprising a palette selection step in which the plurality of color component images are compressed into a color palette comprising a multiplicity of color palette values and wherein the original digital signal processed in said steps of defining, fractal-processing and generating comprises the multiplicity of color palette values, and wherein the decoded signal is further processed by a table look-up through the color palette.

51. A method according to claim 43 wherein said step of defining comprises the step of:

defining a relatively high frequency component on one of the two scales as the difference between the original signal and the relatively low frequency component on said scale.

52. A method according to claim 43 wherein said step of defining comprises the step of:

segmenting the original digital signal by defining coarse and fine grids corresponding to first and second ones of the two scales, respectively.

53. A method according to claim 52 wherein said step of defining comprises the following steps:

computing an average value for the original digital signal in each segment from among two pluralities of segments defined by the coarse and fine grids respectively; and for each plurality of segments, passing functions through the average values, thereby defining the relatively low frequency components for each of the two scales.

54. A method according to claim 52 wherein said step of defining comprises the step of:

low-pass filtering the original digital signal with first and second cut-off frequencies determined respectively by the coarse and fine grids, thereby defining the relatively low frequency components.

55. A method according to claim 54 wherein said step of low-pass filtering comprises the steps of:

computing a Discrete Fourier Transform of the original digital signal;

truncating the Discrete Fourier Transform at the first and second cut-off frequencies, thereby defining truncated signals; and performing an inverse Discrete Fourier Transform on the truncated signals.

56. A method according to claim 54 wherein said step of low-pass filtering comprises the steps of:

computing a Discrete Cosine Transform of the original digital signal;

truncating the Discrete Cosine Transform at the first and second cut-off frequencies, thereby defining truncated signals; and performing an inverse Discrete Cosine Transform on the truncated signals.

57. A method according to claim 43 wherein the step of fractal-processing comprises the steps of:

shrinking a portion of the relatively high frequency component of the original digital signal contained in each coarse grid segment so as to fit the size of a fine grid segment;

for each fine grid segment, performing the step of:

searching among the shrunk relatively high frequency component portions for a shrunk relatively high frequency component portion which matches well with a portion of the relatively high frequency component contained in the fine grid segment.

58. A method according to claim 57 and also comprising the step of:

storing a result of the searching step comprising a shrunk relatively high frequency component portion index and a matching operation.

59. A method according to claim 57 wherein said shrinking step comprises, for each fine grid pixel, the step of:

averaging pixel values of the relatively high frequency component defined in the coarse scale, over a region corresponding to the fine grid pixel position.

60. A method according to claim 58 wherein said matching operation comprises a scale factor by which the shrunk relatively high frequency portion is multiplied, and wherein said well-matching portion is identified using a sum of squares error criterion.

61. A method according to claim 43 and also comprising the steps of:
generating the encoded signal by packing a precursor encoded signal for transmission along the channel, the step of packing comprising the steps of:
quantizing the precursor encoded digital signal, thereby defining a quantized encoded digital signal;
storing the quantized encoded digital signal in byte form, thereby defining a stored quantized encoded digital signal; and
compressing the stored quantized encoded digital signal; and
unpacking the packed encoded signal after it is received, the step of unpacking comprising the steps of:
decompressing the packed encoded digital signal into a plurality of bytes;
reconstructing the quantized encoded digital signal from the plurality of bytes; and
performing inverse quantization on the quantized encoded digital signal, thereby generating the received encoded digital signal.

62. A method according to claim 61 wherein the step of compressing comprises the step of:
operating at least one of the following compression algorithmsaon the stored quantized encoded digital signal:
Lempel-Ziv compression algorithm; and
a Huffman compression algorithm.

63. A method according to claim 61 wherein the step of decompressing comprises the step of:
operating at least one of the following decompression algorithmsaon the packed encoded digital signal:
Lempel-Ziv decompression algorithm; and
a Huffman decompression algorithm.

64. A method according to claim 43 and also comprising the steps of:
generating the original digital signal by transforming a precursor digital signal to a frequency domain; and
transforming the decoded signal out of the frequency domain.

65. A method according to claim 64 wherein the step of generating the original digital signal comprises the step of:
performing a Discrete Fourier Transform on the precursor digital signal.

66. A method according to claim 64 wherein the step of generating the original digital signal comprises the step of:
performing a Discrete Cosine Transform on the precursor digital signal.

67. A method according to claim 64 wherein the step of transforming out of a frequency domain comprises the step of:
performing an inverse Discrete Fourier Transform on the decoded signal.

68. A method according to claim 64 wherein the step of transforming out of a frequency domain comprises the step of:
performing an inverse Discrete Cosine Transform on the decoded signal.

69. A method according to claim 43 wherein the step of performing comprises, for each fine grid segment, the following steps:
deriving an index and a matching operation from the fractal information;
shrinking the portion of the difference signal contained in a coarse grid segment corresponding to the index so as to fit the size of a fine grid segment; and
applying the matching operation to the shrunk portion of the difference signal, thereby to define the modified difference signal within the fine grid segment.

70. A method according to claim 69 wherein said shrinking step comprises, for each fine grid pixel, the step of:
averaging pixel values of the difference signal over a region corresponding to the fine grid pixel position.

71. A method according to claim 69 wherein said matching operation comprises a multiplication of the shrunk relatively high frequency portion by a scale factor.

72. A method according to claim 1 and also comprising the steps of:
archiving the encoded signal into a digital storage medium;
retrieving the encoded signal from the digital storage medium; and
decoding the retrieved encoded signal.

73. A method according to claim 72 wherein said step of decoding comprises the steps of:
extracting a coarse relatively low frequency signal component, a fine relatively low frequency signal component and fractal information from the received encoded digital signal;
computing a difference between a reference digital signal and the coarse relatively low frequency signal component, thereby defining a difference signal;
performing a plurality of linear shrinking and scaling operations on a plurality of portions of said difference signal contained in respective coarse grid segments using the fractal information, thereby defining a modified difference signal; and
adding the fine relatively low frequency Signal component with the modified difference signal, thereby defining a decoded digital signal which substantially reconstructs the original signal.

74. A method according to claim 73 whereby the original signal comprises a video signal including a plurality of frames, and wherein the step of extracting comprises, for each current frame of the video signal, the steps of:
defining first relatively high frequency and relatively low frequency components of the current frame on a first scale; and
defining second relatively high frequency and relatively low frequency components of a frame following the current frame on a second scale;
and wherein the step of extracting comprises, for each frame of the video signal, the step of:
defining a coarse relatively low frequency signal component and a fine relatively low frequency signal component from a frame preceding the current frame and from the current frame, respectively.

75. A method according to claim 73 wherein the original signal is an audio signal sampled digitally, and the sampled signal is segmented into windows which are adaptively clipped as the signal is generated, and the steps of defining, fractal-processing, generating, archiving, retrieving, extracting, computing, performing and adding are carried out separately for each clipped window of the sampled signal.

76. A method according to claim 73 wherein the original signal comprises a greyscale image.

77. A method according to claim 73 wherein the original signal comprises a color image defining a plurality of color component images.

78. A method according to claim 77 wherein the steps of defining, fractal-processing, generating, archiving, retrieving, extracting, computing, performing and adding are performed on each of the plurality of color component images.

79. A method according to claim 73 wherein the original signal comprises a color image defined by a color palette.

80. A method according to claim 77 and also comprising a palette selection step in which the plurality of color component images are compressed into a color palette comprising a multitude of color palette values and wherein the original digital signal processed in said steps of defining, fractal-processing and generating comprises the color palette values, and wherein the decoded signal is further processed by a table look-up through the color palette.

81. A method according to claim 73 wherein said step of defining comprises the step of:

defining a relatively high frequency component on one of the two scales as the difference between the original signal and the relatively low frequency component on said scale.

82. A method according to claim 73 wherein said step of defining comprises the step of:

segmenting the original digital signal by defining coarse and fine grids corresponding to first and second ones of the two scales, respectively.

83. A method according to claim 82 wherein said step of defining comprises the following steps:

computing an average value for the original digital signal in each segment from among two pluralities of segments defined by the coarse and fine grids respectively; and for each plurality of segments, passing functions through the average values, thereby defining the relatively low frequency components for each of the two scales.

84. A method according to claim 82 wherein said step of defining comprises the step of:

low-pass filtering the original digital signal with first and second cut-off frequencies determined respectively by the coarse and fine grids, thereby defining the smooth components.

85. A method according to claim 84 wherein said step of low-pass filtering comprises the steps of:

computing a Discrete Fourier Transform of the original digital signal;

truncating the Discrete Fourier Transform at the first and second cut-off frequencies, thereby defining truncated signals; and performing an inverse Discrete Fourier Transform on the truncated signals.

86. A method according to claim 84 wherein said step of low-pass filtering comprises the steps of:

computing a Discrete Cosine Transform of the original digital signal;

truncating the Discrete Cosine Transform at the first and second cut-off frequencies, thereby defining truncated signals; and performing an inverse Discrete Cosine Transform on the truncated signals.

87. A method according to claim 73 wherein the step of fractal-processing comprises the steps of:

shrinking a portion of the rough component of the original digital signal contained in each coarse grid segment so as to fit the size of a fine grid segment;

for each fine grid segment, performing the step of:

searching among the shrunk rough component portions for a shrunk rough component portion which matches well with a portion of the rough component contained in the fine grid segment.

88. A method according to claim 87 and also comprising the step of:

storing a result of the searching step comprising a shrunk rough component portion index and a matching operation.

89. A method according to claim 87 wherein said shrinking step comprises, for each fine grid pixel, the step of:

averaging pixel values of the rough component defined in the coarse scale, over a region corresponding to the fine grid pixel position.

90. A method according to claim 88 wherein said matching operation comprises a scale factor by which the shrunk rough portion is multiplied, and wherein said optimal matching is based on a sum of squares error criterion.

91. A method according to claim 73 and also comprising the steps of:

generating an encoded signal by packing a precursor encoded signal prior to archiving, the step of packing comprising the steps of:

quantizing the encoded digital signal, thereby defining a quantized encoded digital signal;

storing the quantized encoded digital signal in byte form, thereby defining a stored quantized encoded digital signal; and compressing the stored quantized encoded digital signal; and unpacking the packed encoded signal after retrieving, the step of unpacking comprising the steps of:

decompressing the packed encoded digital signal into a plurality of bytes;

reconstructing the quantized encoded digital signal from the plurality of bytes; and performing inverse quantization on the quantized encoded digital signal, thereby generating the retrieved encoded digital signal.

92. A method according to claim 91 wherein the step of compressing comprises the step of:

operating at least one of the following compression algorithmsaon the stored quantized encoded digital signal:

Lempel-Ziv compression algorithm; and a Huffman compression algorithm.

93. A method according to claim 91 wherein the step of decompressing comprises the step of:

operating at least one of the following decompression algorithms on the stored quantized encoded digital signal:

a Lempel-Ziv decompression algorithm; and a Huffman decompression algorithm.

94. A method according to claim 73 and also comprising the steps of:

generating the original digital signal by transforming a precursor digital signal to a frequency domain; and transforming the decoded signal out of the frequency domain.

95. A method according to claim 94 wherein the step of generating an original digital signal comprises the step of:

performing a Discrete Fourier Transform on the precursor digital signal.

96. A method according to claim 94 wherein the step of generating an original digital signal comprises the step of:

performing a Discrete Cosine Transform on the precursor digital signal.

97. A method according to claim 94 wherein the step of transforming out of a frequency domain comprises the step of:

performing an inverse Discrete Fourier Transform on the decoded signal.

98. A method according to claim 94 wherein the step of transforming out of a frequency domain comprises the step of:

performing an inverse Discrete Cosine Transform on the decoded signal.

99. A method according to claim 73 wherein the step of performing comprises, for each fine grid segment, the following steps:

deriving an index and optimal matching operation from the fractal information;

shrinking the portion of the difference signal contained in the coarse grid segment corresponding to the index so as to fit the size of a fine grid segment; and applying the optimal matching operation to the shrunk portion of the difference signal, thereby to define the portion of the modified difference signal for the fine grid segment.

100. A method according to claim 99 wherein said shrinking comprises, for each fine grid pixel, the step of:

averaging the difference signal pixel values over a neighborhood region of the fine grid pixel position.

101. A method according to claim 99 wherein said matching operation comprises the step of:

multiplying the shrunk rough portion by a scale factor.

102. A method according to claim 1 wherein the relatively low frequency components comprise first and second decoded JPEG compressions based on image box size dimensions on respective ones of the two scales and wherein the representation of at least one of the relatively low frequency components comprises a JPEG representation.

103. A method according to claim 24 wherein the step of extracting comprises the step of decompressing a JPEG encoded file.

104. A method according to claim 1 wherein the relatively low frequency components comprise first and second decoded wavelet compressions based on grid dimensions on respective ones of the two scales, and wherein the representation of at least one of the relatively low frequency components comprises a wavelet representation based on a Discrete Wavelet Transform.

105. A method according to claim 24 wherein the coarse relatively low frequency signal component and the fine relatively low frequency signal component are each extracted by performing the step of:

expanding a wavelet representation using an inverse Discrete Wavelet Transform.

106. A method according to claim 8 wherein the two relatively low frequency components of the plurality of frames comprise decoded MPEG compressions based on image box size dimensions on each of the two scales, and wherein the representation of each of the relatively low frequency Components comprises an MPEG representation.

107. A method according to claim 25 wherein the step of defining the coarse relatively low frequency signal component and the fine relatively low frequency signal component comprises the step of:

decompressing an MPEG encoded file.

108. A method according to claim 8 wherein the two relatively low frequency components of the plurality of frames comprise decoded CCITT compressions based on the H.261 (p*64) standard and based on image box size dimensions on each of the two scales, and wherein the representation of each of the relatively low frequency components comprises an H.261 representation.

109. A method according to claim 25 wherein the step of defining the coarse relatively low frequency signal component and the fine relatively low frequency signal component comprises the step of:

decompressing an H.261 encoded file.

110. A method according to claim 1 wherein the relatively low frequency components of the original digital signal are not orthogonal projections thereof.

111. Apparatus for decoding a received digital signal representing an encoded image comprised of segments, the apparatus comprising:

a difference computation unit operative in each segment to compute a difference between a reference digital signal and a coarse relatively low frequency signal component extracted from the received digital signal, thereby defining a difference signal;

a linear shrink and scale processor operative to perform a plurality of linear shrink and scale operations on a plurality of portions of said difference signal respectively contained in a plurality of coarse grid segments using fractal information extracted from the received digital signal, thereby defining a modified difference signal; and a signal addition unit operative in each segment to add a fine relatively low frequency signal component extracted from the received digital signal with the modified difference signal, thereby defining a decoded digital signal which substantially reconstructs each segment of the original signal.

112. An image compression method comprising:

providing a digital signal representing an image comprised of segments;

for each segment, separating the digital signal into relatively high frequency and relatively low frequency components;

applying fractal compression processing only to the relatively high frequency component;

applying non-fractal compression processing to the relatively low frequency component; and utilizing the relatively high frequency component following fractal processing thereof and the relatively low frequency component following non-fractal processing thereof to produce a compressed image representation for each segment.

113. Image compression apparatus operative on a digital signal representing an image comprised of segment, the apparatus comprising:

a frequency separator for separating for each segment the digital signal into relatively high frequency and relatively low frequency components;

a fractal processor operating only on the relatively high frequency component;

a non-fractal processor operating on the relatively low frequency component; and a compressed signal generator utilizing the relatively high frequency component following fractal processing thereof and the relatively low frequency component following non-fractal processing thereof to produce a compressed image representation for each segment.

114. An image retrieval method comprising:

retrieving from storage or a transmission link a digital signal representing an encoded image comprised of segments and having at each segment an encoded relatively high frequency signal component and an encoded relatively low frequency signal component;

applying fractal decompression processing to the encoded relatively high frequency signal component, thereby producing for each segment a decompressed relatively high frequency signal component;

applying non-fractal decompression processing to the encoded relatively low frequency signal component, thereby producing for each segment a decompressed relatively low frequency signal component;

combining for each segment said decompressed relatively high frequency signal component with said decompressed relatively low frequency signal component, thereby producing each segment of a reconstructed image signal; and employing said reconstructed image signal to produce a visible image.

115. An image retrieval system comprising:

a receiver, retrieving from storage or a transmission link a digital signal representing an encoded image comprised of segments and having at each segment an encoded relatively high frequency signal component and an encoded relatively low frequency signal component;

a fractal decoder, applying fractal decompression processing to the encoded relatively high frequency signal component, thereby producing for each segment a decompressed relatively high frequency signal component;

a non-fractal decoder, applying non-fractal decompression processing to the encoded relatively low frequency signal component, thereby producing for each segment a decompressed relatively low frequency signal component;

a signal combiner, combining for each segment said decompressed relatively high frequency signal component with said decompressed relatively low frequency signal component, thereby producing each segment of a reconstructed image signal; and a visible image generator, employing said reconstructed image signal to produce a visible image.

* * * * *